(12) United States Patent
Leser et al.

(10) Patent No.: US 12,139,319 B2
(45) Date of Patent: *Nov. 12, 2024

(54) INSULATED CONTAINER

(71) Applicant: Berry Plastics Corporation, Evansville, IN (US)

(72) Inventors: Chris K. Leser, Mahomet, IL (US); Charles T. Wallace, Evansville, IN (US); Philip A. Driskill, Newburgh, IN (US); John B. Euler, Evansville, IN (US); Jason J. Paladino, Newburgh, IN (US); Milan C. Maravich, Newburgh, IN (US); Daniel O. Davis, Cynthiana, IN (US); Jeffrey A. Mann, Evansville, IN (US); Randy A. Bowlds, Evansville, IN (US)

(73) Assignee: Berry Plastics Corporation, Evansville, IN (US)

(*) Notice: Subject to any disclaimer, the term of this patent is extended or adjusted under 35 U.S.C. 154(b) by 287 days.

This patent is subject to a terminal disclaimer.

(21) Appl. No.: 17/136,628

(22) Filed: Dec. 29, 2020

(65) Prior Publication Data

US 2021/0120988 A1 Apr. 29, 2021

Related U.S. Application Data

(63) Continuation of application No. 16/858,778, filed on Apr. 27, 2020, now Pat. No. 10,899,532, which is a
(Continued)

(51) Int. Cl.
*B65D 81/38* (2006.01)
*A47G 19/22* (2006.01)
(Continued)

(52) U.S. Cl.
CPC ..... *B65D 81/3865* (2013.01); *A47G 19/2205* (2013.01); *A47G 23/0216* (2013.01);
(Continued)

(58) Field of Classification Search
None
See application file for complete search history.

(56) References Cited

U.S. PATENT DOCUMENTS 1,396,282 A 11/1921 Penn
1,435,120 A 11/1922 Holman
(Continued)

FOREIGN PATENT DOCUMENTS

AU 2013334155 B2 2/2017
BE 898053 4/1984
(Continued)

OTHER PUBLICATIONS

Third Mexican Office Action for Mexican App. No. MX/a/2014/002373 issued Jan. 8, 2021, 9 pages.
(Continued)

*Primary Examiner* — Eli D. Strah
*Assistant Examiner* — Thomas J Kessler
(74) *Attorney, Agent, or Firm* — Barnes & Thornburg LLP

(57) ABSTRACT

A container includes a cup formed to include and interior region and an insulated sleeve. The insulated sleeve is coupled to an outer surface of the cup.

19 Claims, 26 Drawing Sheets

Related U.S. Application Data continuation of application No. 16/430,652, filed on Jun. 4, 2019, now Pat. No. 10,654,643, which is a continuation of application No. 15/672,668, filed on Aug. 9, 2017, now Pat. No. 10,351,332, which is a continuation of application No. 15/137,657, filed on Apr. 25, 2016, now Pat. No. 9,758,293, which is a continuation of application No. 14/755,546, filed on Jun. 30, 2015, now Pat. No. 9,346,605, which is a continuation of application No. 13/526,417, filed on Jun. 18, 2012, now Pat. No. 9,102,461.

(60) Provisional application No. 61/618,637, filed on Mar. 30, 2012, provisional application No. 61/498,415, filed on Jun. 17, 2011.

(51) Int. Cl.
| | |
|---|---|
| *A47G 23/02* | (2006.01) |
| *B29C 65/00* | (2006.01) |
| *B32B 1/00* | (2006.01) |
| *B32B 1/08* | (2006.01) |
| *B32B 5/18* | (2006.01) |
| *B32B 7/02* | (2019.01) |
| *B32B 27/06* | (2006.01) |
| *B32B 27/08* | (2006.01) |
| *B32B 27/32* | (2006.01) |
| *B29C 65/02* | (2006.01) |
| *B29L 31/00* | (2006.01) |
| *B31B 100/00* | (2017.01) |
| *B31B 105/00* | (2017.01) |
| *B31B 110/10* | (2017.01) |
| *B31B 110/20* | (2017.01) |

(52) U.S. Cl.
CPC ...... *B29C 66/1122* (2013.01); *B29C 66/1282* (2013.01); *B29C 66/12881* (2013.01); *B29C 66/14* (2013.01); *B29C 66/4322* (2013.01); *B29C 66/7234* (2013.01); *B29C 66/727* (2013.01); *B32B 1/00* (2013.01); *B32B 1/08* (2013.01); *B32B 5/18* (2013.01); *B32B 7/02* (2013.01); *B32B 27/065* (2013.01); *B32B 27/08* (2013.01); *B32B 27/32* (2013.01); *B65D 81/38* (2013.01); *B65D 81/3867* (2013.01); *B65D 81/3869* (2013.01); *B65D 81/3874* (2013.01); *B65D 81/3876* (2013.01); *B65D 81/3879* (2013.01); *B65D 81/3881* (2013.01); *B65D 81/3886* (2013.01); *A47G 2023/0291* (2013.01); *B29C 65/02* (2013.01); *B29C 66/71* (2013.01); *B29C 66/73713* (2013.01); *B29L 2031/7132* (2013.01); *B31B 2100/00* (2017.08); *B31B 2100/0022* (2017.08); *B31B 2105/00* (2017.08); *B31B 2105/0022* (2017.08); *B31B 2110/10* (2017.08); *B31B 2110/20* (2017.08); *B32B 2266/025* (2013.01); *B32B 2307/304* (2013.01); *B32B 2307/4023* (2013.01); *B32B 2307/72* (2013.01); *Y10T 428/1352* (2015.01); *Y10T 428/1376* (2015.01); *Y10T 428/139* (2015.01); *Y10T 428/1393* (2015.01).

(56) References Cited

U.S. PATENT DOCUMENTS

| | | |
|---|---|---|
| 1,920,529 A | 8/1933 | Sidebotham |
| 1,969,030 A | 8/1934 | Page |
| 2,097,899 A | 11/1937 | Smith |
| 2,103,831 A | 12/1937 | Sidon |
| 2,809,776 A | 3/1956 | Barrington |
| 3,182,882 A | 5/1965 | Aellen, Jr. |
| 3,221,954 A | 12/1965 | Lux |
| 3,227,784 A | 1/1966 | Blades |
| 3,252,387 A | 5/1966 | Schur |
| 3,290,198 A | 12/1966 | Lux |
| 3,312,383 A | 4/1967 | Shapiro |
| 3,327,038 A | 6/1967 | Fox |
| 3,327,103 A | 6/1967 | Bonnet |
| 3,344,222 A | 9/1967 | Shapiro |
| 3,381,880 A | 5/1968 | Lewallen et al. |
| 3,409,204 A | 11/1968 | Carle |
| 3,431,163 A | 3/1969 | Harold |
| 3,443,715 A | 5/1969 | Bryant |
| 3,468,467 A | 9/1969 | Amberg |
| 3,547,012 A | 12/1970 | Amberg |
| 3,583,624 A | 6/1971 | Peacock |
| 3,658,615 A | 4/1972 | Amberg |
| 3,661,282 A | 5/1972 | Buhayar |
| 3,703,255 A * | 11/1972 | Wade ............. B65D 1/265 264/550 |
| 3,733,381 A | 5/1973 | Willette |
| 3,793,283 A | 2/1974 | Frailey |
| 3,846,349 A | 11/1974 | Harada |
| 3,892,828 A | 7/1975 | Weatherly |
| 3,907,193 A | 9/1975 | Heller |
| 3,919,368 A | 11/1975 | Seto |
| RE28,658 E * | 12/1975 | MacDaniel ........ B65D 47/36 229/5.5 |
| 3,967,991 A | 7/1976 | Shimano |
| 3,969,173 A | 7/1976 | Amberg |
| 3,971,696 A | 7/1976 | Manfredi |
| 3,973,721 A | 8/1976 | Nakane |
| 3,981,412 A | 9/1976 | Asmus |
| 4,026,458 A | 5/1977 | Morris |
| 4,036,675 A * | 7/1977 | Amberg ............. B29C 51/14 156/320 |
| 4,047,868 A | 9/1977 | Kudo |
| 4,049,122 A | 9/1977 | Maxwell |
| 4,070,513 A | 1/1978 | Rhoads |
| 4,106,397 A | 8/1978 | Amberg |
| 4,171,085 A | 10/1979 | Doty |
| 4,197,948 A | 4/1980 | Amberg |
| 4,206,166 A | 6/1980 | Hayashi |
| 4,220,730 A | 9/1980 | Coyne |
| 4,240,568 A | 12/1980 | Pool |
| 4,264,672 A | 4/1981 | Taylor-Brown |
| 4,284,226 A | 8/1981 | Herbst |
| 4,288,026 A | 9/1981 | Wilhelm |
| 4,298,331 A | 11/1981 | Mueller |
| 4,299,349 A | 11/1981 | Gilden |
| 4,300,891 A | 11/1981 | Bemiss |
| 4,306,849 A | 12/1981 | Cress |
| 4,310,369 A | 1/1982 | Miller |
| 4,349,400 A | 9/1982 | Gilden |
| 4,365,460 A | 12/1982 | Cress |
| 4,391,666 A | 7/1983 | Mueller |
| 4,409,045 A | 10/1983 | Busse |
| 4,435,344 A | 3/1984 | Iioka |
| 4,468,435 A | 8/1984 | Shimba et al. |
| 4,479,989 A | 10/1984 | Mahal |
| 4,490,130 A | 12/1984 | Konzal |
| 4,550,046 A | 10/1985 | Miller |
| 4,553,999 A | 11/1985 | Ziegler |
| 4,579,275 A | 4/1986 | Peelman |
| 4,604,324 A | 8/1986 | Nahmias |
| 4,621,763 A | 11/1986 | Brauner |
| 4,706,873 A | 11/1987 | Schulz |
| 4,720,023 A | 1/1988 | Jeff |
| 4,856,989 A | 8/1989 | Siebert |
| 4,867,664 A | 9/1989 | Fukuhara |
| 4,878,970 A | 11/1989 | Schubert |
| 4,911,978 A | 3/1990 | Tsubone |
| 4,918,112 A | 4/1990 | Roox |
| 4,940,736 A | 7/1990 | Alteepping |
| 4,990,382 A | 2/1991 | Weissenstein |
| 5,037,285 A | 8/1991 | Kudert |
| 5,037,684 A | 8/1991 | Dundas |

(56) References Cited

U.S. PATENT DOCUMENTS

| | | | |
|---|---|---|---|
| 5,055,022 A | 10/1991 | Hirschberger |
| 5,078,817 A | 1/1992 | Takagaki |
| 5,116,881 A | 5/1992 | Park |
| 5,149,579 A | 9/1992 | Park |
| 5,158,986 A | 10/1992 | Cha |
| 5,160,674 A | 11/1992 | Colton |
| 5,180,751 A | 1/1993 | Park |
| 5,236,963 A | 8/1993 | Jacoby |
| 5,256,462 A | 10/1993 | Callahan |
| 5,286,428 A | 2/1994 | Hayashi |
| 5,308,568 A | 5/1994 | Lipp |
| 5,328,651 A | 7/1994 | Gallagher |
| 5,332,121 A | 7/1994 | Schmidt |
| 5,348,795 A | 9/1994 | Park |
| 5,366,791 A | 11/1994 | Carr |
| 5,385,260 A | 1/1995 | Gatcomb |
| 5,405,667 A | 4/1995 | Heider |
| 5,443,769 A | 8/1995 | Karabedian |
| 5,445,315 A | 8/1995 | Shelby |
| 5,462,794 A * | 10/1995 | Lindemann ........... B29C 44/507 428/317.1 |
| 5,490,631 A | 2/1996 | Tioka |
| 5,507,640 A | 4/1996 | Gilmer |
| 5,547,124 A | 8/1996 | Mueller |
| 5,549,864 A | 8/1996 | Greene |
| 5,574,074 A | 11/1996 | Zushi |
| 5,575,965 A | 11/1996 | Caronia |
| 5,598,940 A | 2/1997 | Finkelstein |
| 5,601,200 A | 2/1997 | Finkelstein |
| 5,605,936 A | 2/1997 | DeNicola, Jr. |
| 5,622,308 A | 4/1997 | Ito |
| 5,628,453 A | 5/1997 | MacLaughlin |
| 5,629,076 A | 5/1997 | Fukasawa |
| 5,669,553 A | 9/1997 | Smith |
| 5,688,572 A | 11/1997 | Slat |
| 5,713,512 A | 2/1998 | Barrett |
| 5,759,624 A | 6/1998 | Neale |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko |
| 5,840,139 A | 11/1998 | Geddes |
| 5,857,572 A | 1/1999 | Bird |
| 5,866,053 A | 2/1999 | Park |
| 5,868,309 A | 2/1999 | Sandstrom |
| 5,895,614 A | 4/1999 | Rivera |
| 5,916,926 A | 6/1999 | Cooper |
| 5,925,450 A | 7/1999 | Karabedian |
| 5,927,525 A | 7/1999 | Darr |
| 5,928,741 A | 7/1999 | Andersen |
| 5,929,127 A | 7/1999 | Raetzsch |
| 5,944,225 A | 8/1999 | Kawolics |
| 5,948,839 A | 9/1999 | Chatterjee |
| 5,952,423 A | 9/1999 | Shang |
| 6,001,439 A | 12/1999 | Kawakami |
| 6,007,437 A | 12/1999 | Schickert |
| 6,010,062 A | 1/2000 | Shimono |
| 6,030,476 A | 2/2000 | Geddes |
| 6,034,144 A | 3/2000 | Shioya |
| 6,051,174 A | 4/2000 | Park |
| 6,053,214 A | 4/2000 | Sjoberg et al. |
| 6,071,580 A | 6/2000 | Bland |
| 6,077,878 A | 6/2000 | Okura |
| 6,083,611 A | 7/2000 | Eichbauer |
| 6,103,153 A | 8/2000 | Park |
| 6,109,518 A | 8/2000 | Mueller |
| 6,129,653 A | 10/2000 | Fredricks |
| 6,136,396 A | 10/2000 | Gilmer |
| 6,139,665 A | 10/2000 | Schmelzer |
| 6,142,331 A | 11/2000 | Breining |
| 6,169,122 B1 | 1/2001 | Blizard |
| 6,174,930 B1 | 1/2001 | Agarwal |
| 6,193,098 B1 | 2/2001 | Mochizuki |
| 6,218,023 B1 | 4/2001 | DeNicola |
| 6,221,925 B1 | 4/2001 | Constant |
| 6,225,366 B1 | 5/2001 | Raetzsch |
| 6,231,942 B1 | 5/2001 | Blizard |
| 6,235,380 B1 | 5/2001 | Tupil |
| 6,251,319 B1 | 6/2001 | Tusim |
| 6,257,485 B1 | 7/2001 | Sadlier |
| 6,258,862 B1 | 7/2001 | Matz |
| 6,267,837 B1 | 7/2001 | Mitchell |
| 6,284,810 B1 | 9/2001 | Burnham |
| 6,294,115 B1 | 9/2001 | Blizard |
| 6,306,973 B1 | 10/2001 | Takaoka |
| 6,308,883 B1 | 10/2001 | Schmelzer |
| 6,319,590 B1 | 11/2001 | Geddes |
| 6,323,251 B1 | 11/2001 | Perez |
| 6,328,916 B1 | 12/2001 | Nishikawa |
| 6,376,059 B1 | 4/2002 | Anderson |
| 6,378,733 B1 | 4/2002 | Boonzaier |
| 6,379,802 B2 | 4/2002 | Ito |
| 6,383,425 B1 | 5/2002 | Wu |
| 6,417,240 B1 | 7/2002 | Park |
| 6,420,024 B1 | 7/2002 | Perez |
| 6,432,525 B1 | 8/2002 | Gokuraku |
| 6,444,073 B1 | 9/2002 | Reeves |
| 6,444,149 B1 | 9/2002 | Valentinsson |
| 6,455,150 B1 | 9/2002 | Sheppard |
| 6,468,451 B1 | 10/2002 | Perez |
| 6,472,473 B1 | 10/2002 | Ansems |
| RE37,932 E | 12/2002 | Baldwin |
| 6,512,019 B1 | 1/2003 | Agarwal |
| 6,521,675 B1 | 2/2003 | Wu |
| 6,541,105 B1 | 4/2003 | Park |
| 6,562,447 B2 | 5/2003 | Wu |
| 6,565,934 B1 | 5/2003 | Fredricks |
| 6,586,532 B1 | 7/2003 | Gauthy |
| 6,593,005 B2 | 7/2003 | Tau |
| 6,593,384 B2 | 7/2003 | Anderson |
| 6,613,811 B1 | 9/2003 | Pallaver |
| 6,616,434 B1 | 9/2003 | Burnham |
| 6,646,019 B2 | 11/2003 | Perez |
| 6,649,666 B1 | 11/2003 | Read |
| 6,706,223 B1 | 3/2004 | Anderson |
| 6,713,139 B2 | 3/2004 | Usui |
| 6,720,362 B1 | 4/2004 | Park |
| 6,749,913 B2 | 6/2004 | Watanabe |
| 6,779,662 B2 | 8/2004 | Dorsey |
| 6,811,843 B2 | 11/2004 | DeBraal |
| 6,814,253 B2 | 11/2004 | Wong |
| 6,875,484 B1 | 4/2005 | Kogure |
| 6,875,826 B1 | 4/2005 | Huovinen |
| 6,883,677 B2 | 4/2005 | Goeking |
| 6,884,377 B1 | 4/2005 | Burnham |
| 6,884,851 B2 | 4/2005 | Gauthy |
| 6,908,651 B2 | 6/2005 | Watanabe |
| 6,921,571 B2 | 7/2005 | Funakoshi |
| 6,926,507 B2 | 8/2005 | Cardona |
| 6,926,512 B2 | 8/2005 | Wu |
| 6,982,107 B1 | 1/2006 | Hennen |
| 6,986,922 B2 | 1/2006 | Hesse |
| 7,014,801 B2 | 3/2006 | Imanari |
| 7,056,563 B2 | 6/2006 | Halabisky |
| 7,070,852 B1 | 7/2006 | Reiners |
| 7,074,466 B2 | 7/2006 | DeBraal |
| 7,094,463 B2 | 8/2006 | Haas |
| 7,121,991 B2 | 10/2006 | Mannlein |
| 7,144,532 B2 | 12/2006 | Kim |
| 7,169,338 B2 | 1/2007 | Imanari |
| 7,173,069 B2 | 2/2007 | Swennen |
| 7,183,005 B2 | 2/2007 | Poloso |
| 7,234,629 B2 | 6/2007 | Ho |
| 7,281,650 B1 | 10/2007 | Milan |
| 7,311,243 B1 * | 12/2007 | Konzal ................. B65D 3/14 229/4.5 |
| 7,355,089 B2 | 4/2008 | Chang |
| 7,361,720 B2 | 4/2008 | Pierini |
| 7,365,136 B2 | 4/2008 | Huovinen |
| 7,423,071 B2 | 9/2008 | Mogami |
| 7,458,504 B2 | 12/2008 | Robertson |
| 7,462,307 B2 | 12/2008 | Hesse |
| 7,504,347 B2 | 3/2009 | Poon |
| 7,510,098 B2 | 3/2009 | Hartjes |

(56) References Cited

U.S. PATENT DOCUMENTS

| | | |
|---|---|---|
| 7,513,386 B2 | 4/2009 | Hartjes |
| 7,514,517 B2 | 4/2009 | Hoenig |
| 7,524,911 B2 | 4/2009 | Karjala |
| 7,546,932 B2 * | 6/2009 | Smith ............... B65D 1/46 |
| | | 220/675 |
| 7,557,147 B2 | 7/2009 | Martinez |
| 7,579,408 B2 | 8/2009 | Walton |
| 7,582,716 B2 | 9/2009 | Liang |
| 7,585,557 B2 | 9/2009 | Aylward |
| 7,588,808 B2 | 9/2009 | Hutchinson |
| 7,588,810 B2 | 9/2009 | Semersky |
| 7,592,397 B2 | 9/2009 | Markovich |
| 7,608,668 B2 | 10/2009 | Shan |
| 7,622,179 B2 | 11/2009 | Patel |
| 7,622,529 B2 | 11/2009 | Walton |
| 7,629,416 B2 | 12/2009 | Li |
| 7,655,296 B2 | 2/2010 | Haas |
| 7,662,881 B2 | 2/2010 | Walton |
| 7,666,918 B2 | 2/2010 | Prieto |
| 7,671,106 B2 | 3/2010 | Markovich |
| 7,671,131 B2 | 3/2010 | Hughes |
| 7,673,564 B2 | 3/2010 | Wolf |
| 7,687,442 B2 | 3/2010 | Walton |
| 7,695,812 B2 | 4/2010 | Peng |
| 7,704,440 B2 | 4/2010 | Brandner |
| 7,714,071 B2 | 5/2010 | Hoenig |
| 7,732,052 B2 | 6/2010 | Chang |
| 7,737,061 B2 | 6/2010 | Chang |
| 7,737,215 B2 | 6/2010 | Chang |
| 7,741,397 B2 | 6/2010 | Liang |
| 7,754,814 B2 | 7/2010 | Barcus |
| 7,759,267 B2 | 7/2010 | Conover |
| 7,759,404 B2 | 7/2010 | Burgun |
| 7,786,216 B2 | 8/2010 | Soediono |
| 7,795,321 B2 | 9/2010 | Cheung |
| 7,803,728 B2 | 9/2010 | Poon |
| 7,811,644 B2 | 10/2010 | DeBraal |
| 7,818,866 B2 | 10/2010 | Hollis |
| 7,820,282 B2 | 10/2010 | Haas |
| 7,825,166 B2 | 11/2010 | Sasaki |
| 7,841,974 B2 | 11/2010 | Hartjes |
| 7,842,770 B2 | 11/2010 | Liang |
| 7,858,706 B2 | 12/2010 | Arriola |
| 7,863,379 B2 | 1/2011 | Kapur |
| 7,871,558 B2 | 1/2011 | Merical |
| 7,883,769 B2 | 2/2011 | Seth |
| 7,893,166 B2 | 2/2011 | Shan |
| 7,897,689 B2 | 3/2011 | Harris |
| 7,906,587 B2 | 3/2011 | Poon |
| 7,910,658 B2 | 3/2011 | Chang |
| 7,915,192 B2 | 3/2011 | Arriola |
| 7,918,005 B2 | 4/2011 | Hollis |
| 7,918,016 B2 | 4/2011 | Hollis |
| 7,922,071 B2 | 4/2011 | Robertson |
| 7,928,162 B2 | 4/2011 | Kiss |
| 7,935,740 B2 | 5/2011 | Dang |
| 7,947,367 B2 | 5/2011 | Poon |
| 7,951,882 B2 | 5/2011 | Arriola |
| 7,973,100 B2 | 7/2011 | Wada |
| 7,977,397 B2 | 7/2011 | Cheung |
| 7,989,543 B2 | 8/2011 | Karjala |
| 7,993,254 B2 | 8/2011 | Robertson |
| 7,998,579 B2 | 8/2011 | Lin |
| 7,998,728 B2 | 8/2011 | Rhoads |
| 8,003,176 B2 | 8/2011 | Ylitalo |
| 8,003,744 B2 | 8/2011 | Okamoto |
| 8,012,550 B2 | 9/2011 | Ylitalo |
| 8,026,291 B2 | 9/2011 | Handa |
| 8,043,695 B2 | 10/2011 | Ballard |
| 8,061,540 B2 | 11/2011 | Toyoda |
| 8,061,541 B2 | 11/2011 | Trumpp |
| 8,067,319 B2 | 11/2011 | Poon |
| 8,076,381 B2 | 12/2011 | Miyagawa |
| 8,076,416 B2 | 12/2011 | Ellul |
| 8,084,537 B2 | 12/2011 | Walton |
| 8,087,147 B2 | 1/2012 | Hollis |
| 8,105,459 B2 | 1/2012 | Alvarez |
| 8,119,237 B2 | 2/2012 | Peng |
| 8,124,203 B2 | 2/2012 | Semersky |
| 8,124,234 B2 | 2/2012 | Weaver |
| 8,137,600 B2 | 3/2012 | Pierick |
| 8,173,233 B2 | 5/2012 | Rogers |
| 8,198,374 B2 | 6/2012 | Arriola |
| 8,211,982 B2 | 7/2012 | Harris |
| 8,227,075 B2 | 7/2012 | Matsushita |
| 8,263,198 B2 | 9/2012 | Carvell |
| 8,273,068 B2 | 9/2012 | Chang |
| 8,273,826 B2 | 9/2012 | Walton |
| 8,273,838 B2 | 9/2012 | Shan |
| 8,288,470 B2 | 10/2012 | Ansems |
| 8,304,496 B2 | 11/2012 | Weaver |
| 8,342,420 B2 | 1/2013 | Roberts, Jr. |
| 8,397,932 B2 | 3/2013 | Ichikawa |
| 8,404,780 B2 | 3/2013 | Weaver |
| 8,414,823 B2 | 4/2013 | Rudiger |
| 8,435,615 B2 | 5/2013 | Tsuchida |
| 8,444,905 B2 | 5/2013 | Li |
| 8,535,598 B2 | 9/2013 | Imanari |
| 8,679,620 B2 | 3/2014 | Matsushita |
| 8,715,449 B2 | 5/2014 | Leser |
| 8,721,823 B2 | 5/2014 | Vaideeswaran |
| 8,795,827 B2 | 8/2014 | Siche |
| 8,883,280 B2 | 11/2014 | Leser |
| 9,067,705 B2 | 6/2015 | Leser |
| 9,102,461 B2 | 8/2015 | Leser |
| 9,180,995 B2 | 11/2015 | Iyori |
| 9,346,605 B2 * | 5/2016 | Leser ............... B29C 66/14 |
| 9,358,772 B2 | 6/2016 | Leser |
| 9,447,248 B2 | 9/2016 | Sun |
| 9,688,456 B2 * | 6/2017 | Euler ............ B65D 81/3867 |
| 9,758,292 B2 * | 9/2017 | Leser ............... B65D 3/14 |
| 9,758,293 B2 | 9/2017 | Leser |
| 9,937,652 B2 | 4/2018 | Sun |
| 9,993,098 B2 | 6/2018 | Leser |
| 10,011,696 B2 | 7/2018 | Leser |
| 10,059,037 B2 | 8/2018 | Li |
| 10,266,664 B2 | 4/2019 | Sun |
| 10,899,532 B2 * | 1/2021 | Leser ............ B29C 66/1122 |
| 10,906,725 B2 * | 2/2021 | Leser ............ B29C 66/4322 |
| 11,091,311 B2 * | 8/2021 | Euler ............ B65D 81/3874 |
| 11,214,429 B2 | 1/2022 | Euler |
| 2001/0010848 A1 | 8/2001 | Usui |
| 2001/0010849 A1 | 8/2001 | Blizard |
| 2001/0036520 A1 | 11/2001 | Hall |
| 2001/0038893 A1 | 11/2001 | Mohan |
| 2001/0039299 A1 | 11/2001 | Park |
| 2001/0041236 A1 | 11/2001 | Usui |
| 2001/0048988 A1 | 12/2001 | Forte |
| 2002/0006975 A1 | 1/2002 | Welsh |
| 2002/0030296 A1 | 3/2002 | Geddes |
| 2002/0035164 A1 | 3/2002 | Wu |
| 2002/0041046 A1 | 4/2002 | Hartjes |
| 2002/0058126 A1 | 5/2002 | Kannankeril |
| 2002/0122905 A1 | 9/2002 | Andersson |
| 2002/0135088 A1 | 9/2002 | Harfmann |
| 2002/0137851 A1 | 9/2002 | Kim |
| 2002/0144769 A1 | 10/2002 | Debraal |
| 2002/0172739 A1 | 11/2002 | Anderson |
| 2002/0172818 A1 | 11/2002 | DeBraal |
| 2003/0003251 A1 | 1/2003 | DeBraal |
| 2003/0017284 A1 | 1/2003 | Watanabe |
| 2003/0021921 A1 | 1/2003 | DeBraal |
| 2003/0021927 A1 | 1/2003 | Boenig |
| 2003/0029876 A1 | 2/2003 | Giraud |
| 2003/0065097 A1 | 4/2003 | Degroot |
| 2003/0069362 A1 | 4/2003 | Ramanathan |
| 2003/0108695 A1 | 6/2003 | Freek |
| 2003/0114594 A1 | 6/2003 | Starita |
| 2003/0127765 A1 | 7/2003 | Weiland |
| 2003/0138515 A1 | 7/2003 | Harfmann |
| 2003/0151172 A1 | 8/2003 | Floyd |
| 2003/0186039 A1 | 10/2003 | Hanada |
| 2003/0211310 A1 | 11/2003 | Haas |
| 2003/0211350 A1 | 11/2003 | Migliorini |

(56) References Cited

U.S. PATENT DOCUMENTS

| | | |
|---|---|---|
| 2003/0228336 A1 | 12/2003 | Gervasio |
| 2003/0232210 A1 | 12/2003 | Haas |
| 2004/0013830 A1 | 1/2004 | Nonomura |
| 2004/0031714 A1 | 2/2004 | Hanson |
| 2004/0037980 A1 | 2/2004 | DeBraal |
| 2004/0038018 A1 | 2/2004 | Anderson |
| 2004/0062885 A1 | 4/2004 | Imanari |
| 2004/0086703 A1 | 5/2004 | Semersky |
| 2004/0115418 A1 | 6/2004 | Anderson |
| 2004/0147625 A1 | 7/2004 | Dostal |
| 2004/0162358 A1 | 8/2004 | Yamamoto |
| 2004/0162363 A1 | 8/2004 | Mochizuki |
| 2004/0170814 A1 | 9/2004 | VanHandel |
| 2005/0003122 A1 | 1/2005 | Debraal |
| 2005/0006449 A1 | 1/2005 | DAmato |
| 2005/0009973 A1 | 1/2005 | Lee |
| 2005/0040218 A1 | 2/2005 | Hinchey |
| 2005/0101926 A1 | 5/2005 | Ausen |
| 2005/0104365 A1 | 5/2005 | Haas |
| 2005/0115975 A1 | 6/2005 | Smith |
| 2005/0121457 A1 | 6/2005 | Wilson |
| 2005/0124709 A1 | 6/2005 | Krueger |
| 2005/0145317 A1 | 7/2005 | Yamamoto |
| 2005/0147807 A1 | 7/2005 | Haas |
| 2005/0159496 A1 | 7/2005 | Bambara |
| 2005/0165165 A1 | 7/2005 | Zwynenburg |
| 2005/0184136 A1 | 8/2005 | Baynum |
| 2005/0236294 A1 | 10/2005 | Herbert |
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |
| 2006/0073298 A1 | 4/2006 | Hutchinson |
| 2006/0091576 A1 | 5/2006 | Takase |
| 2006/0094577 A1 | 5/2006 | Mannlein |
| 2006/0095151 A1 | 5/2006 | Mannlein |
| 2006/0100296 A1 | 5/2006 | Wilkes |
| 2006/0108409 A1 | 5/2006 | Pyper |
| 2006/0135679 A1 | 6/2006 | Winowiecki |
| 2006/0135699 A1 | 6/2006 | Li |
| 2006/0142495 A1 | 6/2006 | Lalho |
| 2006/0148920 A1 | 7/2006 | Musgrave |
| 2006/0151584 A1 | 7/2006 | Wonnacott |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0255049 A1 | 11/2006 | McCarthy |
| 2006/0286325 A1 | 12/2006 | Swoboda |
| 2006/0289609 A1 | 12/2006 | Fritz |
| 2006/0289610 A1 | 12/2006 | Kling |
| 2007/0000983 A1 | 1/2007 | Spurrell |
| 2007/0010616 A1 | 1/2007 | Kapur |
| 2007/0013110 A1 | 1/2007 | Safian |
| 2007/0032600 A1 | 2/2007 | Mogami |
| 2007/0056964 A1 | 3/2007 | Holcomb |
| 2007/0065615 A1 | 3/2007 | Odle |
| 2007/0066756 A1 | 3/2007 | Poon |
| 2007/0078222 A1 | 4/2007 | Chang |
| 2007/0095837 A1 | 5/2007 | Meier |
| 2007/0112127 A1 | 5/2007 | Soediono |
| 2007/0141188 A1 | 6/2007 | Kim |
| 2007/0155900 A1 | 7/2007 | Chang |
| 2007/0167315 A1 | 7/2007 | Arriola |
| 2007/0167575 A1 | 7/2007 | Weaver |
| 2007/0167578 A1 | 7/2007 | Arriola |
| 2007/0202330 A1 | 8/2007 | Peng |
| 2007/0219334 A1 | 9/2007 | LiPiShan |
| 2008/0020162 A1 | 1/2008 | Fackler |
| 2008/0044617 A1 | 2/2008 | Schmitz |
| 2008/0045638 A1 | 2/2008 | Chapman |
| 2008/0095960 A1 | 4/2008 | Schell |
| 2008/0114131 A1 | 5/2008 | Harris |
| 2008/0118738 A1 | 5/2008 | Boyer |
| 2008/0121681 A1 | 5/2008 | Wiedmeyer |
| 2008/0125547 A1 | 5/2008 | Swogger |
| 2008/0138593 A1 | 6/2008 | Martinez |
| 2008/0156857 A1 | 7/2008 | Johnston |
| 2008/0177242 A1 | 7/2008 | Chang |
| 2008/0185301 A1 | 8/2008 | Merical |
| 2008/0187694 A1 | 8/2008 | Alvarez |
| 2008/0227877 A1 | 9/2008 | Stadlbauer |
| 2008/0234435 A1 | 9/2008 | Chang |
| 2008/0246193 A1 | 10/2008 | Smits |
| 2008/0260996 A1 | 10/2008 | Heilman |
| 2008/0261016 A1 | 10/2008 | Tamada |
| 2008/0269388 A1 | 10/2008 | Markovich |
| 2008/0280517 A1 | 11/2008 | Chang |
| 2008/0281037 A1 | 11/2008 | Karjala |
| 2008/0302800 A1 | 12/2008 | Chou |
| 2008/0311812 A1 | 12/2008 | Arriola |
| 2009/0041965 A1 | 2/2009 | Kochem |
| 2009/0042472 A1 | 2/2009 | Poon |
| 2009/0068402 A1 | 3/2009 | Yoshida |
| 2009/0069523 A1 | 3/2009 | Itakura |
| 2009/0076216 A1 | 3/2009 | Kiss |
| 2009/0096130 A1 | 4/2009 | Jones |
| 2009/0105417 A1 | 4/2009 | Walton |
| 2009/0110855 A1 | 4/2009 | McCarthy |
| 2009/0110944 A1 | 4/2009 | Aguirre |
| 2009/0170679 A1 | 7/2009 | Hartjes |
| 2009/0220711 A1 | 9/2009 | Chang |
| 2009/0247033 A1 | 10/2009 | Peng |
| 2009/0263645 A1 | 10/2009 | Barger |
| 2009/0269566 A1 | 10/2009 | Eichbauer |
| 2009/0275690 A1 | 11/2009 | Weaver |
| 2009/0324914 A1 | 12/2009 | Lieng |
| 2010/0000183 A1 | 1/2010 | Nantin |
| 2010/0025073 A1 | 2/2010 | Fagrell |
| 2010/0028568 A1 | 2/2010 | Weaver |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0108695 A1 | 5/2010 | Zhang |
| 2010/0112247 A1 | 5/2010 | Raesaenen |
| 2010/0116422 A1 | 5/2010 | Vaideeswaran |
| 2010/0137118 A1 | 6/2010 | Chang |
| 2010/0147447 A1 | 6/2010 | Mazzarolo |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0196641 A1 | 8/2010 | Devos |
| 2010/0215879 A1 | 8/2010 | Dooley |
| 2010/0215934 A1 | 8/2010 | Fabian Mariezkurrena |
| 2010/0227092 A1 | 9/2010 | Semersky |
| 2010/0240818 A1 | 9/2010 | Walton |
| 2010/0247830 A1* | 9/2010 | Hernandez ............ B65D 1/265 428/36.92 |
| 2010/0279046 A1 | 11/2010 | Ashman |
| 2010/0279571 A1 | 11/2010 | Poon |
| 2010/0282759 A1 | 11/2010 | Eckhardt |

(56) References Cited

U.S. PATENT DOCUMENTS

| | | |
|---|---|---|
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0014835 A1 | 1/2011 | Sieradzki |
| 2011/0091688 A1 | 4/2011 | Maurer |
| 2011/0104414 A1 | 5/2011 | Onodera |
| 2011/0111150 A1 | 5/2011 | Matsuzaki |
| 2011/0118370 A1 | 5/2011 | Jiang |
| 2011/0118416 A1 | 5/2011 | Arriola |
| 2011/0124818 A1 | 5/2011 | Arriola |
| 2011/0129656 A1 | 6/2011 | Zur |
| 2011/0136959 A1 | 6/2011 | Brandstetter |
| 2011/0144240 A1 | 6/2011 | Harris |
| 2011/0172363 A1 | 7/2011 | Share |
| 2011/0180509 A1 | 7/2011 | Hutchinson |
| 2011/0192750 A1 | 8/2011 | Kokin |
| 2011/0217492 A1 | 9/2011 | Stamatiou |
| 2011/0229693 A1 | 9/2011 | Maurer |
| 2011/0230108 A1 | 9/2011 | Arriola |
| 2011/0250384 A1 | 10/2011 | Sumi |
| 2011/0285048 A1 | 11/2011 | Barger |
| 2011/0293914 A1 | 12/2011 | Maurer |
| 2011/0318560 A1 | 12/2011 | Yun |
| 2012/0004087 A1 | 1/2012 | Tharayil |
| 2012/0024459 A1 | 2/2012 | Igarashi |
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0061886 A1 | 3/2012 | Sumi |
| 2012/0076965 A1 | 3/2012 | Silvers |
| 2012/0103858 A1 | 5/2012 | Schmidt |
| 2012/0108714 A1 | 5/2012 | Wittner |
| 2012/0108741 A1 | 5/2012 | Wu |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199279 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | VanHorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2012/0318859 A1 | 12/2012 | Leser |
| 2013/0023598 A1 | 1/2013 | Song |
| 2013/0026128 A1 | 1/2013 | Beck |
| 2013/0032963 A1 | 2/2013 | Tokiwa |
| 2013/0052358 A1 | 2/2013 | Alessandro |
| 2013/0052385 A1 | 2/2013 | Leser |
| 2013/0059102 A1 | 3/2013 | Torchio |
| 2013/0085244 A1 | 4/2013 | Zhao |
| 2013/0140320 A1 | 6/2013 | Nadella |
| 2013/0143975 A1 | 6/2013 | Cassidy |
| 2013/0216744 A1 | 8/2013 | Liao |
| 2013/0280517 A1 | 10/2013 | Buehring |
| 2013/0303645 A1 | 11/2013 | Dix |
| 2014/0037880 A1 | 2/2014 | Siddhamalli |
| 2014/0116977 A1 | 5/2014 | Minnette |
| 2014/0131430 A1 | 5/2014 | Leser |
| 2014/0166738 A1 | 6/2014 | Euler |
| 2014/0167311 A1 | 6/2014 | Leser |
| 2014/0228498 A1 | 8/2014 | Prince |
| 2014/0262916 A1 | 9/2014 | Minnette |
| 2014/0263367 A1 | 9/2014 | Robertson |
| 2014/0272229 A1 | 9/2014 | Xing |
| 2014/0309320 A1 | 10/2014 | Prince |
| 2014/0361013 A1 | 12/2014 | Perick |
| 2014/0377512 A1 | 12/2014 | Rogers |
| 2015/0014879 A1 | 1/2015 | Sun |
| 2015/0051302 A1 | 2/2015 | Leser |
| 2015/0061194 A1 | 3/2015 | Sun |
| 2015/0250342 A1 | 9/2015 | Euler |
| 2015/0258771 A1 | 9/2015 | Leser |
| 2015/0284521 A1 | 10/2015 | Abubakar |
| 2015/0307679 A1 | 10/2015 | Lee |
| 2016/0082692 A1 | 3/2016 | Li |
| 2016/0082693 A1 | 3/2016 | Li |
| 2016/0089852 A1 | 3/2016 | Lindenfelzer |
| 2016/0137804 A1 | 5/2016 | Van Der Ven |
| 2016/0257030 A1 | 9/2016 | Sun |
| 2016/0257052 A1 | 9/2016 | Sun |
| 2016/0257799 A1 | 9/2016 | Sun |
| 2016/0355659 A1 | 12/2016 | Sun |
| 2017/0002117 A1 | 1/2017 | Layman |
| 2017/0174865 A1 | 6/2017 | Dhaliwal |
| 2017/0232715 A1 | 8/2017 | Fehr |
| 2018/0099798 A1 | 4/2018 | Lehrter |
| 2018/0201752 A1 | 7/2018 | Lin |
| 2018/0354237 A1 | 12/2018 | De Jonge |
| 2019/0045954 A1 | 2/2019 | Euler |
| 2019/0047265 A1 | 2/2019 | Euler |
| 2020/0361184 A1 | 11/2020 | Saniei |

FOREIGN PATENT DOCUMENTS

| | | |
|---|---|---|
| CA | 2078123 | 9/1991 |
| CA | 2291607 | 6/2000 |
| CA | 2291607 A1 | 6/2000 |
| CA | 2765489 | 12/2010 |
| CA | 2752335 | 3/2012 |
| CN | 1118239 A | 3/1996 |
| CN | 1288427 | 3/2001 |
| CN | 1484602 | 3/2004 |
| CN | 1495100 | 5/2004 |
| CN | 1523051 | 8/2004 |
| CN | 1942370 | 4/2007 |
| CN | 1984763 | 6/2007 |
| CN | 101044195 | 9/2007 |
| CN | 101098918 A | 1/2008 |
| CN | 101104716 | 1/2008 |
| CN | 101352923 | 1/2009 |
| CN | 101370873 | 2/2009 |
| CN | 101429309 | 5/2009 |
| CN | 101456927 A | 6/2009 |
| CN | 101531260 | 9/2009 |
| CN | 101538387 | 9/2009 |
| CN | 101560307 | 10/2009 |
| CN | 201347706 Y | 11/2009 |
| CN | 102030960 | 4/2011 |
| CN | 102070841 A | 5/2011 |
| CN | 102089370 | 6/2011 |
| CN | 102115561 | 7/2011 |
| CN | 102115561 A | 7/2011 |
| CN | 102245368 | 11/2011 |
| CN | 102313084 | 1/2012 |
| CN | 102391570 | 3/2012 |
| CN | 102762350 | 10/2012 |
| CN | 102892678 A | 1/2013 |
| DE | 2831240 | 1/1980 |
| DE | 2831240 C | 3/1988 |
| DE | 102006025612 A1 | 11/2007 |
| DE | 102008031812 | 12/2009 |
| EP | 0001791 | 5/1979 |
| EP | 0086869 | 8/1983 |
| EP | 0086869 A1 | 8/1983 |
| EP | 0161597 | 11/1985 |
| EP | 0318167 | 5/1989 |
| EP | 0318167 A2 | 5/1989 |
| EP | 0329490 A2 | 8/1989 |
| EP | 0520028 | 12/1992 |
| EP | 0570221 | 11/1993 |
| EP | 0588321 | 3/1994 |
| EP | 0659647 | 6/1995 |

(56) References Cited

FOREIGN PATENT DOCUMENTS

| | | |
|---|---|---|
| EP | 713481 A1 | 5/1996 |
| EP | 0851805 A1 | 7/1998 |
| EP | 0879844 | 11/1998 |
| EP | 0851805 B1 | 12/1998 |
| EP | 960826 A2 * | 12/1999 ........... B29C 43/222 |
| EP | 0972727 | 1/2000 |
| EP | 1040158 A1 | 10/2000 |
| EP | 1057608 A2 | 12/2000 |
| EP | 1072389 A1 | 1/2001 |
| EP | 0796199 | 2/2001 |
| EP | 0940240 | 10/2002 |
| EP | 1308263 | 5/2003 |
| EP | 1323779 | 7/2003 |
| EP | 1449634 A1 | 8/2004 |
| EP | 1479716 | 11/2004 |
| EP | 1472087 | 4/2006 |
| EP | 1666530 | 6/2006 |
| EP | 1704047 | 9/2006 |
| EP | 1741744 | 1/2007 |
| EP | 1749634 A2 | 2/2007 |
| EP | 1754744 | 2/2007 |
| EP | 1921023 A1 | 5/2008 |
| EP | 1939099 | 7/2008 |
| EP | 1939099 A1 | 7/2008 |
| EP | 0851805 | 12/2008 |
| EP | 2141000 A2 | 1/2010 |
| EP | 2266894 | 12/2010 |
| EP | 2386584 A1 | 11/2011 |
| EP | 2386601 | 11/2011 |
| EP | 1040158 | 4/2012 |
| EP | 1749635 | 9/2012 |
| EP | 2323829 | 10/2012 |
| EP | 2554374 A1 | 2/2013 |
| EP | 2141000 | 2/2014 |
| EP | 2720954 | 4/2014 |
| EP | 2912142 A4 | 3/2016 |
| GB | 1078326 | 8/1967 |
| GB | 2322100 | 8/1998 |
| GB | 2485077 | 5/2012 |
| GB | 2485077 A | 5/2012 |
| GB | 2504166 A | 1/2014 |
| GB | 2506796 | 4/2014 |
| GB | 2506796 A | 4/2014 |
| JP | 52123043 U | 10/1977 |
| JP | S5641146 A | 4/1981 |
| JP | 58029618 | 2/1983 |
| JP | H02129040 U | 5/1990 |
| JP | H02269683 | 11/1990 |
| JP | 404278340 A | 10/1992 |
| JP | H0543967 | 6/1993 |
| JP | 0615751 | 1/1994 |
| JP | 3140847 | 1/1994 |
| JP | 06192460 | 7/1994 |
| JP | H06322167 A | 11/1994 |
| JP | H08067758 | 3/1996 |
| JP | 410000748 A | 1/1998 |
| JP | 2000128255 | 5/2000 |
| JP | P310847 | 12/2000 |
| JP | 2001138378 A | 5/2001 |
| JP | 2001139717 A | 5/2001 |
| JP | 2001310429 | 11/2001 |
| JP | 2001315277 | 11/2001 |
| JP | 2001329099 A | 11/2001 |
| JP | 2001348454 A | 12/2001 |
| JP | 2003292663 | 10/2003 |
| JP | 2003321566 | 11/2003 |
| JP | 200418101 | 1/2004 |
| JP | 2004018101 | 1/2004 |
| JP | 2004067820 A | 3/2004 |
| JP | 2004137377 A | 5/2004 |
| JP | 2004168421 A | 6/2004 |
| JP | 2004330464 | 11/2004 |
| JP | 2005053494 A | 3/2005 |
| JP | 2005138508 A | 6/2005 |
| JP | 2005272542 | 10/2005 |
| JP | 2005290329 A | 10/2005 |
| JP | 2006008988 A | 1/2006 |
| JP | 2006096390 | 4/2006 |
| JP | 2006130814 A | 5/2006 |
| JP | 2006142008 A | 6/2006 |
| JP | 200791323 | 4/2007 |
| JP | 2007154172 | 6/2007 |
| JP | 2008162700 | 7/2008 |
| JP | 2008213491 A | 9/2008 |
| JP | 2009504858 | 2/2009 |
| JP | 2009066856 A | 4/2009 |
| JP | 2009126922 | 6/2009 |
| JP | 2009138029 | 6/2009 |
| JP | 2009190756 A | 8/2009 |
| JP | 2010173258 | 8/2010 |
| JP | 2011104890 | 6/2011 |
| JP | 2011132420 A | 7/2011 |
| JP | 2011207958 A | 10/2011 |
| JP | 2011212968 A | 10/2011 |
| JP | 2012526006 | 10/2012 |
| JP | 2013203886 | 10/2013 |
| JP | 2018002213 A | 1/2018 |
| KR | 100306320 | 10/2001 |
| KR | 2003036558 | 5/2003 |
| KR | 2004017234 | 2/2004 |
| KR | 101196666 | 11/2012 |
| MX | 2004008491 A | 7/2005 |
| MX | 347519 | 4/2014 |
| RU | 2232781 C2 | 7/2004 |
| RU | 2254347 C2 | 6/2005 |
| TW | 393427 | 6/2000 |
| TW | 200404848 | 4/2004 |
| TW | M362648 | 8/2009 |
| TW | 201021747 | 6/2010 |
| TW | 201021747 A | 6/2010 |
| TW | 201309757 | 3/2013 |
| WO | 9113933 | 9/1991 |
| WO | 1991013933 | 9/1991 |
| WO | 9413460 | 6/1994 |
| WO | 1994013460 | 6/1994 |
| WO | 1994013460 A1 | 6/1994 |
| WO | 9504709 | 2/1995 |
| WO | 9729150 | 8/1997 |
| WO | WO-9729150 A1 * | 8/1997 ................ C08J 9/04 |
| WO | 1998016575 | 4/1998 |
| WO | 9932544 A1 | 7/1999 |
| WO | 0002800 | 1/2000 |
| WO | 0119733 | 3/2001 |
| WO | 0132758 | 5/2001 |
| WO | 0140374 A2 | 6/2001 |
| WO | 0153079 | 7/2001 |
| WO | 0170859 A2 | 9/2001 |
| WO | 0234824 | 5/2002 |
| WO | 2003066320 | 8/2003 |
| WO | 03076497 | 9/2003 |
| WO | 03099913 | 12/2003 |
| WO | 2004104075 | 12/2004 |
| WO | 2005097878 | 10/2005 |
| WO | 2006042908 | 4/2006 |
| WO | 2006124369 | 11/2006 |
| WO | 2007003523 | 1/2007 |
| WO | 2007003523 A1 | 1/2007 |
| WO | 2007020074 | 2/2007 |
| WO | 2007068766 | 6/2007 |
| WO | 2007090845 A2 | 8/2007 |
| WO | 2008030953 | 3/2008 |
| WO | 2008038750 | 4/2008 |
| WO | 2008045944 | 4/2008 |
| WO | 2008057878 | 5/2008 |
| WO | 2008080111 | 7/2008 |
| WO | 2008145267 | 12/2008 |
| WO | 2009035580 | 3/2009 |
| WO | 2010006272 | 1/2010 |
| WO | 2010015673 | 2/2010 |
| WO | 2010019146 | 2/2010 |
| WO | 2010076701 A1 | 7/2010 |
| WO | 2010111869 | 10/2010 |
| WO | 2010151724 | 12/2010 |
| WO | 2011005856 | 1/2011 |

(56) References Cited

FOREIGN PATENT DOCUMENTS

| WO | 2011036272 | | 3/2011 |
|---|---|---|---|
| WO | 2011036272 | A2 | 3/2011 |
| WO | 2011038081 | | 3/2011 |
| WO | 2011038081 | A1 | 3/2011 |
| WO | 2011076637 | | 6/2011 |
| WO | 2011141044 | | 11/2011 |
| WO | 2011144705 | | 11/2011 |
| WO | 2012020106 | | 2/2012 |
| WO | 2012020106 | A1 | 2/2012 |
| WO | 2012025584 | | 3/2012 |
| WO | 2012025584 | A1 | 3/2012 |
| WO | 2012044730 | | 4/2012 |
| WO | 2012055797 | | 5/2012 |
| WO | 2012099682 | | 7/2012 |
| WO | 2012173873 | | 12/2012 |
| WO | 2012174422 | | 12/2012 |
| WO | 2012174567 | A1 | 12/2012 |
| WO | 2012174567 | A2 | 12/2012 |
| WO | 2012174568 | | 12/2012 |
| WO | 2013032552 | | 3/2013 |
| WO | 2012174567 | A3 | 4/2013 |
| WO | 2013101301 | | 7/2013 |
| WO | 2014066761 | | 5/2014 |
| WO | 2014099335 | | 6/2014 |
| WO | 2015024018 | | 2/2015 |

OTHER PUBLICATIONS

German Office Action for German App. No. 11 2012 00 070.2 dated Dec. 23, 2022, 12 pages, (No English Translation Available).
Combined Search and Examination Report for Great Britain App. No. GB2010642.3 dated Mar. 31, 2021, 3 pages.
Office Action dated Apr. 30, 2019 for U.S. Appl. No. 15/004,263 (pp. 1-10).
Office Action dated Apr. 5, 2019 for U.S. Appl. No. 15/651,284, pp. 1-5.
Notice to Attend Hearing for Indian Patent App. No. 2179/DELNP/2014 dated Aug. 17, 2020, 2 pages.
Mexican Office Action for Mexican App. No. MX/a/2014/002373 issued Jul. 1, 2019, 7 pages.
ISO, "Plastics—Determination of drawing characteristics of thermoplastics in the molten state", ISO, First edition, Jun. 15, 2005, 22 pages.
Mexican Office Action for Mexican App. No. MX/a/2014/002373 issued Mar. 6, 2020, 10 pages.
Canadian Examiner's Report and Examination Search Report for Canadian App. No. 2,889,280, dated Apr. 14, 2020, 5 pages.
Canadian Examiner's Report and Examination Search Report for Canadian App. No. 2,889,280, dated Oct. 27, 2020, 4 pages.
Mexican Office Action for Mexican Patent App. No. MX/a/2015005207 dated Jul. 22, 2020, 5 pages.
Examination Report for Indian Patent App. No. 5758/DELNP/2015 dated Aug. 28, 2019, 7 pages.
First Examination Report for Indian App. No. 5756/DELNP/2015 dated Dec. 12, 2019, 5 pages.
First Examination Report for Indian App. No. 5804/DELNP/2015, sent Aug. 5, 2019, 7 pages.
Indian First Examination Report for Indian Application No. 8947/DELNP/2015 dated Jul. 18, 2019, 7 pages.
Office Action dated Jul. 26, 2019 for U.S. Appl. No. 16/149,351, (pp. 1-6).
Office Action dated Oct. 18, 2019 for U.S. Appl. No. 16/546,723, (pp. 1-6).
Office Action dated Nov. 29, 2019 for U.S. Appl. No. 15/651,284, (pp. 1-6).
Lyondellbasell Technical Data Sheet for Pro-fax SC204 dated Mar. 17, 2016, 3 pages.
Canadian Examiner's Report for Canadian App. No. 2896256, dated Feb. 6, 2020, 4 pages.

Canadian Examiner's Second Report for Canadian App. No. 2896256, dated Dec. 2, 2020, 4 pages.
Hearing Notice for Indian Application No. 8947/DELNP/2015 dated Jul. 23, 2020, 3 pages.
Notice of Appeal Decision for Japanese App. No. 2016-501945 sent Aug. 18, 2020, 15 pages.
First Mexican Office Action for Mexican Patent App. No. MX/a/2015/008525 dated Nov. 5, 2020, 17 pages.
Korean Notice of Preliminary Rejection for Korean Pat. App. No. 10-2015-7021888 dated Apr. 21, 2020, 11 pages.
Japanese Office Action for Japanese Patent App. No. 2019-045572 date Jan. 14, 2020, 6 pages.
Office Action dated Apr. 27, 2020 for U.S. Appl. No. 16/058,126, (pp. 1-12).
Office Action dated Jun. 12, 2020 for U.S. Appl. No. 15/651,284, (pp. 1-8).
Office Action dated Jun. 23, 2020 for U.S. Appl. No. 16/058,131, (pp. 1-8).
Office Action dated Sep. 3, 2020 for U.S. Appl. No. 16/858,778 (pp. 1-10).
Office Action dated Sep. 30, 2020 for U.S. Appl. No. 16/058,126, (pp. 1-11).
Office Action dated Sep. 30, 2020 for U.S. Appl. No. 16/531,530, (pp. 1-10).
Japanese Office Action for Japanese Patent App. No. 2019-045572 dated Oct. 30, 2020, 6 pages.
Office Action dated Dec. 24, 2020 for U.S. Appl. No. 16/058,131, (pp. 1-17).
Korean Second Notice of Preliminary Rejection for Korean Pat. App. No. 10-2015-7021888 dated Dec. 29, 2020, 16 pages.
Office Action dated Jan. 25, 2021 for U.S. Appl. No. 16/058,126, (pp. 1-13).
Fourth Mexican Office Action for Mexican App. No. MX/a/2014/002373, 5 pages.
English Translations of German Office Action for German App. No. 11 2012 00 070.2 dated Sep. 30, 2021, 6 pages.
Indian First Examination Report for Indian App. No. 201918021005 dated Dec. 24, 2021, 7 pages.
Extended European Search Report for European App. No. 17181231.6 sent on Nov. 7, 2017, 5 pages.
Office Action dated Nov. 14, 2017 for U.S. Appl. No. 14/862,552; (pp. 1-14).
"All You Need to Know About Polypropylene, Part 1," Creative Mechanisms Blog. (Year: 2016).
Rejection Decions for Chinese Patent App. No. 201280051426.9, 8 pages.
ASTM D883-17, an American Society for Testing and Materials "Standard Terminology Relating to Plastics," 2017, 16 pages.
ASTM D4101-14, an American Society for Testing and Materials "Standard Standard Specification for Polypropylene Injection and Extrusion Materials," 2014, 17 pages.
Lyondellbasell, Polypropylene, Impact Copolymer, https://www.lyondellbasell.com/en/products-technology/polymers/resin-type/polypropylene-impact-copolymer/, accessed on Nov. 29, 2017, 5 pages.
ASTM D883-12e1, an American Society for Testing and Materials "Standard Terminology Relating to Plastics," 2012, 16 pages.
ASTM D4101-11, an American Society for Testing and Materials "Standard Standard Specification for Polypropylene Injection and Extrusion Materials," 2011, 17 pages.
Chinese Office Action for Chinese App. No. 201380065781.6 dated Nov. 28, 2017, 10 pages.
European Examination Report for European App. No. 13849152.7 sent Jan. 4, 2018, 3 pages.
Office Action dated Jan. 16, 2018 for U.S. Appl. No. 15/388,319; (pp. 1-13).
Office Action dated Jan. 19, 2018 for U.S. Appl. No. 15/004,263; (pp. 1-18).
Extended European Search Report for European App. No. 14836418.5 mailed Jan. 30, 2018, 4 pages.
Canadian office action for Canadian App. No. 2,842,325 dated Jan. 24, 2018, 4 pages.

(56) References Cited

OTHER PUBLICATIONS

Japanese Office Action for Japanese App. No. 2016-501945 sent Jan. 23, 2018, 17 pages.
Canadian Examiner's Report for Canadian App. No. 2845225 dated Feb. 6, 2018, 5 pages.
Taiwan Office Action for Taiwan App. No. 103128338, 9 pages.
Japanese Office Action for Japanese Patent App. No. 2015-539838 sent Feb. 27, 2018, 10 pages.
Taiwan Office Action for Taiwan App. No. 102138786, 20 pages.
Chinese Office Action mailed Mar. 22, 2018 for Chinese Patent Application 201480007369.3, 5 pages.
Office Action dated Mar. 29, 2018 for U.S. Appl. No. 14/862,552, (pp. 1-10).
Chinese Office Action for Chinese Application No. 201380065127.5, sent on Jul. 26, 2016, 11 pages.
Taiwan Office Action for Taiwan App. No. 101121655, 6 pages, (No English translation available).
"All you need to know about Polypropylene, Part 1," Creative Mechanisms. (Year: 2017), 6 pages.
"Polypropylene, Impact Copolymer," Lyondell Basell. (Year: 2017).
Australian Notice of Acceptance for Australian App. No. 2016204692, 3 pages.
First Substantive Examiantion Report for European App. No. 14775300.8 sent Apr. 6, 2018, 4 pages.
Office Action dated Jun. 6, 2018 for U.S. Appl. No. 15/388,319 (pp. 1-19).
Notice of Opposition for EP2751194 submitted May 28, 2018, 11 pages.
Grounds of Opposition for EP2751194 submitted May 28, 2018, 40 pages.
Pasquini, Nello, "Polypropylene Handbook," Carl Hanser Verlag, 2005, 7 pages.
Himont, Pro-fay PF814 brochure, 1992, 1 page.
Maier et al., "Polypropylene: The Definitive User's Guide and Databook" Plastics Design Library, 1998, 19 pages.
Gachter et al., "Taschenbuch der Kunststoff-Additive" Carl Hanser Verlag, 1983, 17 pages, (No English translation available).
Wypych, "Handbook of Antiblocking, Release, and Slip Additives" ChemTec Publishing, 2011, 10 pages.
Zweifel, Hans, "Plastics Additives Handbook" Carl Hanser Verlag, 2001, 6 pages.
Wiesner et al. "The Right Chemical Foaming Agent for Your Application" The Sixth International Conference "Blowing Agents and Foaming Processes 2004", 11 pages.
Hydrocerol—Chemical Foaming and Nucleating Agents, 2007, 8 pages.
Montell at K98—presentation of extrusion line, 1998, 2 pages.
Montell Polyolefins "PP meets foam in sheet—Pro-fax PF-814 paves the way to PP foam growth", available at least by May 28, 2018, 4 pages.
Glossary of Terms for the chemical Fabrics & Film Industry, available at least by May 28, 2018, 5 pages.
ASTM D 883-08, Standard Terminology Relating to Plastics, 2008, 15 pages.
ASTM D 1922-93, Standard Test Method for Propagation Tear Resistance of Plastic Film and Thin Sheeting by Pendulum Method, 1993, 5 pages.
ASTM D3763-02, Standard Test Method for High Speed Puncture Properties of Plastics Using Load and Displacement Sensors, 2002, 10 pages.
Tolinski, "Additives for Polyolefins: Getting the Most Out of Polypropylene, Polyethylene, and TPO" Elsevier, 2009, 25 pages.
Borealis, DaployTM HMS Polypropylene for Foam Extrusion, 2007, 20 pages.
Borealis, DaployTM HMS Polypropylene for Foam Extrusion, 2010, 20 pages.
Documents from Inter Parte Review of U.S. Pat. No. 8,883,280, entered Jan. 26, 2016, 26 pages.
Clarian, Technical Product Information "Hydrocerol CF40E", 2004, 1 page.
Chinese Office Action for Chinese App. No. 202010558511.0 dated Jul. 20, 2022, 11 pages.
Office Action dated Aug. 11, 2016 for U.S. Appl. No. 14/108,110.
Chinese Office Action mailed Aug. 3, 2016 for Chinese Patent Application 201480007369.3, 13 pages.
M. Antunes etal., "Heat Transfer in Polyolefin Foams," Heat Transfer in Multi-Phase Materials, A. Ochsner and G. E. Murch, Eds. Springer-Verlag Berlin Heidelberg, 2011, 131-161.
Office Action dated Sep. 1, 2016 for U.S. Appl. No. 14/106,212.
Australian First Patent Examination Report for Application No. 2013359097 sent Aug. 26, 2016, 3 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2016, 7 pages.
Office Action dated Sep. 27, 2016 for U.S. Appl. No. 14/725,319.
Office Action dated Oct. 7, 2016 for U.S. Appl. No. 14/739,510.
Japanese Office Action for Japanese Application No. 2014-515882, dispatched Aug. 30, 2016, 6 pages.
Mexican Office Action for Mexican Application MX/a/2013/014993, 6 pages.
New Zealand Examination Report for New Zealand Application No. 708463, 3 pages.
New Zealand Examination Report for New Zealand Application No. 708552, 4 pages.
New Zealand First Examination Report for New Zealand Application 708546, 4 pages.
Russian Office Action for Russian Application No. 2014101298, 6 pages.
European Examination Report for European App. No. 12727994.1, 4 pages.
Chinese Office Action for Chinese App. No. 201380065089.3, 12 pages.
European Search Report for European App. No. 13849152.7, 3 pages.
Australian Patent Examination Report for Australian App. No. 2013334155 issued on Oct. 24, 2016, 7 pages.
Taiwan Office Action for Taiwan Pat. App. No. 102146299, 7 pages.
Third Party Observation filed in European Patent App. No. 12727994.1, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4, 4 pages.
British Examination Report for GB App. No. 1400762.9, 2 pages.
Chinese Office Action for Chinese Applicaiton 201380065781.6, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009, 17 pages.
Extended European Search Report for European App. No. 13863649.3, 9 pages.
Office Action dated Nov. 4, 2016 for U.S. Appl. No. 13/961,411.
Chinese Office Action for Chinese Application No. 201280051426.9, 9 pages.
English Summary of Chinese Office Action for Application Serial No. 201380041896.1, dated Nov. 11, 2016, 11 pages.
Extended European Search Report for European App. No. 14775300.8 sent Oct. 24, 2016, 9 pages.
Office Action dated Nov. 18, 2016 for U.S. Appl. No. 14/718,836.
Typical Engineering Properties of Polypropylene information sheet, Ineos Olefins and Polymers USA, archived at https://web.archive.org/web/20160501000000*/http://www.ineos.com/globalassets/ineos-

(56) References Cited

OTHER PUBLICATIONS group/businesses/ineos-blefins-and-polymers-USA/products/technical-information—patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Gulf Cooperation Council Examination Report for GCC Patent App. No. GC2012-21529, 6 pages.
Office Action dated Dec. 28, 2016 for U.S. Appl. No. 14/106,276.
Office Action dated Jan. 4, 2017 for U.S. Appl. No. 14/108,110.
Spanish Search Report for Spanish App. No. 201490025, 5 pages.
Japanese Office Action for Japanese Patent App. 2014-516089 sent Dec. 20, 2016, 6 pages.
Japanese Office Action for Japanese App. No. 2014-528384, 15 pages.
Singapore Office Action and Written Opinion for Singapore Application No. 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 sent Jan. 30, 2017, 3 pages.
Canadian Examiner's Reprot for Canadian App. No. 2845225 dated Jun. 23, 2021, 4 pages.
Office Action (Non-Final Rejection) dated Oct. 27, 2022 for U.S. Appl. No. 17/528,650, (pp. 1-19).
Office Action dated Feb. 15, 2017 for U.S. Appl. No. 14/858,193.
Singapore Office Action and Written Opinion dated Feb. 14, 2017 for Singapore Application No. 11201504327V, 6 pages.
Office Action dated Feb. 24, 2017 for U.S. Appl. No. 14/188,504.
Office Action dated Feb. 28, 2017 for U.S. Appl. No. 15/004,263.
Office Action dated Mar. 6, 2017 for U.S. Appl. No. 14/108,142.
Chinese Office Action for Chinese App. No. 201480052411.3 mailed Feb. 28, 2017, 16 pages.
New Zealand First Examination Report for New Zealand Application 708546, 2 pages.
Singapore Office Action and Written Opinion dated Dec. 13, 2016 for Singapore Application No. 11201504333Y, 6 pages.
Office Action for Chinese Patent Application No. 201380065116.7, dated Mar. 1, 2017, 9 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action mailed Mar. 10, 2017 for Chinese Patent Application 201480007369.3, 11 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 mailed Feb. 23, 2017, 6 pages.
Office Action dated Apr. 7, 2017 for U.S. Appl. No. 14/063,252.
Chinese Office Action for Chinese Application No. 201380065127.5 sent on Apr. 1, 2017, 14 pages.
Japanese Office Action for Japanese Application No. 2014-515882, dispatched Apr. 4, 2017, 6 pages.
New Zealand Examination Report for New Zealand Application No. 708552, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 mailed Apr. 5, 2017, 12 pages.
Chinese Office Action for Chinese App. No. 201380065089.3, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.
Office Action dated Jun. 7, 2017 for U.S. Appl. No. 15/388,319; (pp. 1-21).
Chinese Office Action for Chinese Application No. 201280051426. 9, 12 pages.
Chinese Office Action for Chinese App. No. 201380041896.1 mailed May 22, 2017, 9 pages.
Taiwan Office Action for Taiwan App. No. 101121655, 29 pages.
Australian Examiner's Report for Australian App. No. 2014244210, 4 pages.
European Examination Report for European App. No. 13863308.6 sent May 17, 2017, 3 pages.
Extended European Search Report for European App. No. 14836418.5 mailed Jun. 6, 2017, 14 pages.
Office Action dated Jun. 13, 2017 for U.S. Appl. No. 14/858,193; (pp. 1-21).
Japanese Office Action for Japanese Patent App. No. 2015-539838 sent Jun. 6, 2017, 19 pages.
New Zealand Examination Report for New Zealand Application 708546, 2 pages.
Office Action dated Jul. 19, 2017 for U.S. Appl. No. 15/004,263; (pp. 1-17).
European Examination Report for European App. No. 13849152.7 sent Jun. 29, 2017, 4 pages.
Taiwan Office Action for Taiwan App. No. 102138786, 25 pages.
Office Action dated Aug. 22, 2017 for U.S. Appl. No. 14/188,504; (pp. 1-9).
Australian Examination Report for Australian App. No. 2016204692, 3 pages.
German Office Action for German App. No. 11 2012 002 042.1, 20 pages.
Chinese Office Action mailed Sep. 21, 2017 for Chinese Patent Application 201480007369.3, 4 pages.
Taiwan Office Action for Taiwan Pat. App. No. 101121656 mailed Aug. 1, 2017, 16 pages.
Office Action dated Oct. 18, 2017 for U.S. Appl. No. 14/063,252; (pp. 1-17).
Chinese Office Action for Chinese Application No. 201380065127.5 sent on Sep. 27, 2017, 19 pages.
Office Action dated Oct. 26, 2017 for U.S. Appl. No. 15/139,573; (pp. 1-8).
Office Action dated Nov. 2, 2017 for U.S. Appl. No. 15/650,424; (pp. 1-6).
Extended European Search Report for European App. No. 17182869.2 sent on Oct. 19, 2017, 5 pages.
Canadian Examiner's Third Report for Canadian App. No. 2896256, dated Aug. 5, 2021, 4 pages.
Korean Notice of Last Preliminary Rejection for Korean Pat. App. No. 10-2015-7021888 dated Sep. 5, 2021, 9 pages.
German Office Action for German App. No. 11 2012 00 070.2 dated Sep. 30, 2021, 7pages, (No English Translation Available).
Borealis: Product Data Sheet: Polypropylene Daploytm WB 140 HMS (Mar. 16, 2021), 2 pages.
Office Action (Non-Final Rejection) dated Dec. 8, 2022 for U.S. Appl. No. 17/363,551, (pp. 1-19).
Clariant, Technical Product Information "Hydrocerol CF20E", 2004, 6 pages.
Clariant, Data sheet Hydrocerol CT516, 2004, 5 pages.
Jan-Erik Wegner, Affidavit regarding Hydrocerol, available at least by May 28, 2018, 22 pages.
Borealis HC600TF, 2008, 3 pages.
Borealis HC205TF, 2007, 3 pages.
Isplen codes, available at least by May 28, 2018, 1 page.
Quimica Chemicals—Isplen Polypropylene Compounds, brochure Apr. 2010, 20 pages.
Rychly, J. et al., "The effect of physical parameters of isotactic polypropylene on its oxidisability measured by chemiluminescence method. Contribution to the spreading phenomenon" Polymer Degradation and Stability, vol. 71, No. 2, 2001, 8 pages.
Tiemblo, P. et al., "The autoacceleration of polypropylene thermo-oxidation in reduced coordinates: effect of the oxidation temperature and of polyolefin structure" Polymer Degradation and Stability, vol. 72, No. 1, 2001, 8 pages.

(56) References Cited

OTHER PUBLICATIONS

Bezati, F. et al., "Addition of tracers into the polypropylene in view of automatic sorting of plastic wastes using X-ray fluorescence spectrometry" Waste Management, vol. 30, No. 4, May 2010, 6 pages.
Translation of CN101560307A, 19 pages.
Gotsis, A. D. et al., "The Effect of Long Chain Branching on the Processability of Polypropylene in Thermoforming" Polymer Engineering and Science, vol. 44, No. 5, May 2004, 10 pages.
"Product News" Daploy WB135HMS—High Melt Strength Polyproyplene for Foam Extrusion, 2004, 2 pages.
Naguib, Hani E. et al., "Effects of Blending of Branched and Linear Polypropylene Materials on the Foamability" Technical Papers of the Annual Technical Conference-Society of Plastics Engineers Incorporated, 2001, 8 pages.
Antunes, Marcelo et al., "Heat Transfer in Polypropylene-Based Foams Produced Using Different Foaming Processes" Advanced Engineering Materials, vol. 11, No. 1 0, May 2009, 7 pages.
R0hne Gunhild. Foaming of Soft Polyproyplene Blends. Conference Proceedings: Zlin Czech Republic, Aug. 16-18, 2000, 4 pages.
Mikell Knights, "Theres Plenty of Fizz in Foam Blow Molding" Plastics Technology, available from https:llwww.ptonline.com/articles/there%27s-plenty-of-fizz-in-foam-blow-molding, 1999, 4 pages.
Crodamide brochure Feb. 2000, 4 pages.
Tabatabaei, Seyed H. et al., "Rheological and thermal properties of blends of a long-chain branched polypropylene and different linear polypropylenes" Chemical Engineering Science, vol. 64, No. 22, 2009, 13 pages.
Stange, Jens et al., "Rheological properties and foaming behavior of polypropylenes with different molecular structures" Journal of Rheology, vol. 50, No. 6, 2006, 18 pages.
Clariant, Cesa Slip, Sep. 2000, 6 pages.
Antunes, Marcelo et al., "Study of the cellular structure heterogeneity and anisotropy of polypropylene and polypropylene nanocomposite foams" Polymer Engineering and Science, vol. 49, No. 12, May 2009, 14 pages.
Office Action dated Jun. 22, 2018 for U.S. Appl. No. 15/004,263 (pp. 1-20).
Shutov, Fyodor, "Foamed Polymers. Cellular Structure and Properties", Springer Berlin Heidelberg, Industrial Developments vol. 51, Jun. 2005, p. 176-182, 8 pages.
Canadian office action for Canadian App. No. 2842325 dated Oct. 26, 2018, 4 pages.
First Examination Report for Indian Patent App. No. 111/DELNP/2014 dated Apr. 22, 2019, 7 pages.
First Examination Report for Indian Patent App. No. 110/DELNP/2014 sent on Dec. 26, 2019, 8 pages.
Taiwan Office Action for Taiwan App. No. 102146298 sent Oct. 26, 2016, 9 pages.
Canadian Examiner's Report for Canadian App. No. 2845225 dated Mar. 1, 2019, 3 pages.
Canadian Examiner's Report for Canadian App. No. 2845225 dated Nov. 18, 2019, 4 pages.
Canadian Examiner's Report for Canadian App. No. 2845225 dated Dec. 2, 2020, 4 pages.
Borealis Product Brochure, "DaployTM HMS Polypropylene for Foam Extrusion", 20 pages, 2010.
Re-examination Notification for Chinese Patent App. No. 201280051426.9, 19 pages.
Second Re-examination Notification for Chinese Patent App. No. 201280051426.9, 21 pages.
German Office Action for German App. No. 11 2012 00 070.2 dated Oct. 20, 2020, 23 pages.
Examination Report for GB1405600.6 dated Oct. 15, 2019, 4 pages.
Indian First Examination Report for Indian Pat. App. No. 2179/DELNP/2014 date May 24, 2019, 6 pages.
Chinese Rejection Decision for Chinese App. No. 201380065781.6 dated Jul. 12, 2018, 15 pages, (No English Translation available).
English Summary of Chinese Rejection Decision for Chinese App. No. 201380065781.6 dated Jul. 12, 2018, 4 pages.

Indian Examination Report for Indian App. No. 3919/DELNP/2015, sent Aug. 21, 2018, 5 pages.
Markus Gahleitner et al., "Heterophasic Copolymers of Polypropylene: Development, Design, Principles, and Future Challenges," Journal of Applied Polymer Science, 2013, Wiley Periodicals, 10 pages.
Sadiqali Cheruthazhekatt et al., "Multidimensional Analysis of the Complex Composition of Impact Polypropylene Copolymers: Combination of TREF, SEC-FTIR-HPer DSC, and High Temperature 2D-LC," Macromolecules 2012, 45, 2025-2305, ACS Publications, American Chemcial Society, 10 pages.
Office Action dated Sep. 26, 2018 for U.S. Appl. No. 15/651,284, (pp. 1-10).
Substantive Examination Report for European App. No. 17182869.2 sent on Nov. 12, 2018, 5 pages.
Office Action dated Dec. 6, 2018 for U.S. Appl. No. 15/388,319, (pp. 1-10).
Office Action dateed Dec. 13, 2018 for U.S. Appl. No. 15/672,668, (pp. 1-13).
Office Action dated Jan. 14, 2019 for U.S. Appl. No. 15/004,263, (pp. 1-15).
Office Action dated Mar. 7, 2019 for U.S. Appl. No. 16/023,218, (pp. 1-5).
Rogers, "All you Need to Know About Polypropylene, Part 1," Creative Mechanisms Blog. (Year: 2014), 6 pages.
Office Action dated Apr. 2, 2019 for U.S. Appl. No. 15/388,319, (pp. 1-17).
ASTM D3763-86, an American Society for Testing of Materials (ASTM), 'Standard Method for High-Speed Puncture Properties of Plastics Using Load and Displacement Sensors' (1986 Edition), 5 pages.
ASTM D1922-93, an American Society for Testing of Materials (ASTM), "Standard Method for Propagation Tear Resistance of Plastic Film And Thin Sheeting by Pendulum Method" (1993 Edition), 5 pages.
Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.
Almanza et al., 'Applicability of the Transient Plane Source Method To Measure the Thermal Conductivity of Low-Density Polyethylene Foams', Journal of Polymer Science: Part B: Polymer Physics, vol. 42 (2004), 1226-1234.
The Burn Foundation, 'Scald Burns', available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
Power of a Microwave Oven, available at https://web.archive.org/web/20071010183358/http://hypertextbook.com/facts/2007/TatyanaNektalova.shtml, dated Oct. 10, 2007, accessed on Feb. 5, 2016.
Health Physics Society, 'Microwave Oven Q & A', available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., 'Heat Transfer in Polypropylene-Based Foams Produced Using Different Foaming Processes', Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).

(56) References Cited

OTHER PUBLICATIONS

Technical data sheet of Hifax CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.C. McCrum et al., Principles of Polymer Engineering, 2nd ed., Oxford Science Publications (1997).
Excerpts from Robert H. Perry, Perry's Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci., 38 (1998), 1171-1176.
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
Third Party Submission Under 37 CFR 1.290 filed on May 12, 2016 in U.S. Appl. No. 14/739,510.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
English translation of Japanese Office Action for Japanese Application No. 2014-516089, dated May 10, 2016.
Office Action dated Mar. 10, 2016 for U.S. Appl. No. 14/462,073.
Office Action dated Jun. 10, 2016 for U.S. Appl. No. 14/188,504.
Singapore Office Action and Written Opinion dated May 27, 2016 for Singapore Application No. 11201504327V.
Singapore Office Action and Written Opinion dated May 27, 2016 for Singapore Application No. 11201504330U.
Notice of Acceptance dated Jun. 10, 2016 for Australian Application No. 2012302251.
Singapore Office Action and Written Opinion dated May 26, 2016 for Singapore Application No. 11201504333Y.
Office Action for Chinese Patent Application No. 201380064860.5, dated Jun. 2, 2016 including English language summary, 13 pages.
Australian First Patent Examination Report for Application No. 2012363114, dated Jun. 15, 2016, 4 pages.
Office Action dated Jun. 30, 2016 for U.S. Appl. No. 14/106,276.
Extended European Search Report for European Application No. 13862331.9-1708/2931627 PCT/US2013/074923, dated Jul. 7, 2016.
English translation of Russian Office Action for Application Serial No. 2014101298, dated Jul. 22, 2016, 7 pages.
Australian First Patent Examination Report for Application No. 2013334155, dated May 23, 2016, 4 pages.
Office Action for Chinese Patent Application No. 201380065116.7, dated Jun. 28, 2016, including English language summary, 12 pages.
Office Action dated Jul. 28, 2016 for U.S. Appl. No. 14/211,553.
British Examination Report for GB Application No. GB1400762.9, sent on Aug. 8, 2016, 2 pages.
Extended European Search Report for European Application No. 13863546.1 established Jul. 12, 2016, 7 pages.
Extended European Search Report for European Application No. 13863308.6 mailed Jul. 19, 2016, 8 pages.
Canadian Examiner's Report for Canadian App. No. CA3170958 dated (Oct. 27, 2023), 4 pages.
Office Action (Final Rejection) dated Jan. 8, 2024 for U.S. Appl. No. 17/366,728, (pp. 1-16).
Dow (TM) HDPE DMDA-8007 NT7 Technical Information, Dow Chemical Company, 2011. (Year: 2011).
Office Action (Non-Final Rejection) dated Jul. 11, 2022 for U.S. Appl. No. 17/410,386, (pp. 1-12).
Office Action (Non-Final Rejection) dated Dec. 23, 2022 for U.S. Appl. No. 17/135,048, (pp. 1-14).
Office Action (Final Rejection) dated Jan. 10, 2023 for U.S. Appl. No. 17/410,386, (pp. 1-12).
Office Action (Final Rejection) dated May 31, 2023 for U.S. Appl. No. 17/135,048 (pp. 1-15).
Office Action (Non-Final Rejection) dated Jun. 20, 2023 for U.S. Appl. No. 17/410,386 , (pp. 1-18).
Office Action (Non-Final Rejection) dated Sep. 8, 2023 for U.S. Appl. No. 17/075,183 (pp. 1-11).
English machine translation for JP2001-018943 (2001). (Year: 2001).
Office Action (Non-Final Rejection) dated Sep. 27, 2023 for U.S. Appl. No. 17/135,048 (pp. 1-13).
Office Action (Final Rejection) dated Nov. 15, 2023 for U.S. Appl. No. 17/410,386, (pp. 1-19).
Office Action (Final Rejection) dated Feb. 8, 2024 for U.S. Appl. No. 17/075,183, (pp. 1-9).
Office Action (Final Rejection) dated Apr. 12, 2024 for U.S. Appl. No. 17/135,048, (pp. 1-13).
International Search Report and Written Opinion, International Application No. PCT/US2016/020844, search completed Apr. 14, 2016.
International Search Report and Written Opinion, International Application No. PCT/US2016/020674, search completed Apr. 18, 2016.
Office Action dated Jun. 15, 2016 for U.S. Appl. No. 14/787,901.
International (PCT) Search Report for PCT/US16/20871, 20 pages.
International Search Report and Written Opinion dated Jan. 21, 2015, relating to International Application No. PCT/US2014/053665.
International Search Report and Written Opinion dated Jan. 27, 2015, relating to International Application No. PCT/US2014/53667.
International Search Report and Written Opinion dated Jul. 18, 2014, relating to International Application No. PCT/US2014/027551.
International Search Report dated Nov. 2, 2014, relating to International Application No. PCT/US2014/53666.
International Search Report dated Nov. 24, 2014, relating to International Application No. PCT/US2014/52606.
International Search Report dated Nov. 7, 2014, relating to International Application No. PCT/US2014/046518.
Office Action dated May 11, 2015 for U.S. Appl. No. 14/331,066.
International Preliminary Report on Patentability dated Mar. 1, 2016, relating to International Application No. PCT/US2014/053666.
International Preliminary Report on Patentability dated Mar. 1, 2016, relating to International Application No. PCT/US2014/053665.
International Preliminary Report on Patentability, dated Mar. 1, 2016, relating to International Application No. PCT/US2014/052606.
International Preliminary Report on Patentability, dated Mar. 1, 2016, relating to International Application No. PCT/US2014/053667.
English summary of Russian Office Action for Russian Patent Application Serial No. 2016104363, dated Jul. 5, 2016, 3 pages.
Chinese Office Action for Application Serial No. 201480021009.9, dated Jul. 5, 2016 including English language summary, 17 pages.

(56) References Cited

OTHER PUBLICATIONS

English Translation of JP404278340A which originally published Oct. 2, 1992, 23 pages.
Office Action dated Aug. 15, 2016 for U.S. Appl. No. 14/468,789.
Office Action dated Aug. 12, 2016 for U.S. Appl. No. 14/475,096.
Cheng et al., "Improving processability of polyethylenes by radiation-induced long-chain branching," Radiation Physics and Chemistry, 78 (2009) pp. 563-566.
European Search Report for European Application No. 14768125.8 sent Jul. 15, 2016, 8 pages.
US Office Action dated Sep. 15, 2016 for U.S. Appl. No. 15/239,894, 8 pages.
Australian Patent Examination Report for Australian App. No. 2014239318 issued on Nov. 25, 2016, 4 pages.
Chinese Office Action for Chinese App. No. 201480047976.2, 11 pages.
Chinese Office Action for Chinese App. No. 201480047578.0 sent on Nov. 30, 2016, 10 pages.
Australian First Examination Report for Australian App. No. 2014311414 mailed Feb. 7, 2017, 3 pages.
Extended European Search Report for European App. No. 14823298.6 dated Jan. 25, 2017, 9 pages.
Office Action dated Feb. 16, 2017 for U.S. Appl. No. 15/239,894.
Chinese Office Action for Application Serial No. 201480021009.9, dated Jan. 22, 2017 including English language summary, 22 pages.
Chinese Office Action for Chinese App. No. 201480047978.1, 14 pages.
Office Action dated May 1, 2017 for U.S. Appl. No. 14/211,533.
Office Action dated Mar. 14, 2017 for U.S. Appl. No. 14/475,266.
Office Action dated Mar. 21, 2017 for U.S. Appl. No. 14/475,411.
Extended European Search Report for European App. No. 14840353.8 mailed Mar. 17, 2017, 6 pages.
Extended European Search Report for European App. No. 14838960.4 sent Mar. 17, 2017, 9 pages.
Extended European Search Report for European App. No. 14840262 sent on Mar. 23, 2017, 8 pages.
Extended European Search Report for European App. No. 14840734.9 mailed Apr. 4, 2017, 10 pages.
New Zealand Examination Report for New Zealand Patent App. No. 712687 mailed Mar. 30, 2017, 10 pages.
Office Action dated Apr. 21, 2017 for U.S. Appl. No. 14/475,411.
Taiwan Search Report for Taiwan Application No. 103109790 completed Apr. 20, 2017, 9 pages.
Australian Examination Report for Australian App. No. 2014286957 sent May 2, 2017, 3 pages.
Advisory Action dated Jun. 1, 2017 for U.S. Appl. No. 15/239,894; (pp. 1-6).
Office Action dated Jul. 10, 2017 for U.S. Appl. No. 15/239,894; (pp. 1-10).
Office Action dated Jul. 19, 2017 for U.S. Appl. No. 15/059,995; (pp. 1-10).
Chinese Office Action for Chinese App. No. 201480047578.0 sent on Jul. 4, 2017, 5 pages.
Chinese Office Action for Chinese App. No. 201480047978.1, 11 pages.
Unilever Launches Breakthrough Packaging Technology That Uses 15% Less Plastic, Unilever (Apr. 24, 2014), http://www.unilever.com/mediacentre/pressreleases/2014/Unileverlaunchesbreakthrough packagingtechnologythatuses15lessplastic.aspx (2 pages).
Unilever Says It Will Use Less Plastic Per Bottle, Yahoo News (Apr. 22, 2014, 10:20 AM), http://news.yahoo.com/unilever-says-less-plastic-per-bottle-142039401--finance.html (3 pages).
Chinese Office Action for Application Serial No. 201480021009.9, dated Aug. 7, 2017 including English language summary, 12 pages.
Office Action dated Mar. 8, 2024 for U.S. Appl. No. 17/363,551 (pp. 1-17).
Lubrizol Advanced Materials, Inc., Extrusion Guide, 2014, 16 pages.
Chinese Office Action for Chinese App. No. 201480047976.2, 15 pages.
Dongwu Yang, Plastic Material Selection Technology, Light Industry Press, Jan. 2008, 1 page.
Australian First Patent Examination Report for Australian App. No. 2014311991 dated Oct. 4, 2017, 4 pages.
Office Action dated Oct. 3, 2017 for U.S. Appl. No. 15/491,443; (pp. 1-6).
Office Action dated Oct. 6, 2017 for U.S. Appl. No. 15/383,115; (pp. 1-5).
Office Action dated Oct. 27, 2017 for U.S. Appl. No. 15/239,894; (pp. 1-7).
Chinese Office Action for Application Serial No. 201480021009.9, dated Jan. 2, 2018 including English language summary, 6 pages.
Office Action dated Jan. 17, 2018 for U.S. Appl. No. 15/591,355; (pp. 1-5).
Chinese Office Action for Application Serial No. 201480021009.9, dated Apr. 20, 2018 including English language summary, 6 pages.
First Substantive Examination Report for European App. No. 14768125.8 dated Mar. 21, 2019, 6 pages.
First Examination Report for Indiana Patent App. No. 9302/DELNP/2015 dated May 6, 2019, 7 pages.
Chinese Office Action for Chinese App. No. 20180039581.8 sent Feb. 23, 2018, 13 pages.
Chinese Office Action for Chinese App. No. 20180039581.8 sent Jan. 14, 2019, 10 pages.
Chinese Final Rejection for Chinese App. No. 201480047976.218, 8 pages.
Chinese Office Action for Chinese App. No. 20180042446.9 sent on Feb. 3, 2018, 9 pages.
Chinese Office Action for Chinese App. No. 20180042446.9 sent on Oct. 31, 2018, 5 pages.
Chinese Office Action for Chinese App. No. 201480047578.0 sent on Jan. 24, 2018, 10 pages.
Vasile et al., Practical Guide to Polyethylene, published by Smithers Rapra Press, 2008, p. 119, 3 pages.
Office Action dated Apr. 27, 2018 for U.S. Appl. No. 15/061,005 (pp. 1-7).
Office Action dated Apr. 16, 2018 for U.S. Appl. No. 15/061,070, (pp. 1-13).
Definition of "Base," Dictionary.com, available at http://www.dictionary.com/browse/base, retrieved on Apr. 16, 2018.
Office Action dated Apr. 20, 2018 for U.S. Appl. No. 15/239,894, (pp. 1-13).
Office Action dated Jun. 15, 2018 for U.S. Appl. No. 15/491,443, pp. 1-6.
Chinese Office Action for Chinese App. No. 201480047578.0 sent on Aug. 29, 2018, 4 pages.
Office Action dated Sep. 7, 2018 for U.S. Appl. No. 15/239,894, (pp. 1-9).
Office Action dated Mar. 8, 2019 for U.S. Appl. No. 15/902,489, (pp. 1-16).
Chinese Office Action for Chinese App. No. 20180039581.8 sent May 31, 2019, 7 pages.
Chinese Reexamination Notification for Chinese App. No. 201480047976.2, 12 pages.
Shunying Wu et al., "Foam Molding" Beijing Chemical Industry Press, Second Edition, Feb. 1999, 16 pages, English translation included.
Dingyi Hong, "Handbook of Plastic Industry: Polyolefin" Beijing Chemical Industry Press, First Edition, Mar. 1999, 17 pages, English translation included.
Shunyang Deng, "Chemical Formulation and Process Manual" Shanghai Science and Technology Press, First Edition, Jan. 2013, 11 pages, English translation included.
Office Action dated Jul. 15, 2019 for U.S. Appl. No. 15/902,489, (pp. 1-24).
Office Action dated Oct. 4, 2019 for U.S. Appl. No. 15/713,799, (pp. 1-5).
First Mexican Office Action for Mexican Patent App. No. MX/a/2015/012702 dated Jun. 23, 2021, 17 pages, No English translation available.
Indian First Examination Report for Indian Patent App. No. 201617000386, dated Oct. 16, 2020, 7 pages.

(56) References Cited

OTHER PUBLICATIONS

Canadian Office Action for Canadian Patent App. No. 2918306 dated Oct. 30, 2020, 4 pages.
Canadian Office Action for Canadian Patent App. No. 2918306 dated Jul. 28, 2021, 3 pages.
Indian First Examination Report for Indian Patent App. No. 2016/17003143 dated Sep. 11, 2020, 5 pages.
Mexican Office Action for MX/a/2016/002490 dated Oct. 22, 2020, 7 pages.
Mexican Office Action for MX/a/2016/002490 dated Jun. 22, 2021, 8 pages.
First Examination Report for Indiana App. No. 201617007243 dated Dec. 16, 2019, 6 pages.
Indian First Examination Report for Indian App. No. 201317001026, dated Mar. 20, 2020, 6 pages.
Mexican Office action for Mexican Patent App. No. MX/a/2016/002374 dated Mar. 3, 2021, 7 pages.
Second Mexican Office action for Mexican Patent App. No. MX/a/2016/002374 dated Aug. 2, 2021, 9 pages.
First Examination Report for Indian App. No. 201617005271, sent Feb. 11, 2020.
Office Action dated Jan. 6, 2020, for U.S. Appl. No. 15/902,489, 22 pages.
Office Action dated Jul. 16, 2020 for U.S. Appl. No. 15/902,489, (pp. 1-20).
Office Action dated Aug. 31, 2020 for U.S. Appl. No. 16/356,423, (pp. 1-14).
International (PCT) Search Report and Written Opinion for PCT/US21/47516 dated Jan. 24, 2022, 22 pages.
Office Action (Non-Final Rejection) dated Sep. 13, 2023 for U.S. Appl. No. 17/363,551 (pp. 1-16).
Office Action (Non-Final Rejection) dated Sep. 20, 2023 for U.S. Appl. No. 17/366,728 (pp. 1-12).
Japanese Office Action for Japanese Patent App. No. 2019-045572 dated Apr. 13, 21, BP-392 JP II, 6 pages.
First Mexican Office Action for Mexican Patent App. No. MX/a/2015/008525 dated May 3, 21, BP-392 MX II, 11 pages.
Office Action dated Jun. 8, 2021 for U.S. Appl. No. 16/058,126 (pp. 1-16).
Office Action dated Aug. 18, 2015 for #U.S. Appl. No. 14/106,212.
Office Action dated Aug. 27, 2015 for #U.S. Appl. No. 14/106,358.
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
Certified English translation of JP2003292663.
Second Chinese Office Action dated Sep. 6, 2015 for Chinese Application Serial No. 201280034350.9.
Office Action dated Oct. 8, 2015 for #U.S. Appl. No. 14/188,504.
Office Action dated Oct. 27, 2015 for #U.S. Appl. No. 14/462,073.
English translation of Russian Office Action for Application Serial No. 2015127677, dated Sep. 16, 2015.
Inter Partes Review Petition for U.S. Pat. No. 8,883,280 (712 pages) [Submitted in multiple parts].
Gibson and Ashby, Cellular solids: structure and properties, 2nd ed., Cambridge University Press (1997) (7 pages).
C. Maier and T. Calafut, Polypropylene: the Definitive User's Guide and Databook, Plastics Design Library, William Andrew Inc. (1998) (19 pages).
Grant & Hackh's Chemical Dictionary, 5th ed., McGraw-Hill, Inc. (1987) (3 pages).
Merriam-Webster's Collegiate Dictionary, 11th ed. (2003), p. 70 (3 pages).
Merriam-Webster's Collegiate Dictionary, 11th ed. (2003), p. 1237 (3 pages).
Hawley's Condensed Chemical Dictionary, 14th Ed. (2001) (5 pages).
Reichelt et al., Abstract of PP-Blends with Tailored Foamability and Mechanical Properties, Cellular Polymers, (2003) available from http://www.polymerjournals.com/journals.asp?Page=111&JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly™ HMS Polypropylene for Foam Extrusion" obtained from Borealis webpage obtained from the Internet Archive's "Wayback Machine" as of Nov. 16, 2008 (https://web.archive.org/web/20081116085125/http://www.borealisgroup.com/pdf/literature/borealis-borouge/brochure/K_IN0020_GB_FF_2007_10_BB.pdf)("Brochure '08") (20 pages).
Office Action dated Dec. 31, 2015 for #U.S. Appl. No. 14/755,546.
Office Action dated Jan. 11, 2016 for #U.S. Appl. No. 14/161,328.
Singapore Notice of Eligibility for Grant, Search Report, and Examination Report transmitted Dec. 10, 2015 for Singapore Application No. 11201503336V.
English translation of First Office Action for Taiwanese Application No. 101121656, Nov. 13, 2015.
English summary of Spanish Office Action for Application Serial No. P201490025, Feb. 9, 2016, 8 pages.
Extended European Search Report for European Application No. 13849152.7-1303/2912142 PCT/US2013/066811, dated Feb. 12, 2016.
Office Action dated Feb. 16, 2016 for #U.S. Appl. No. 14/108,142.
United Kingdom Examination Report for Patent Application No. GB1400762.9 dated Feb. 11, 2016.
English Summary of Russian Office Action for Application Serial No. 2014111340, dated Feb. 25, 2016, 8 pages.
Supplemental European Search Report for European Application No. 12727994.1-1302, dated Feb. 17, 2016.
Australian First Patent Examination Report for Application No. 2012271047, dated Feb. 29, 2016.
Extended European Search Report for European Application No. 13827981.5-1708/2888092 PCT/US2013/053935, dated Feb. 19, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
English Summary of Chinese Office Action for Application Serial No. 201380041896.1, dated Mar. 18, 2016, 7 pages.
International Preliminary Report on Patentability dated Feb. 16, 2016, relating to International Application No. PCT/US2014/051508.
Australian Second Patent Examination Report for Application No. 2012302251, dated Feb. 26, 2016.
Japanese Office Action for Japanese Patent Application No. 2014-528384, dated Mar. 1, 2016.
English summary of Mexican Office Action for Application Serial No. MX/a/2013/014993, Apr. 27, 2016, 5 pages.
English summary of Chinese Office Action for Chinese Application Serial No. 201380065781.6, Apr. 19, 2016, 14 pages.
Doerpinghaus et al., 'Separating the effects of sparse long-chain branching on rheology from those due to molecular weight in polyethylenes', Journal of Rheology, 47, 717 (2003).
English Summary of Chinese Office Action for Application Serial No. 201280051426.9, Apr. 29, 2016, 5 pages.
Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin- foam/daploy-hmspp-extruded-foam/).
Reichelt et al., 'PP-Blends with Tailored Foamability and Mechanical Properties', Cellular Polymers, vol. 22, No. 5, 2003, 14 pages.
Ratzsch et al., 'Radical reactions on polypropylene in the solid state', Prog. Polym. Sci. 27 (2002) 1195-1282, 88 pages.

(56) References Cited

OTHER PUBLICATIONS

Excerpts from Encyclopedia of Polymer Science and Technology: Plastics, Resins, Rubbers, and Fibers, 'Blowing Agents', vol. 2, John Wiley & Sons, Inc. (1965), 37 pages.
Excerpts from Polymer Foams: Science and Technology, Lee et al., 'Introduction to Polymeric Foams', CRC Press (2007) 51 pages.
Excerpts from Gibson and Ashby, Cellular solids: Structure and properties - Second edition, Cambridge University Press, 1997, 66 pages.
Excerpts from Maier and Calafut, Polypropylene: the Definitive User's Guild and Databook, Plastics Design Library, William Andrew Inc. (1998), 35 pages.
International Search Report dated Jul. 29, 2013, relating to International Application No. PCT/US2012/043016, 25 pages.
International Search Report and Written Opinion dated Sep. 17, 2013, relating to International Application No. PCT/US2012/041395.
Daploy HMS Polypropylene for Foam Extrusion, 20 pages, Borealis Borouge Shaping the Future with Plastics, Published 2010, www.borealisgroup.com, www.borouge.com, Vienna, Austria.
Certified English translation of EP0086869.
English translation of Spanish Search Report of Application No. 201490025, dated Apr. 20, 2015.
European Search Report of Application No. 12861450.0, dated Nov. 21, 2014.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Jan. 19, 2015, relating to International Application No. PCT/ US2014/059312.
International Search Report and Written Opinion dated Jul. 3, 2014, relating to International Application No. PCT/ US2014/025697.
International Search Report dated Feb. 26, 2013, relating to International Application No. PCT/US2012/043018.
International Search Report dated Jan. 19, 2015, relating to International Application No. PCT/US2014/059216.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 30, 2012, relating to International Application No. PCT/US2012/041397.
International Search Report dated Mar. 11, 2014, relating to International Application No. PCT/US2013/66811.
International Search Report dated Nov. 19, 2012, relating to International Application No. PCT/US2012/041395.
International Search Report dated Nov. 7, 2014, relating to International Application No. PCT/US2014/51508.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.

Machine English translation of EP0086869.
Machine English translation of JP 2006-130814.
Naguib et al., "Fundamental Foaming Mechanisms Governing the vol. Expansion of Extruded Polypropylene Foams," Journal of Applied Polymer Science, vol. 91, pp. 2661-2668, 2004 (10 pages).
New Zealand First Examination Report for Application No. 619616 dated Oct. 10, 2014.
New Zealand First Examination Report for Application No. 621219 dated Nov. 17, 2014.
Office Action dated Apr. 10, 2015 for U.S. Appl. No. 14/106,358.
Office action dated Apr. 11, 2014 for U.S. Appl. No. 13/526,417.
Office Action dated Apr. 14, 2015 for U.S. Appl. No. 14/106,212.
Office Action dated Apr. 30, 2015 for U.S. Appl. No. 14/462,073.
Office Action dated Aug. 19, 2014 for Chinese Application No. 201280035667.4.
Office Action dated Aug. 21, 2014 for U.S. Appl. No. 13/526,454.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Office Action dated Jul. 25, 2014 for U.S. Appl. No. 13/525,640.
Office Action dated Jun. 23, 2015 for U.S. Appl. No. 13/525,640..
Office Action dated Oct. 10, 2014 for #U.S. Appl. No. 14/106,358.
Office Action dated Oct. 16, 2014 for #U.S. Appl. No. 14/106,212.
Office Action dated Sep. 25, 2014 for #U.S. Appl. No. 13/526,417.
Singapore Office Action dated Dec. 18, 2014 for Singapore Application No. 2014002273.
Spanish Search Report for Application No. 201490025, dated Apr. 20, 2015.
Spanish Search Report of Application No. 201390099, dated Feb. 9, 2015.
Third-Party Submission Under 37 CFR 1.290 filed on Dec. 9, 2014 in U.S. Appl. No. 14/063,252.
Third-Party Submission Under 37 CFR 1.290 filed on Feb. 26, 2015 in U.S. Appl. No. 13/491,007.
Third Party Submission Under 37 CFR 1.290 in U.S. Appl. No. 14/188,504 submitted May 11, 2015 and May 27, 2015 (43 pages).
Wang et al., "Extending PP's Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
Office Action Chinese Patent Application No. 201280051426.9 dated Jul. 23, 2015.
Office Action dated May 19, 2015 for Chinese Application No. 201280035667.4.
Chinese Rejection Decision Action for Chinese App. No. 202010558511.0 dated Feb. 16, 2023, BP-356 CN-DIV1 I, 7 pages.
Office Action (Final Rejection) dated Apr. 21, 2023 for U.S. Appl. No. 17/528,650, BP-512A US-Con II, (pp. 1-20).
Office Action (Final Rejection) dated May 4, 2023 for U.S. Appl. No. 17/363,551 (pp. 1-19).
Extended European Search Report for European Patent App. No. EP21862640.6 received on Jul. 24, 2024, BP-527 EP I, 6 pages.
Canadian Examiner's Report for Canadian App. No. 3013576 dated Aug. 15, 2024, BP-512B CA I, 5 pages.

\* cited by examiner

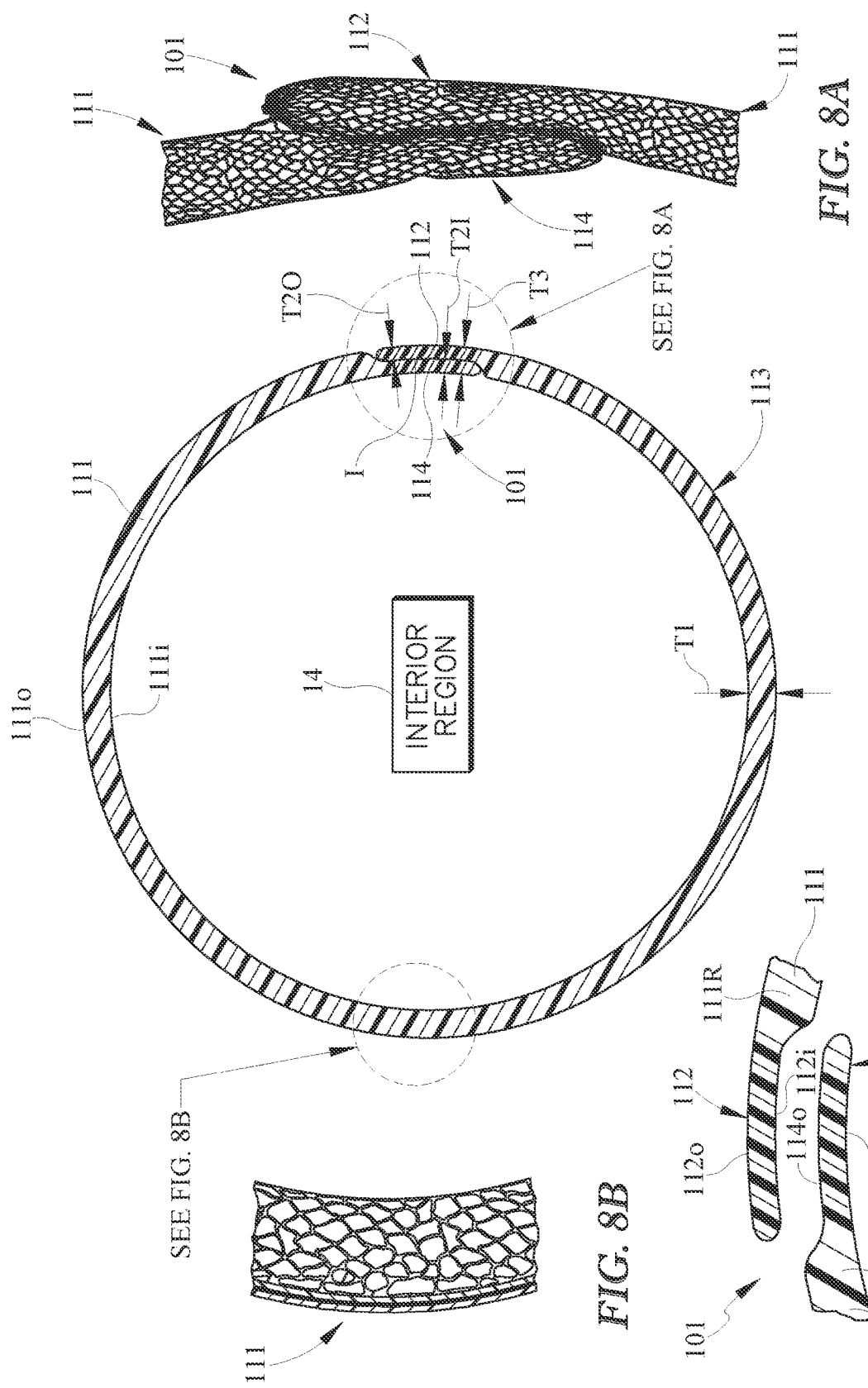

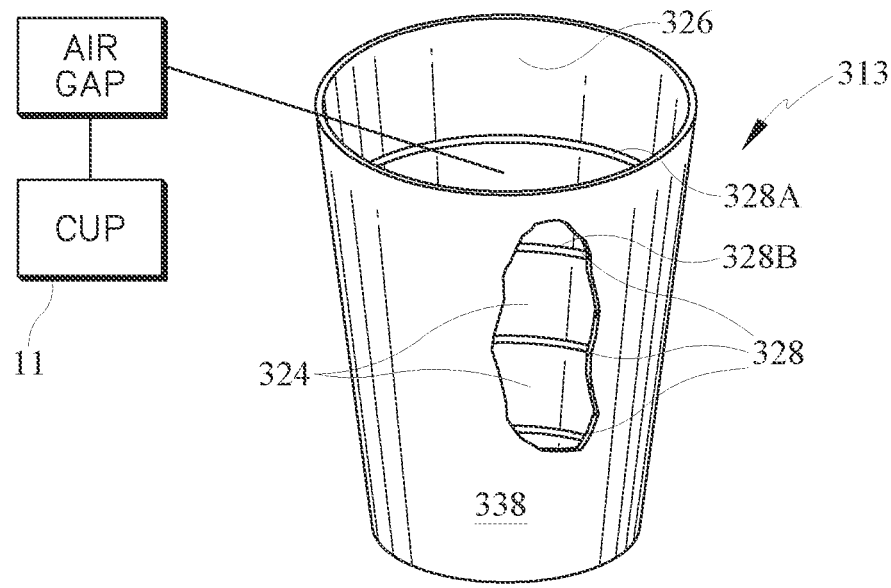
FIG. 11
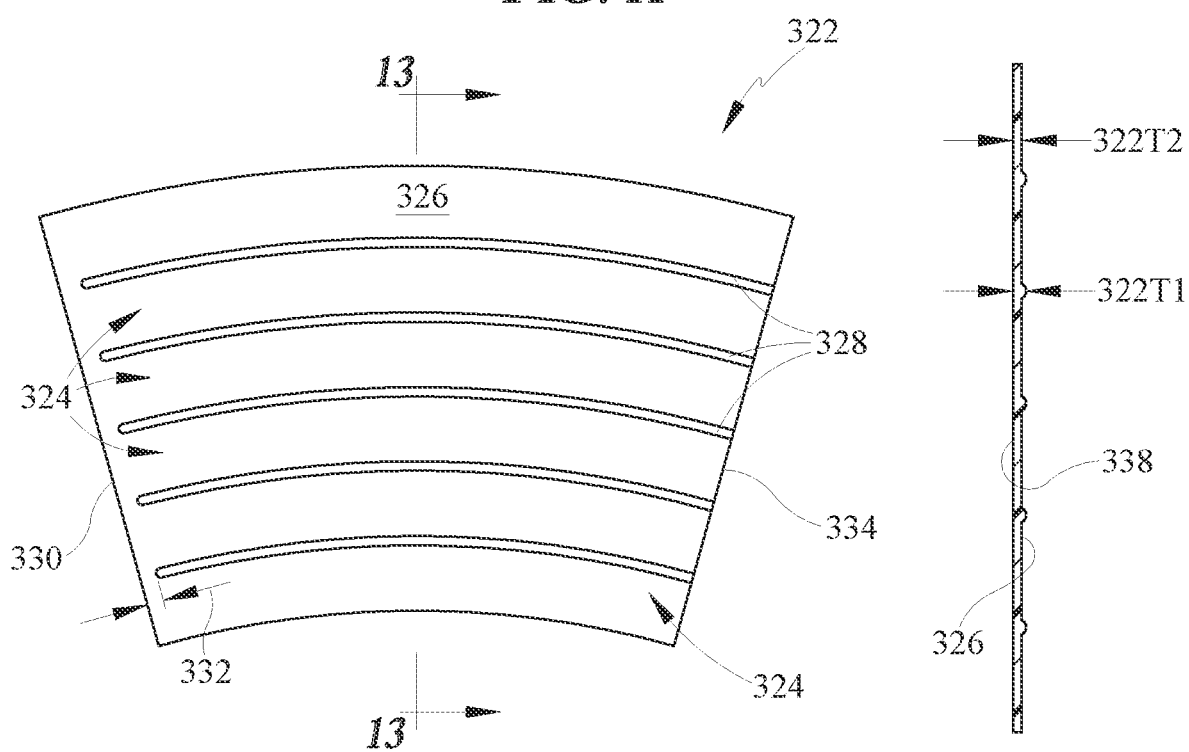
FIG. 12
FIG. 13

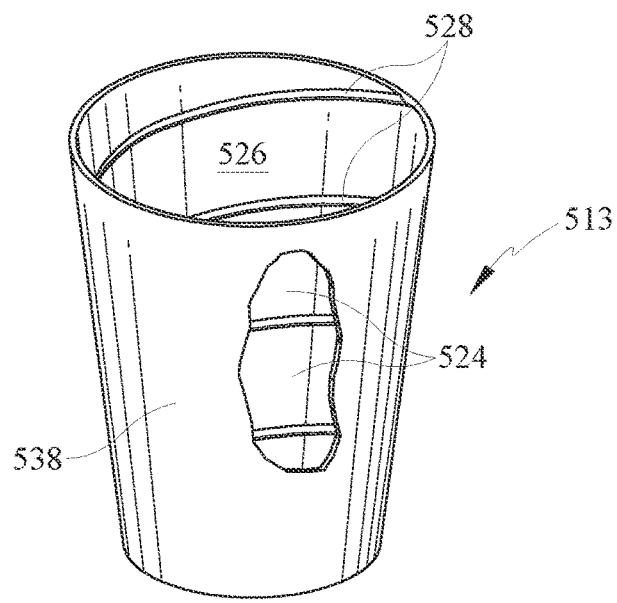
FIG. 17
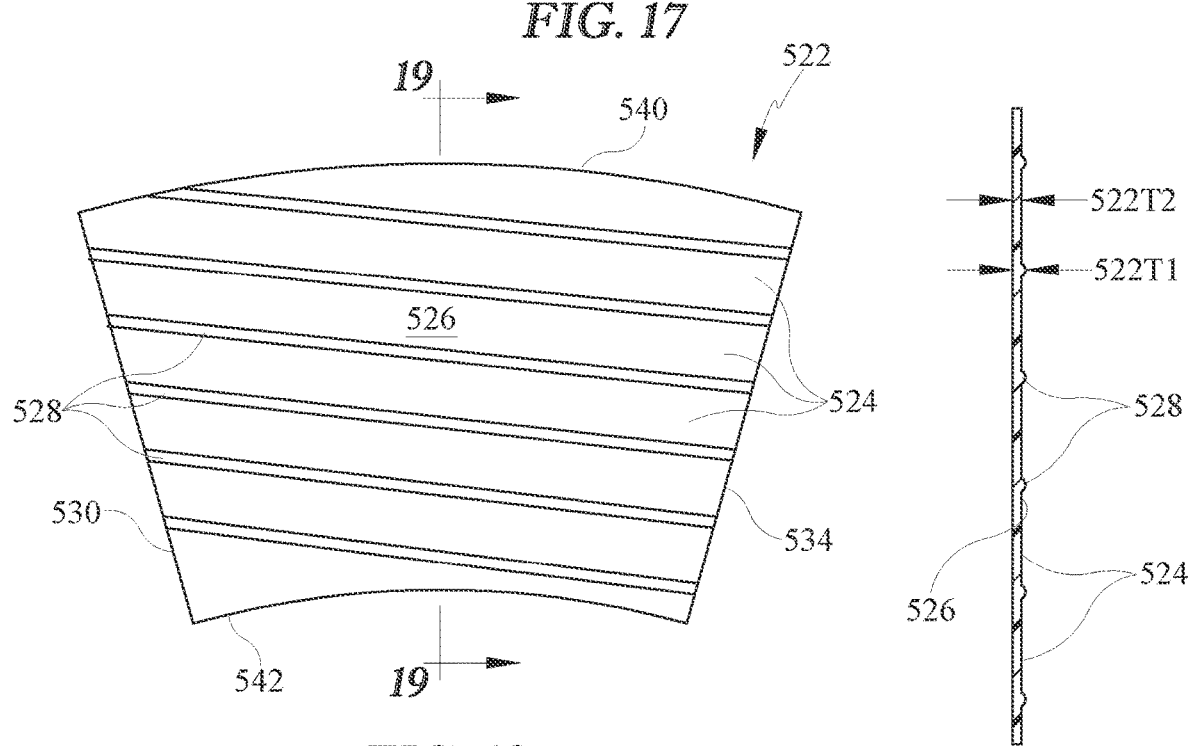
FIG. 18
FIG. 19

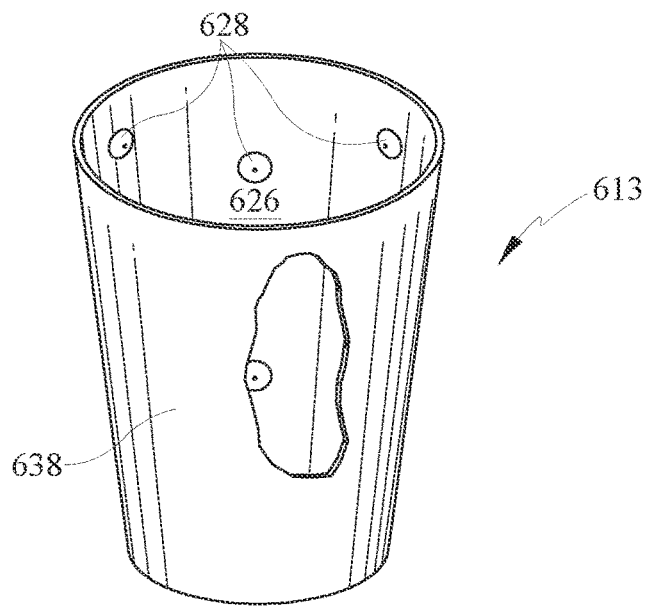
FIG. 20
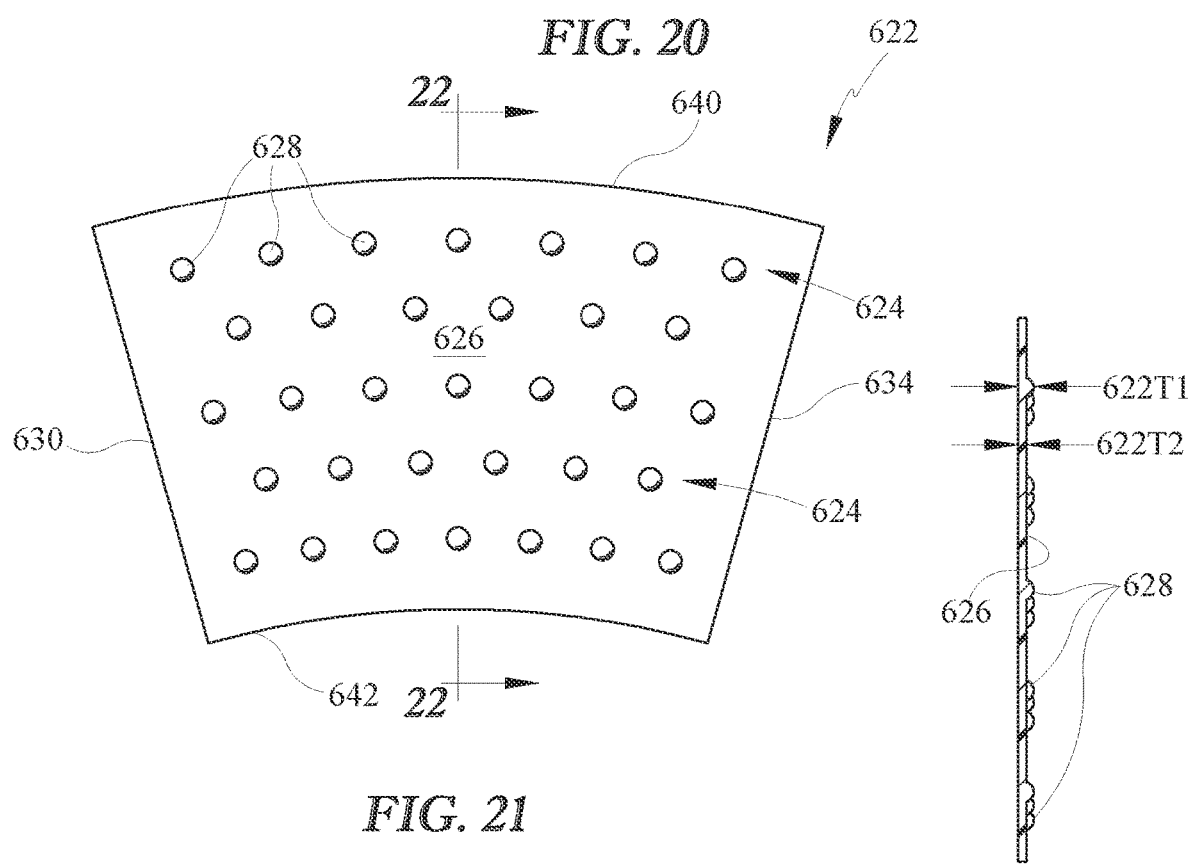
FIG. 21
FIG. 22

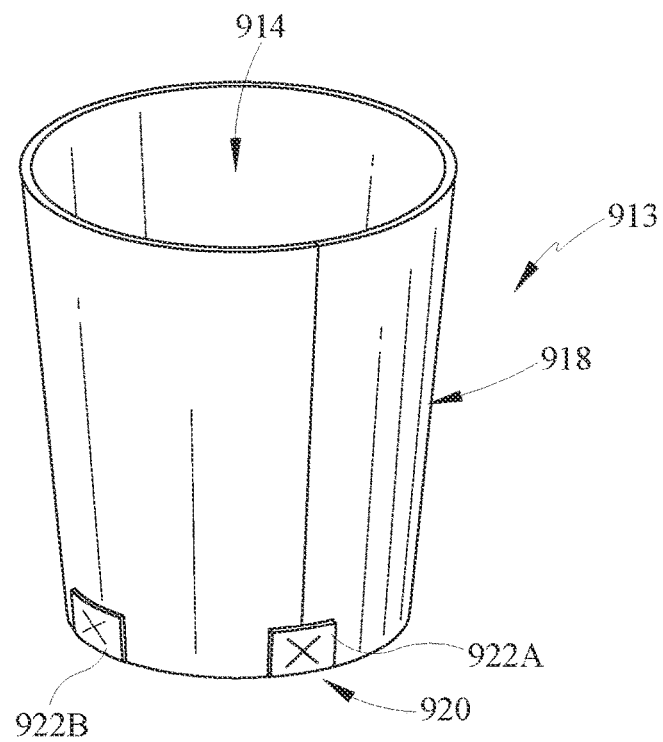
FIG. 29
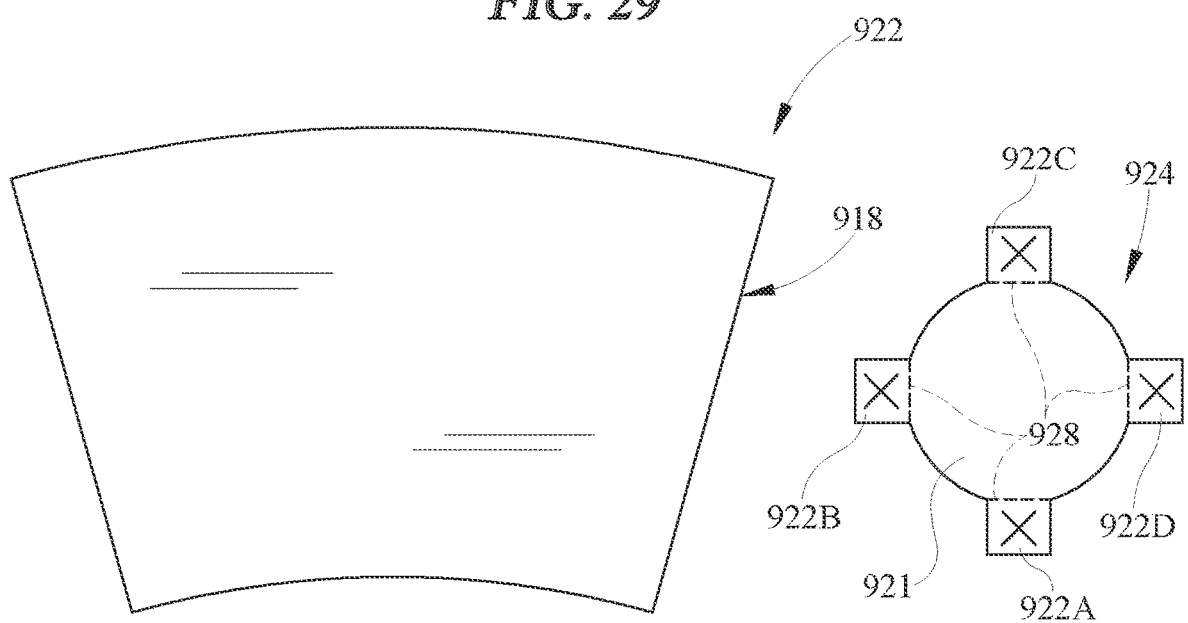
FIG. 30
FIG. 31

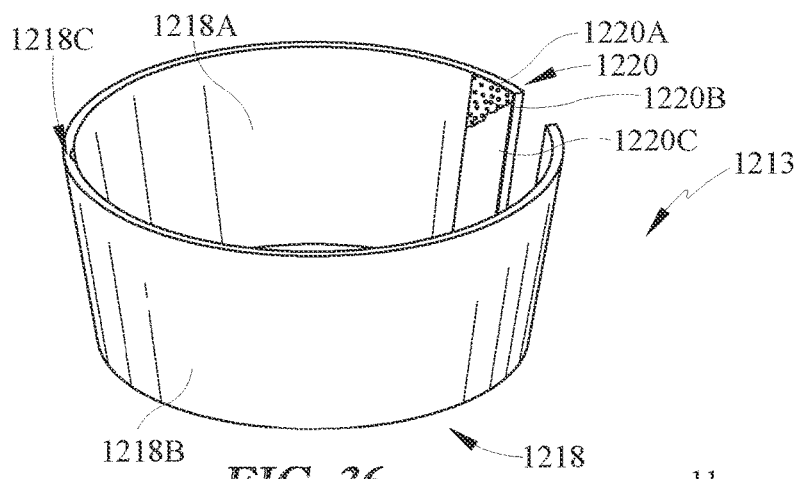
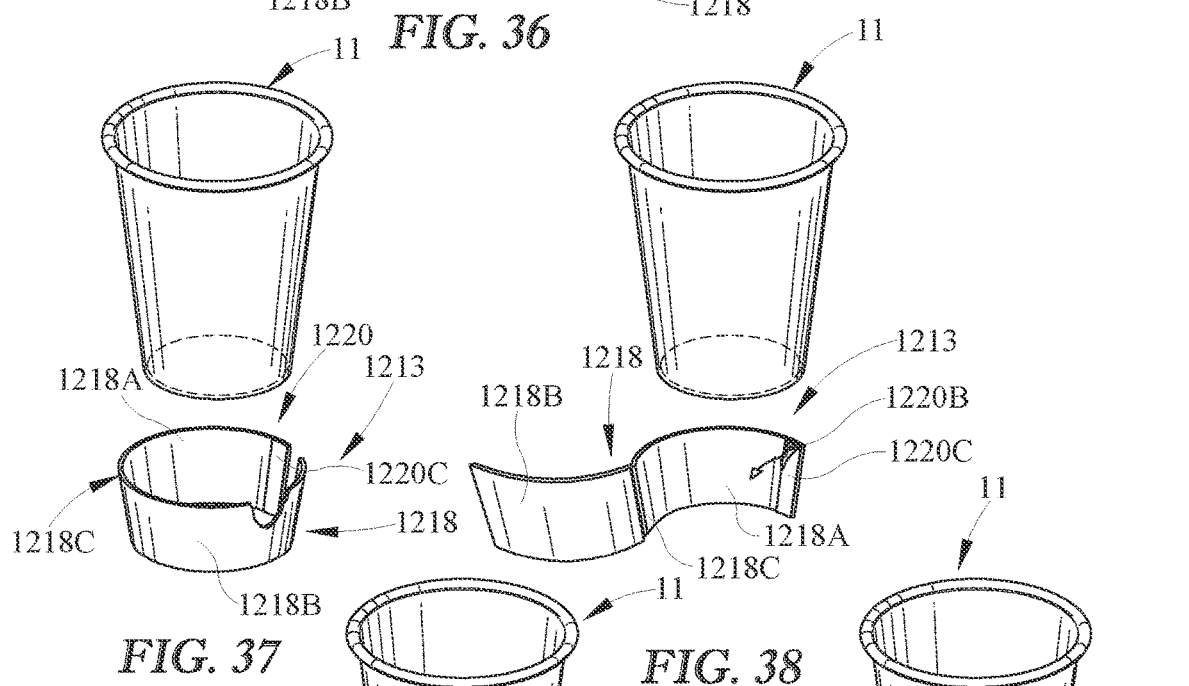
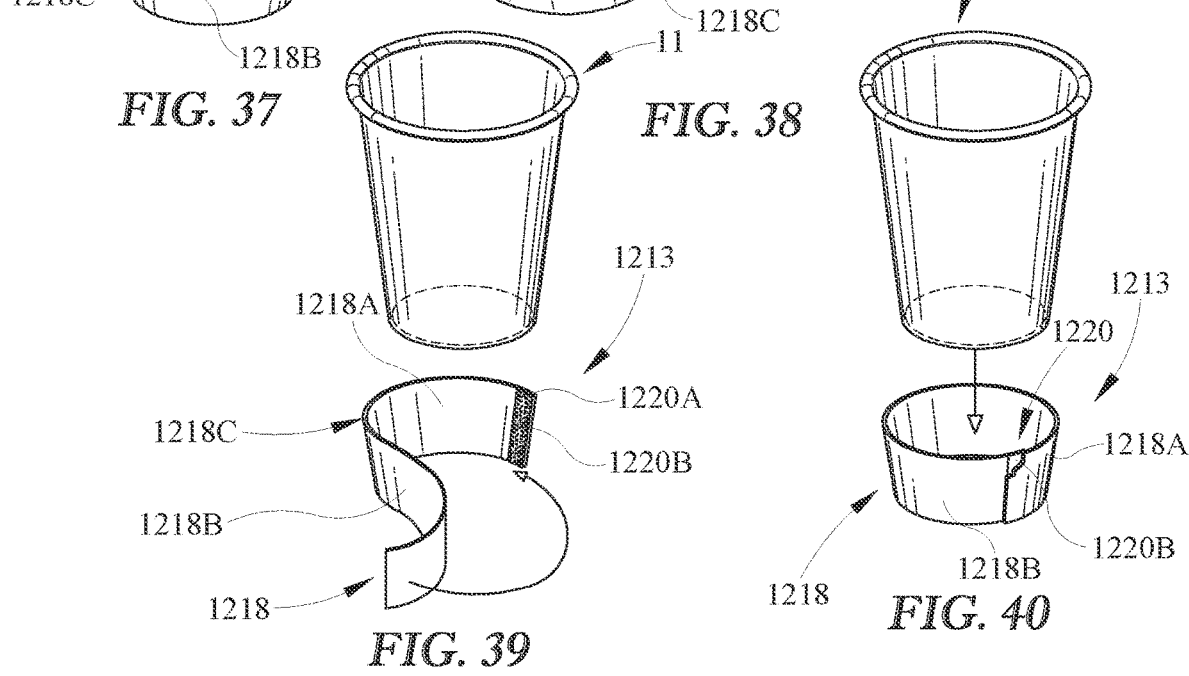

INSULATED CONTAINER

PRIORITY CLAIM

This application is a continuation of U.S. application Ser. No. 16/858,778, filed Apr. 27, 2020, which is continuation of U.S. application Ser. No. 16/430,652, filed Jun. 4, 2019, which is a continuation of U.S. application Ser. No. 15/672,668, filed Aug. 9, 2017, which is a continuation of U.S. application Ser. No. 15/137,657, filed Apr. 25, 2016, which is a continuation of U.S. application Ser. No. 14/755,546, filed Jun. 30, 2015, which is a continuation of U.S. application Ser. No. 13/526,417, filed Jun. 18, 2012, which claims priority under 35 U.S.C. § 119(e) to U.S. Provisional Application No. 61/498,415, filed Jun. 17, 2011 and U.S. Provisional Application No. 61/618,637, filed Mar. 30, 2012, each of which is expressly incorporated by reference herein.

BACKGROUND

The present disclosure relates to containers, such as cups, and particularly to thermoformed containers. More particularly, the present disclosure relates to insulated containers.

SUMMARY

A vessel in accordance with the present disclosure is configured to hold a product in an interior region formed in the container. In illustrative embodiments, the container is a cup.

In illustrative embodiments, an insulative container includes a cup and an insulative sleeve. The insulative sleeve is coupled to an exterior surface of the cup to insulate a consumer holding the cup from hot or cold temperatures associated with materials or beverages stored in the cup.

In illustrative embodiments, the insulative sleeve is made of a sheet comprising an insulative cellular non-aromatic polymeric material. In some embodiments of the present disclosure, the sheet includes a strip of insulative cellular non-aromatic polymeric material and a skin coupled to the strip and configured to display artwork and text. In other embodiments of the present disclosure, such text and artwork are printed directly on an exterior surface of the strip of insulative cellular non-aromatic polymeric material. In illustrative embodiments, the floor also comprises insulative cellular non-aromatic polymeric material.

In illustrative embodiments, the insulative sleeve is arranged to surround and embrace an exterior surface of a hot-beverage drink cup to provide a grippable low-temperature thermal barrier that can be gripped by a consumer. The sleeve comprises a sheet comprising insulative cellular non-aromatic polymeric material configured to provide means for enabling localized plastic deformation in the sheet to provide a plastically deformed first material segment having a first density located in a first portion of the sheet and a second material segment having a second density lower than the first density located in an adjacent second portion of the sheet without fracturing the insulative cellular non-aromatic polymeric material so that a predetermined insulative characteristic is maintained in the sheet.

The insulative cellular non-aromatic polymeric material included in the insulative sleeve is configured in accordance with the present disclosure to provide means for enabling localized plastic deformation in the insulative sleeve to provide (1) a plastically deformed first material segment having a first density in a first portion of the insulative sleeve and (2) a second material segment having a relatively lower second density in an adjacent second portion of the insulative sleeve. In illustrative embodiments, the more dense first material segment is thinner than the second material segment.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
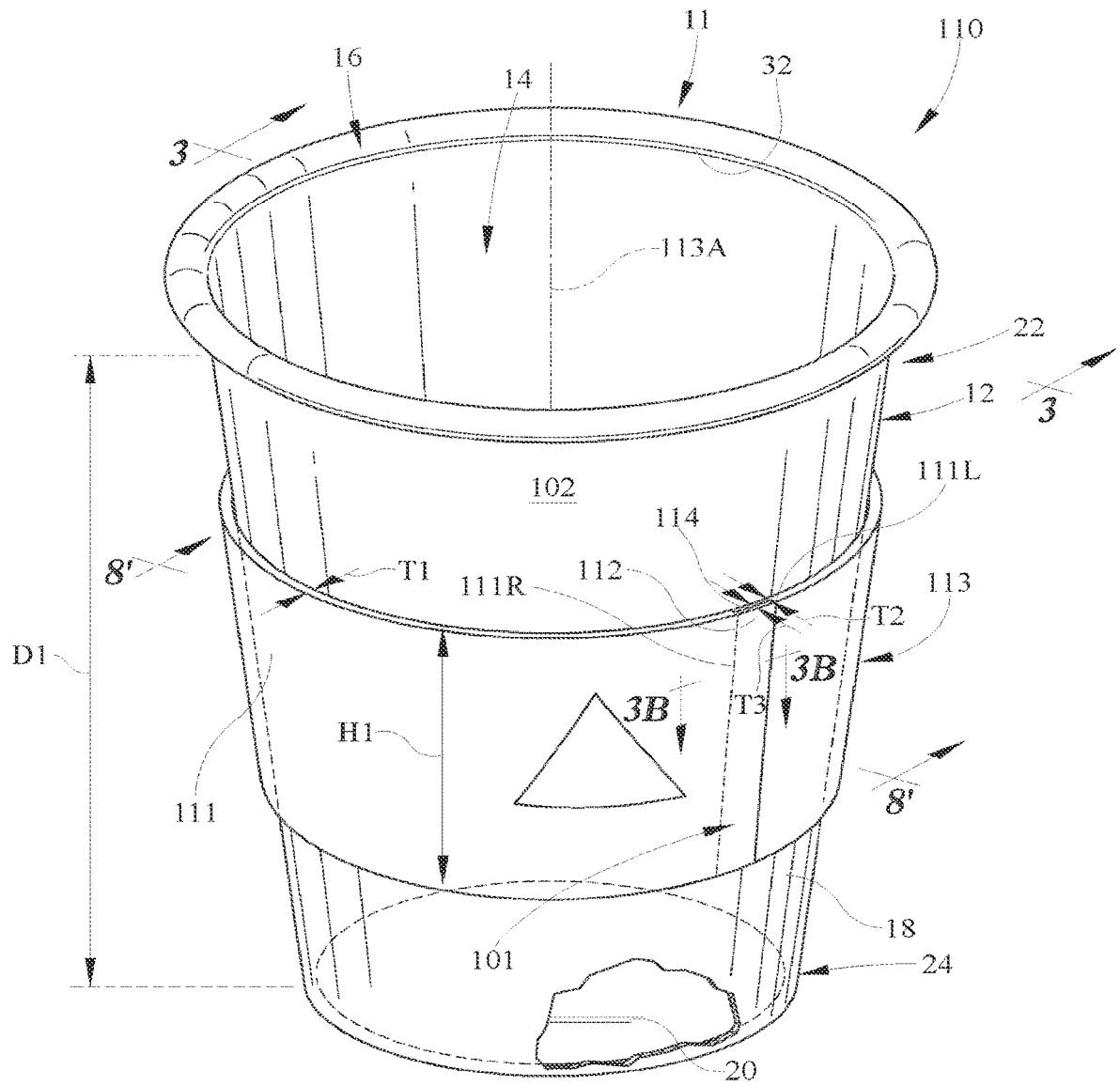
FIG. 1 is a perspective view of a first embodiment of an insulative container in accordance with the present disclosure showing that the insulative container includes a cup including a rolled brim and a base including a sleeve-shaped side wall and a floor and an insulative sleeve coupled to exterior surface of the side wall to extend around the side wall of the cup.
Figures 3, 3A:
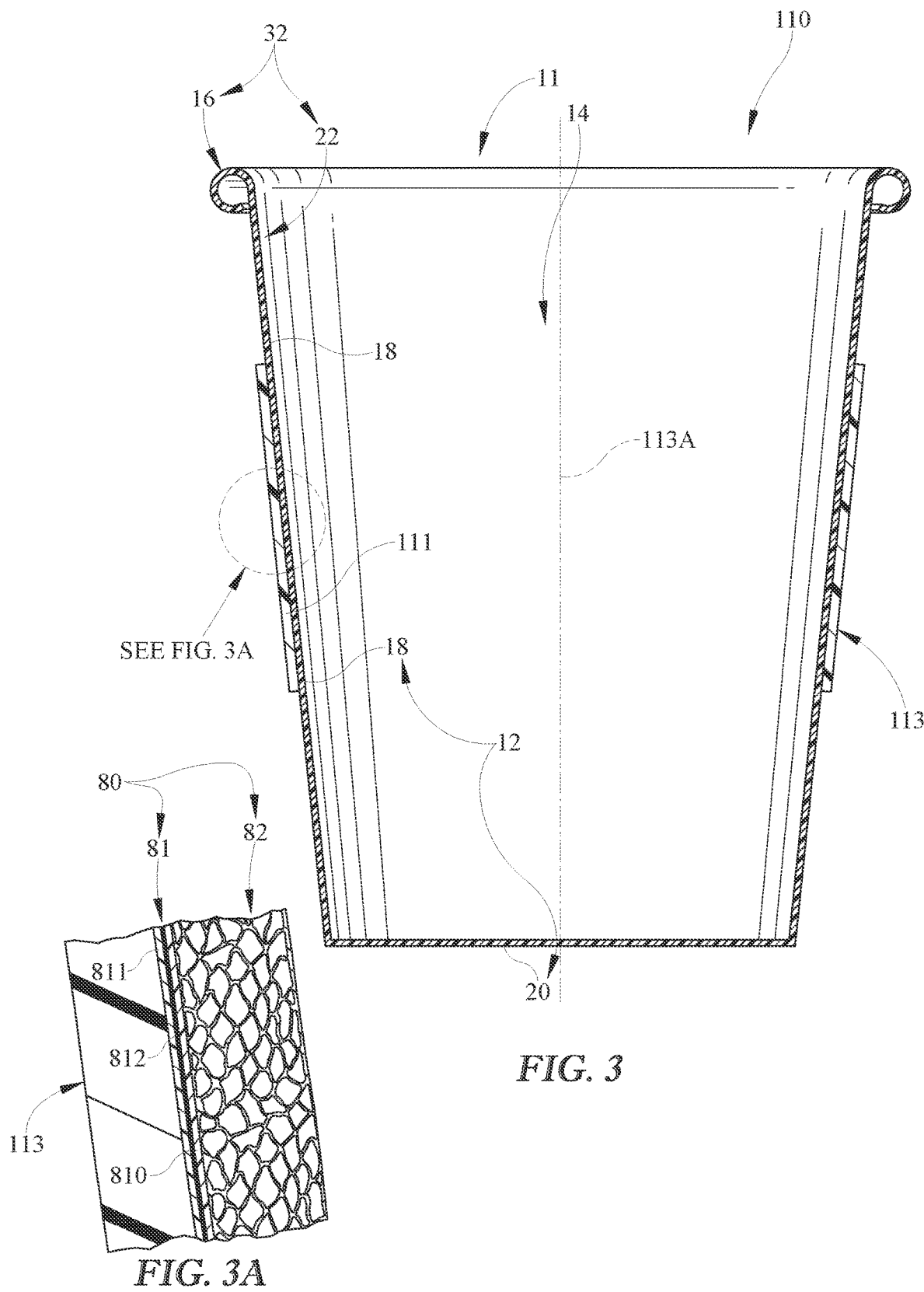
FIG. 3 is a sectional view taken along line 3-3 of FIG. 1 showing that the insulative sleeve is coupled to the side wall included in the base of the cup and positioned to lie between and in spaced-apart relation from each of the rolled brim and the floor.
FIG. 3A is an enlarged sectional view of a portion of the side wall included in the body of the insulative cup of FIG. 3 and a portion of the insulative sleeve and showing that the side wall is made from a sheet that includes, from left to right, a skin including a film, an ink layer, and an adhesive layer, and a strip of insulative cellular non-aromatic polymer material.
Figure 3B:
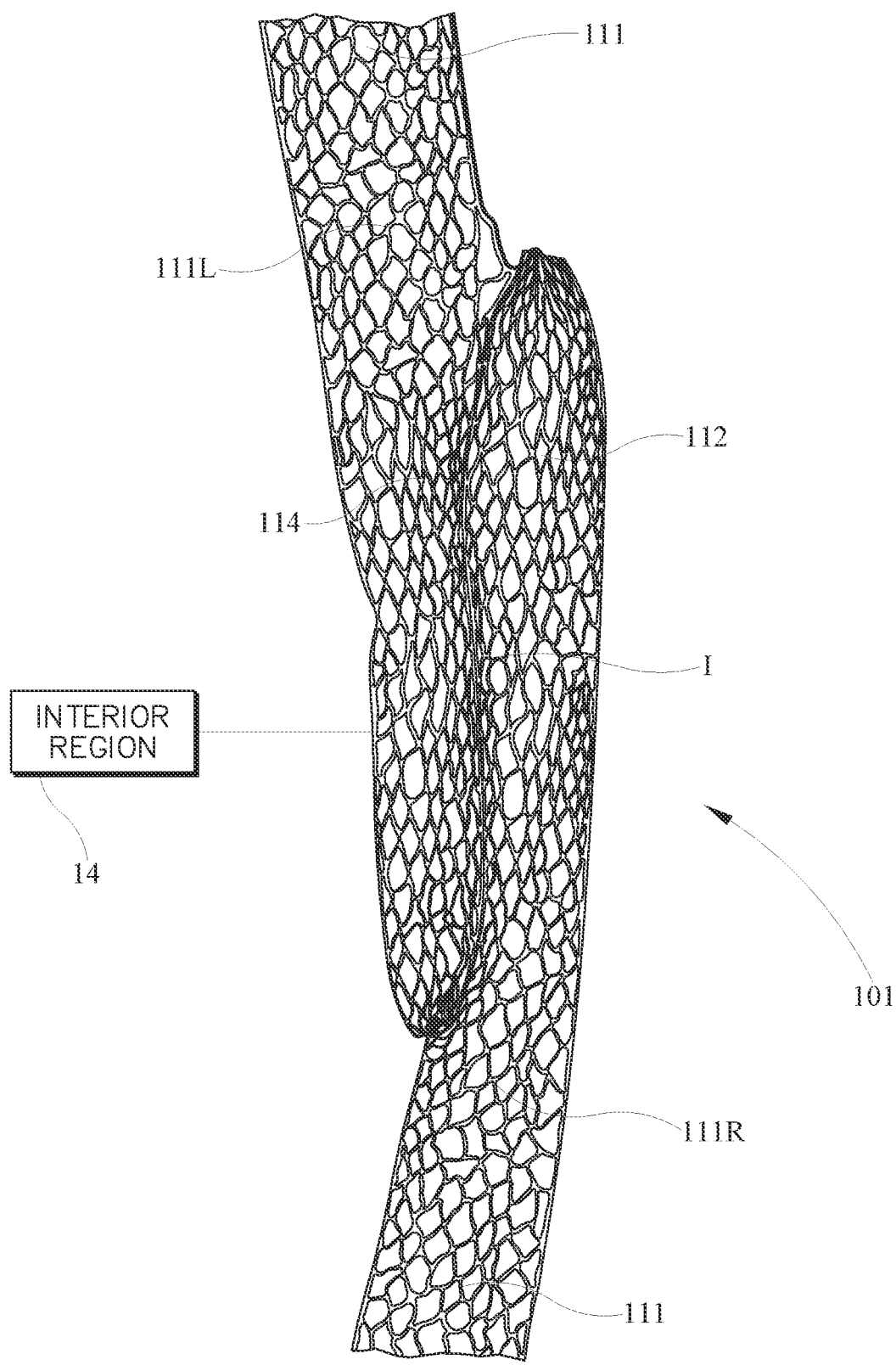
Figure 4:
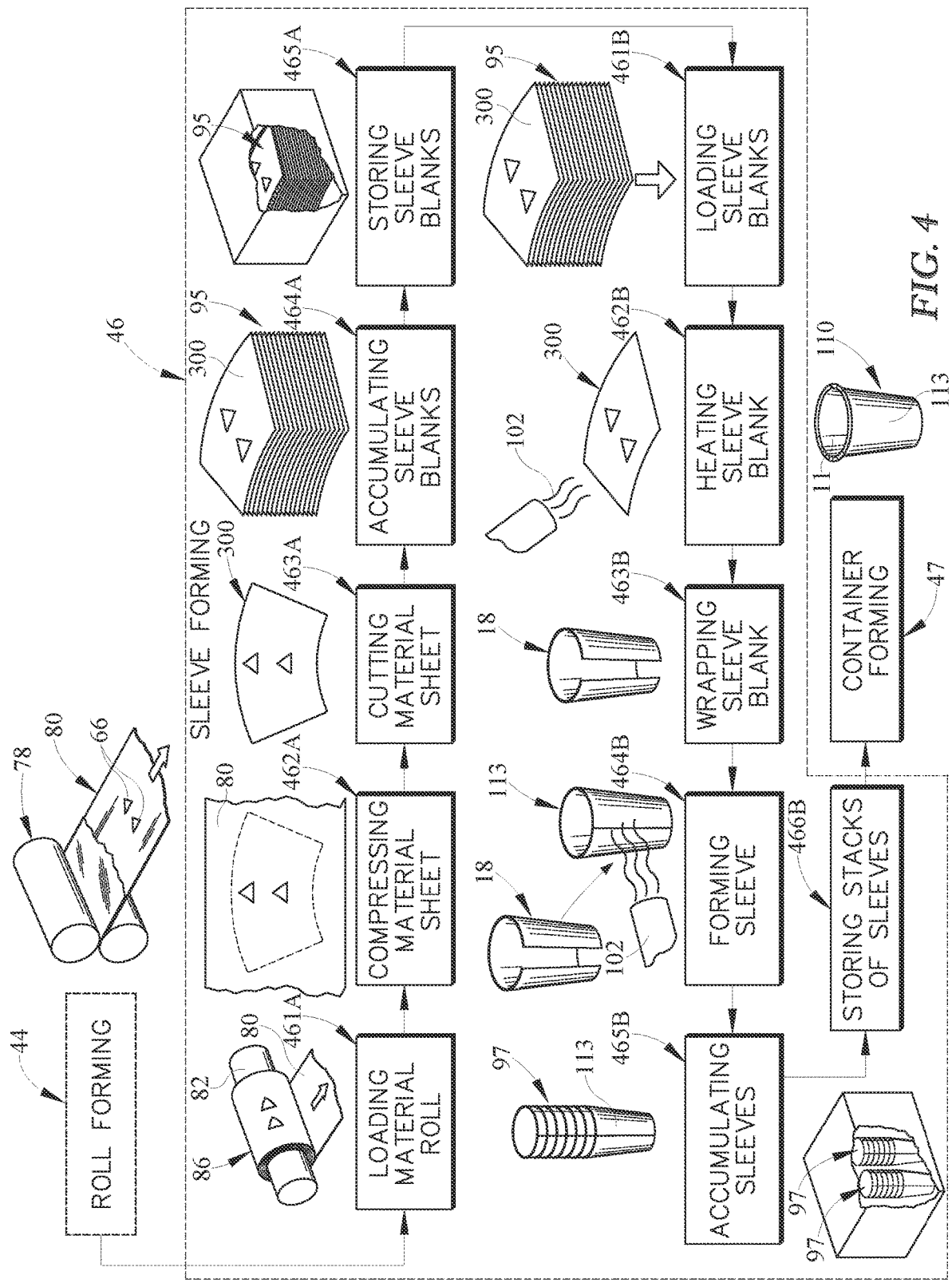
Figure 5:
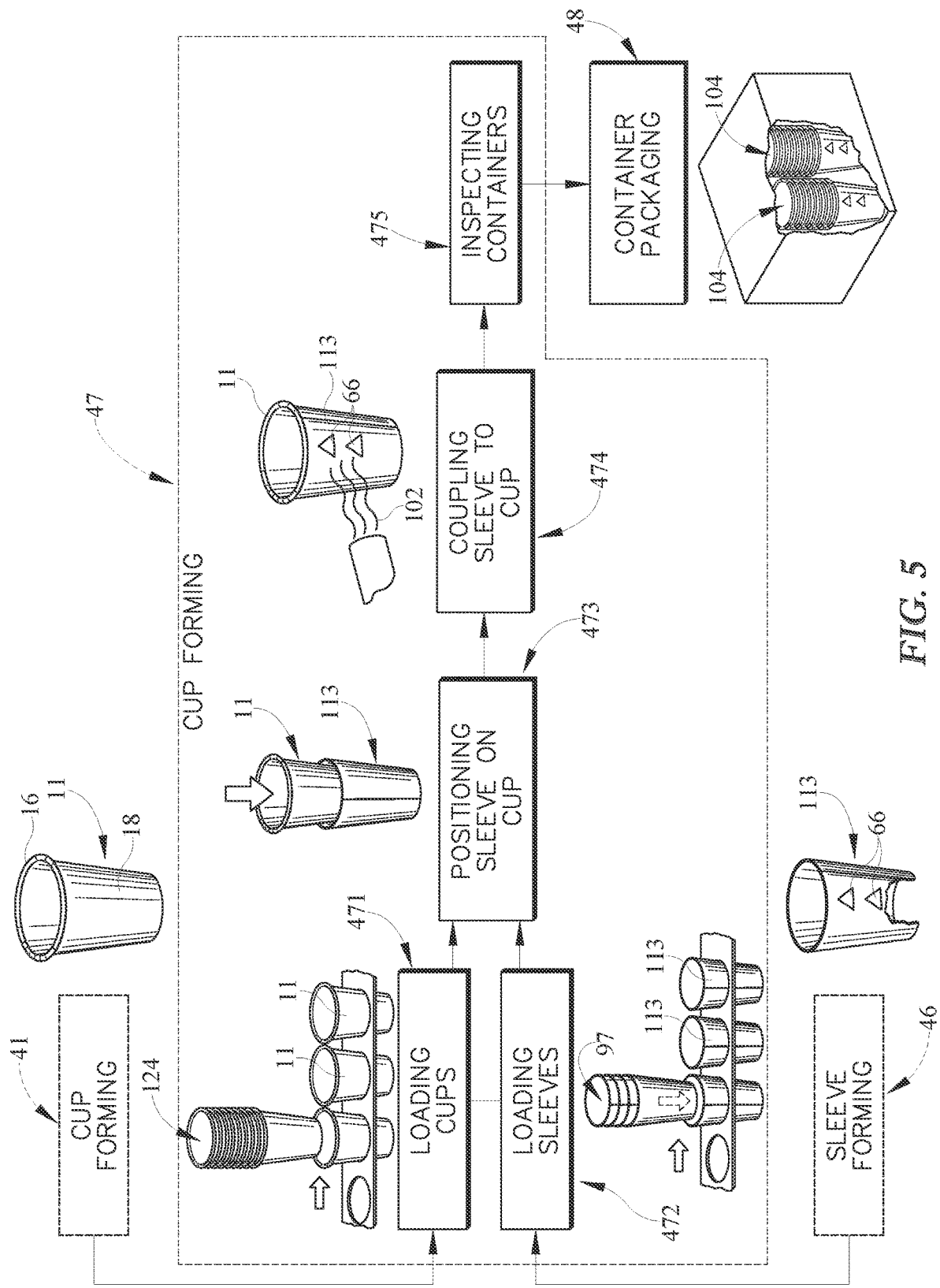
Figure 6:
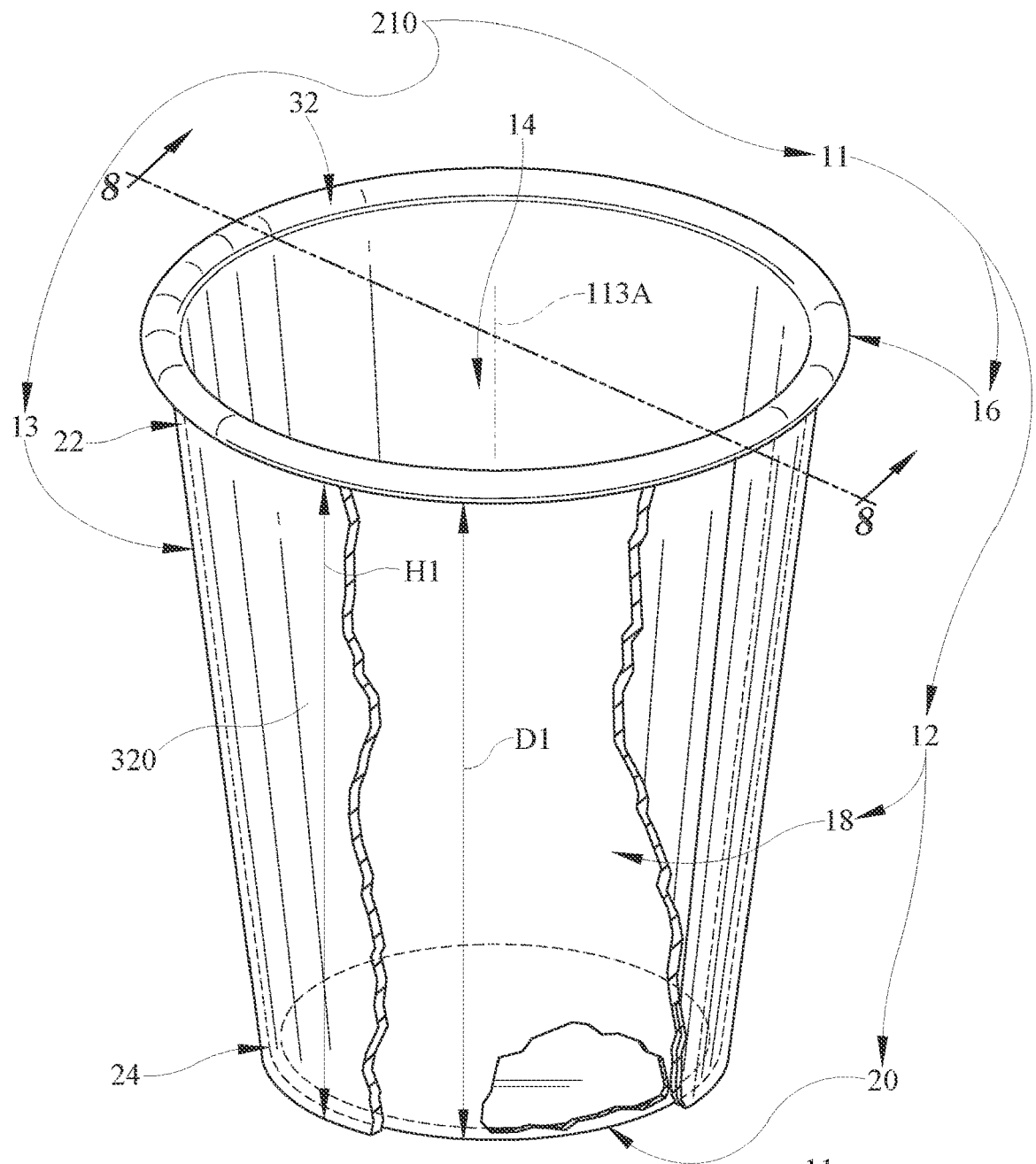
Figure 7:
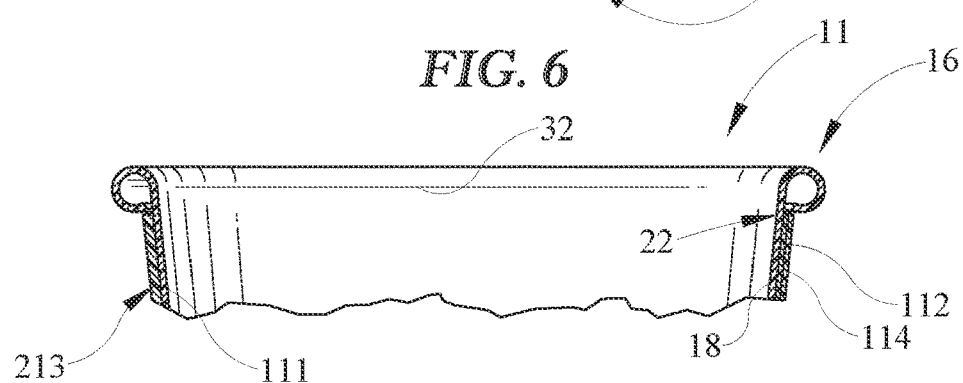
Figure 8:
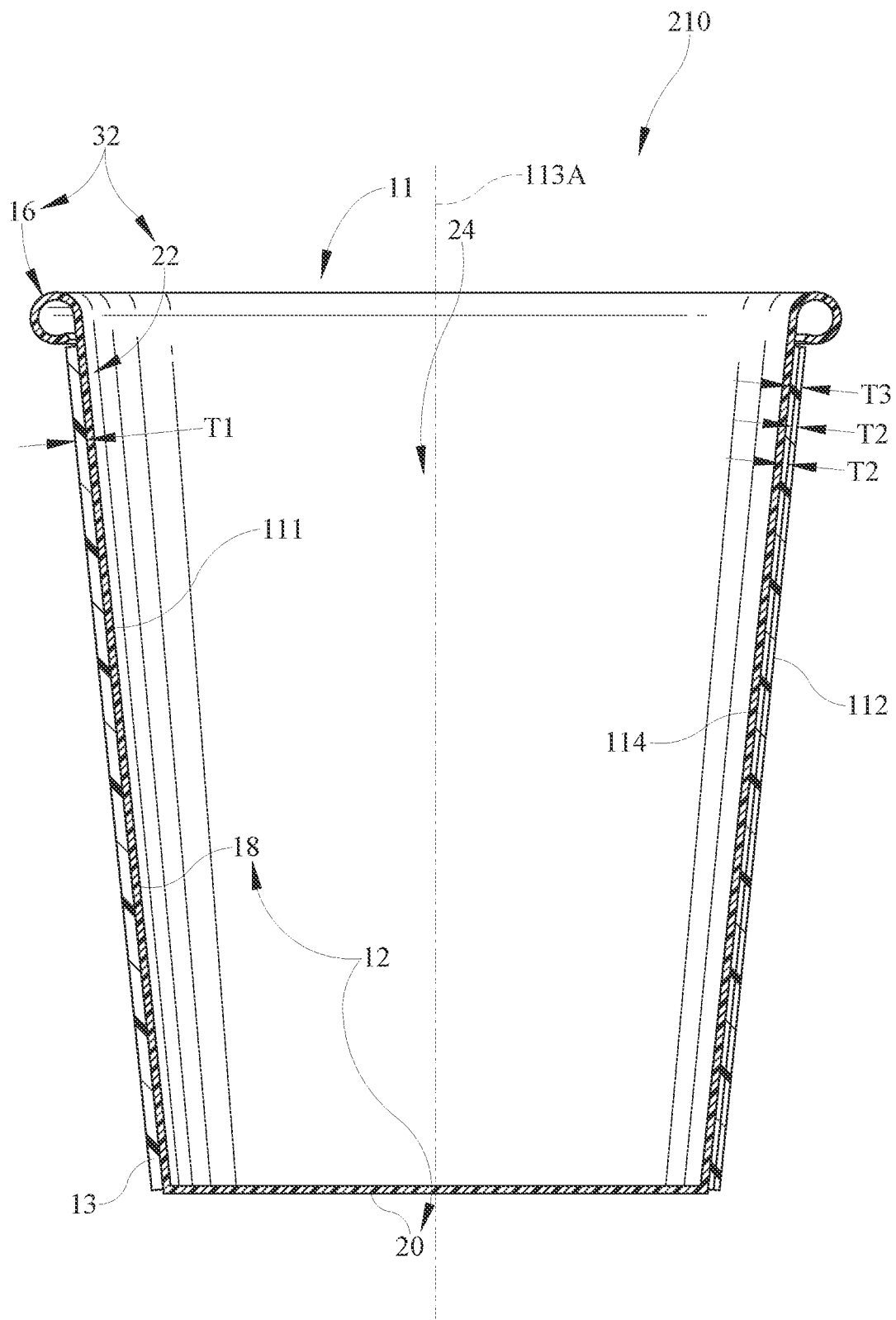
Figure 9:
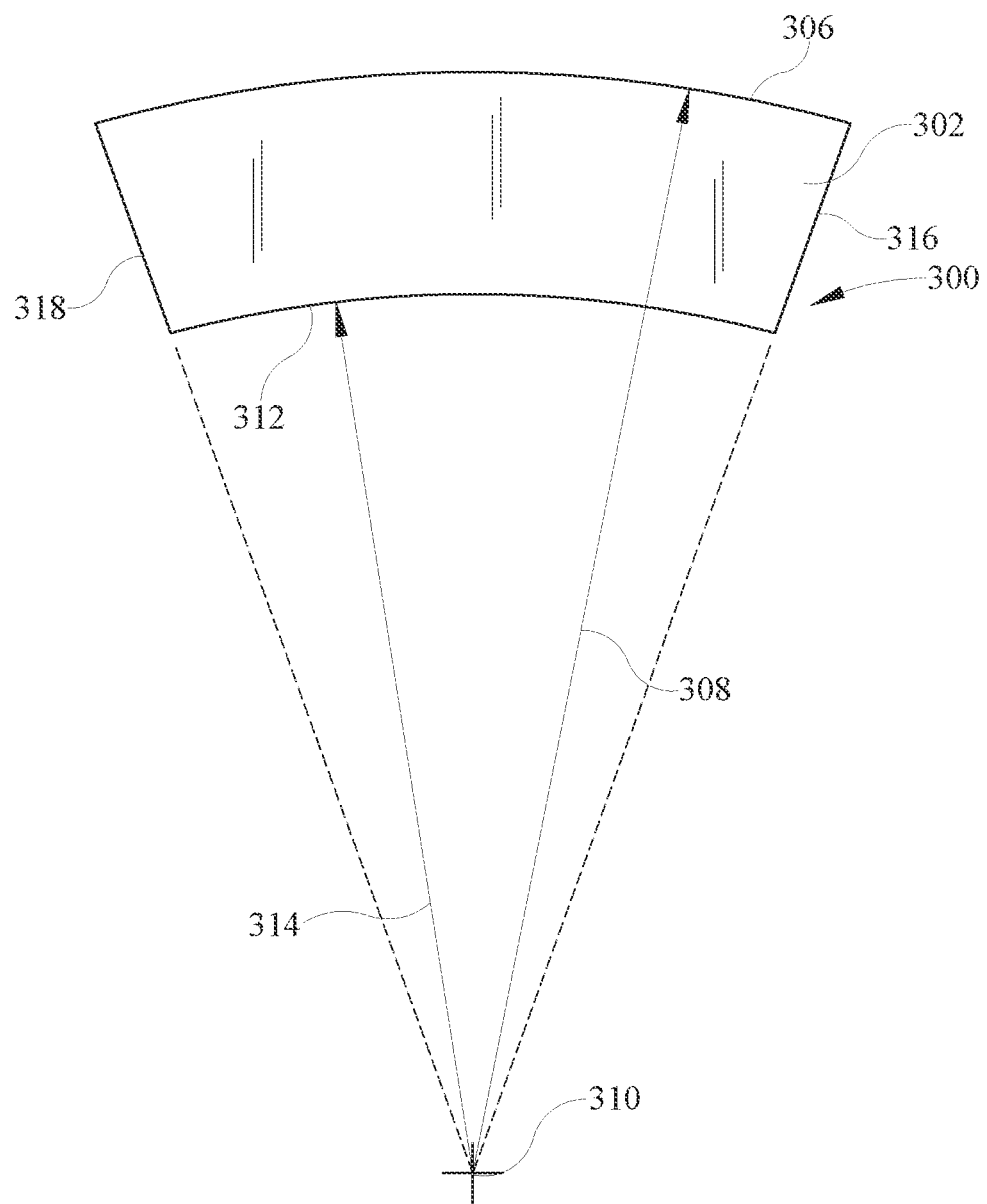
Figure 10:
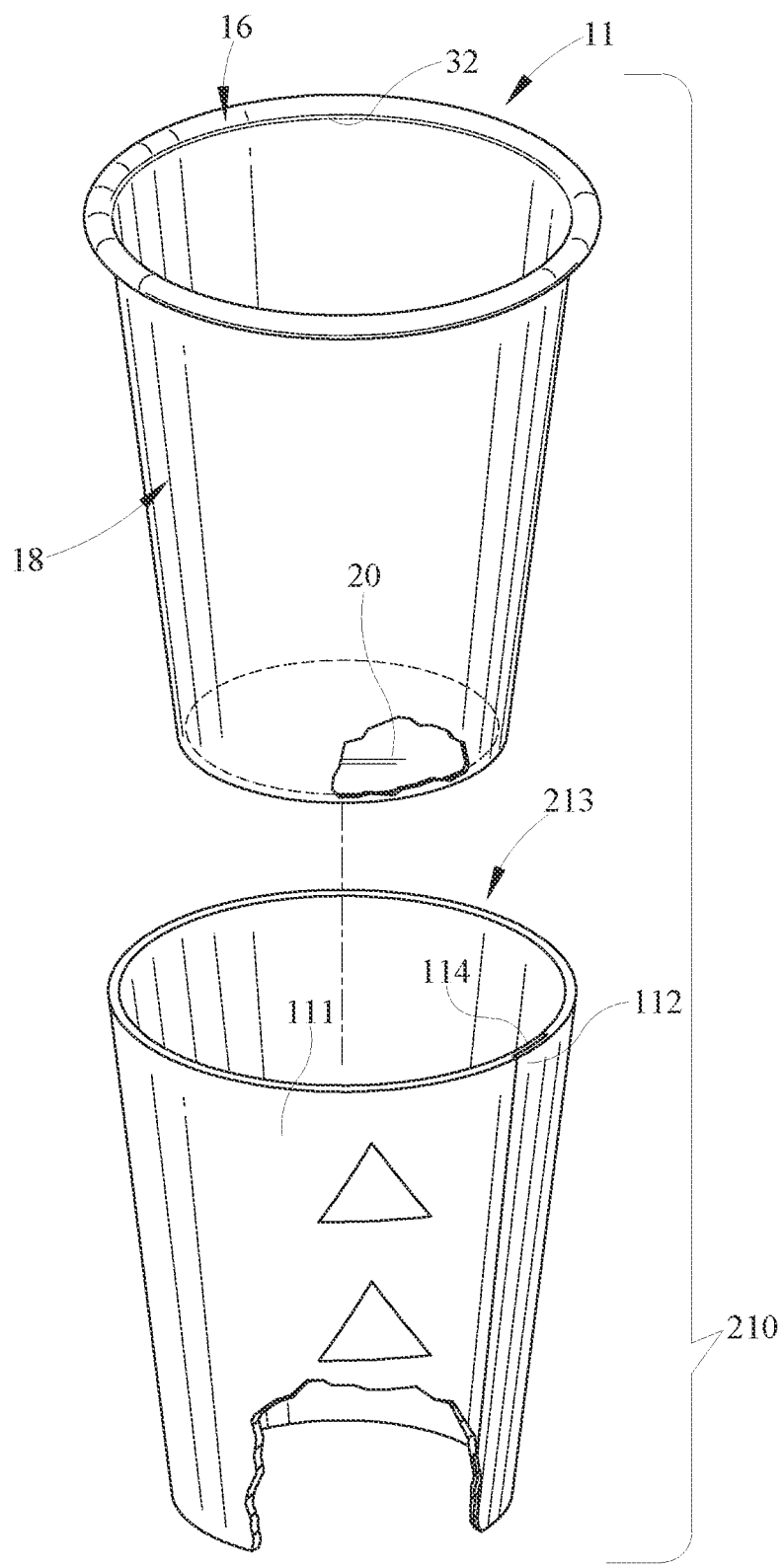
Figure 14:
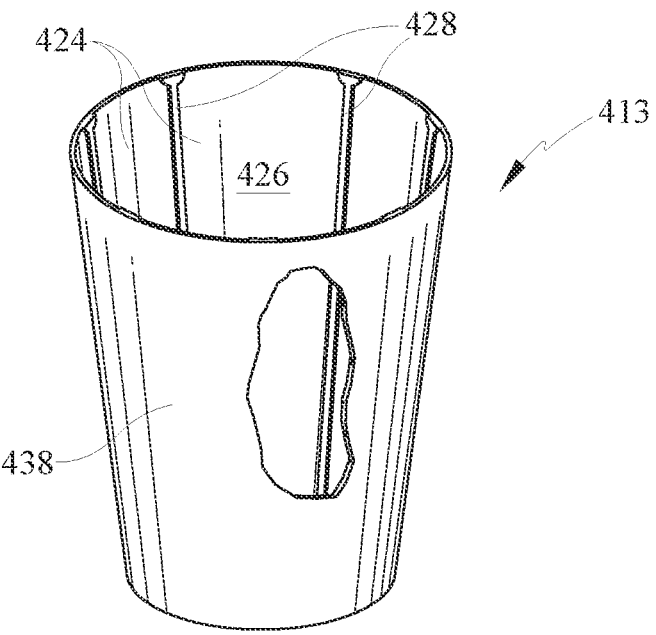
Figure 15:
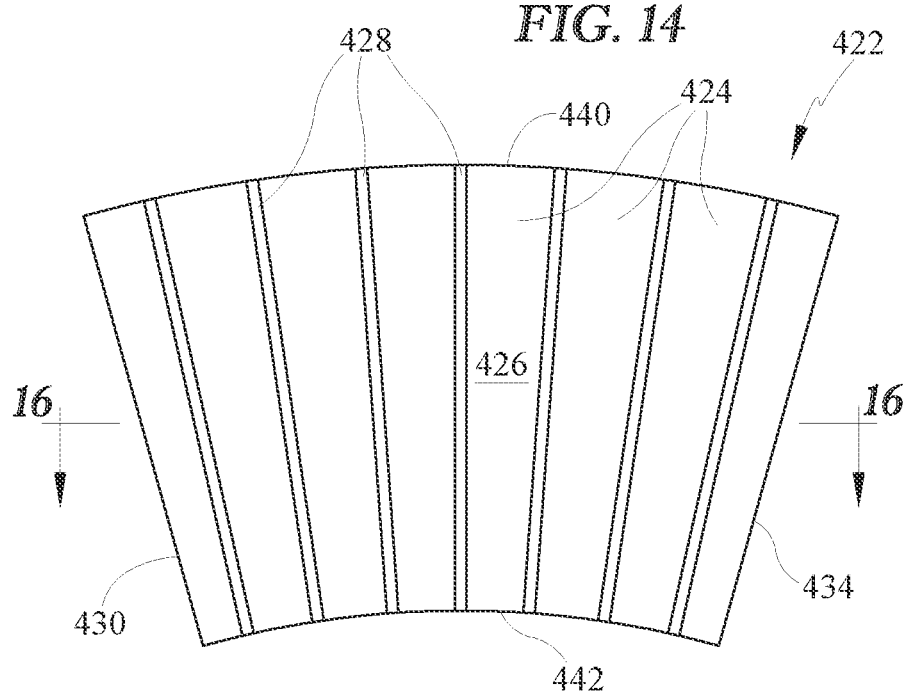
Figure 16:
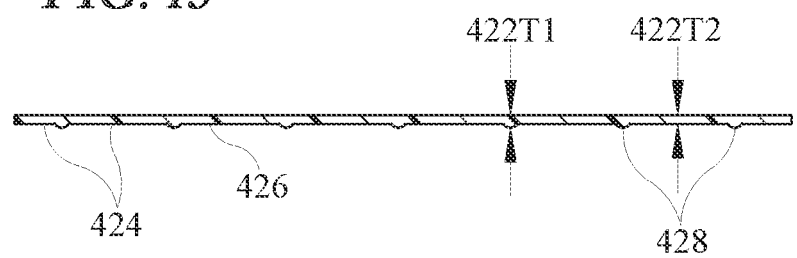
Figure 23:
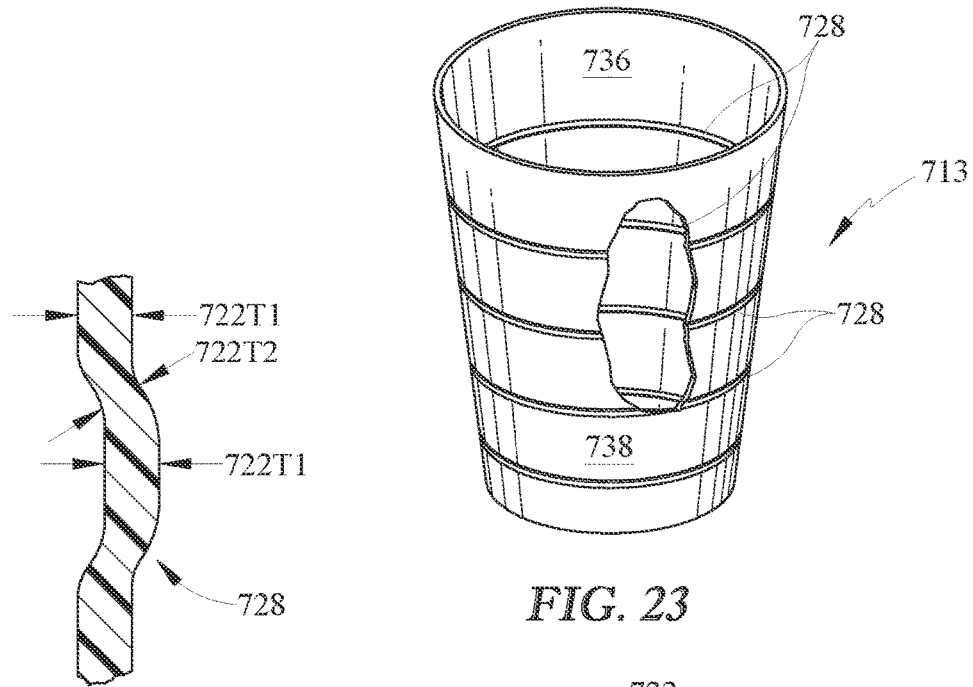
Figure 26:
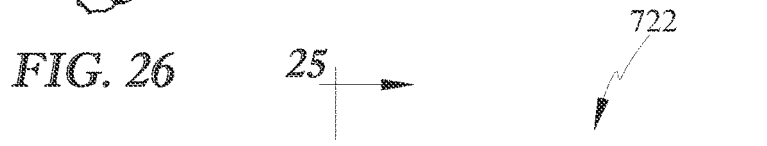
Figure 24:
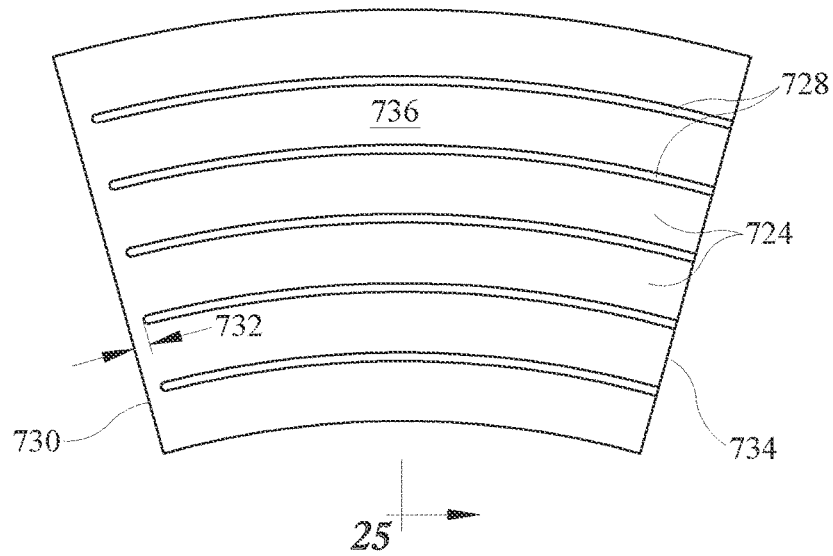
Figure 25:
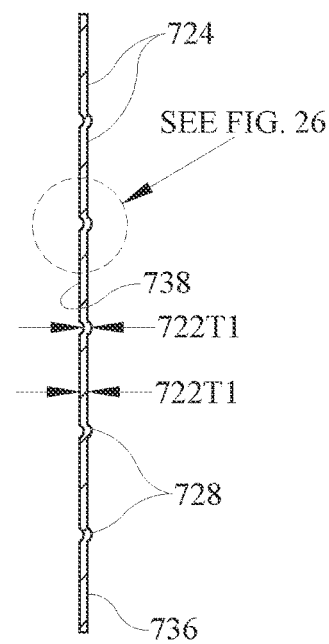
Figure 27:
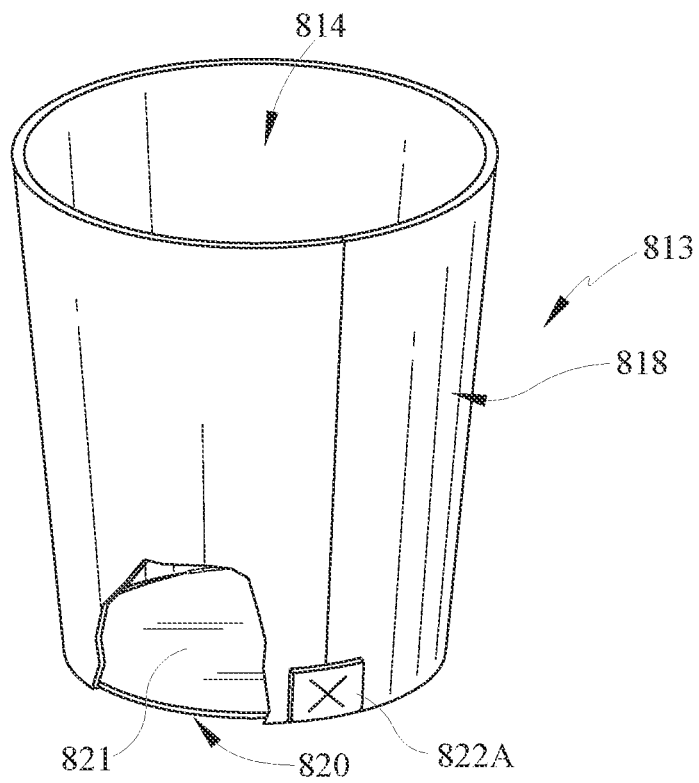
Figure 28:
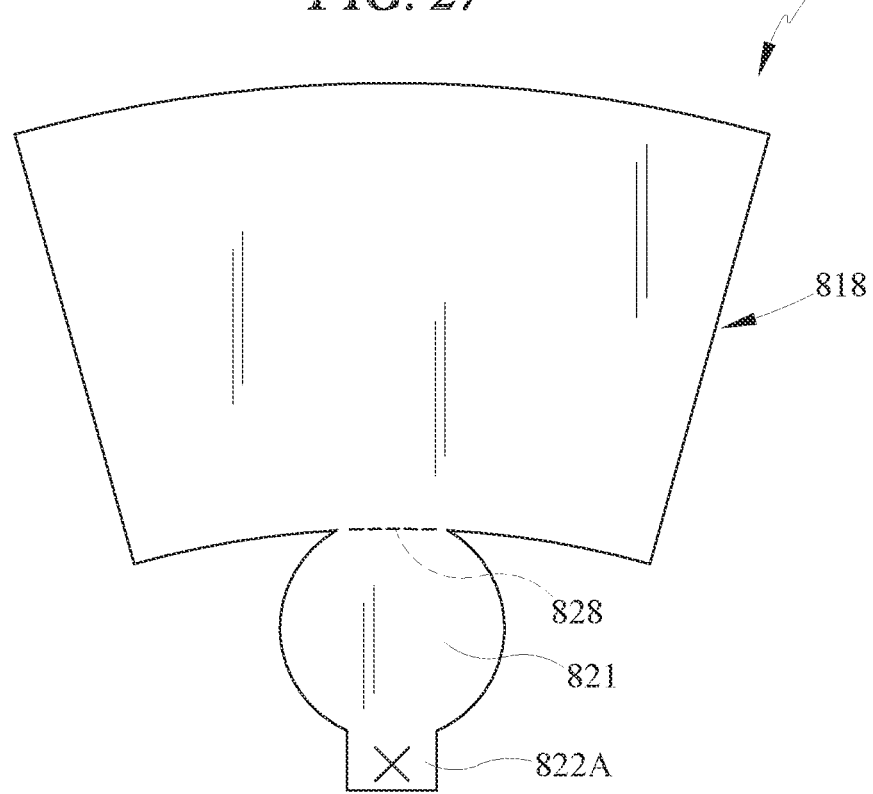
Figure 32:
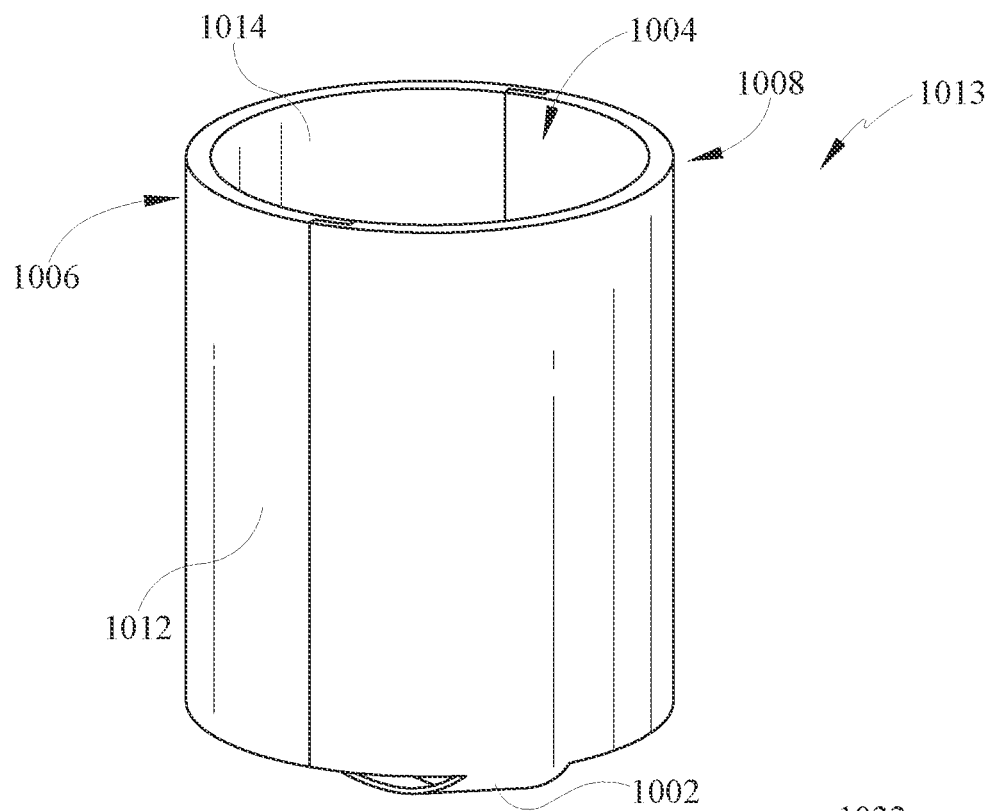
Figure 33:
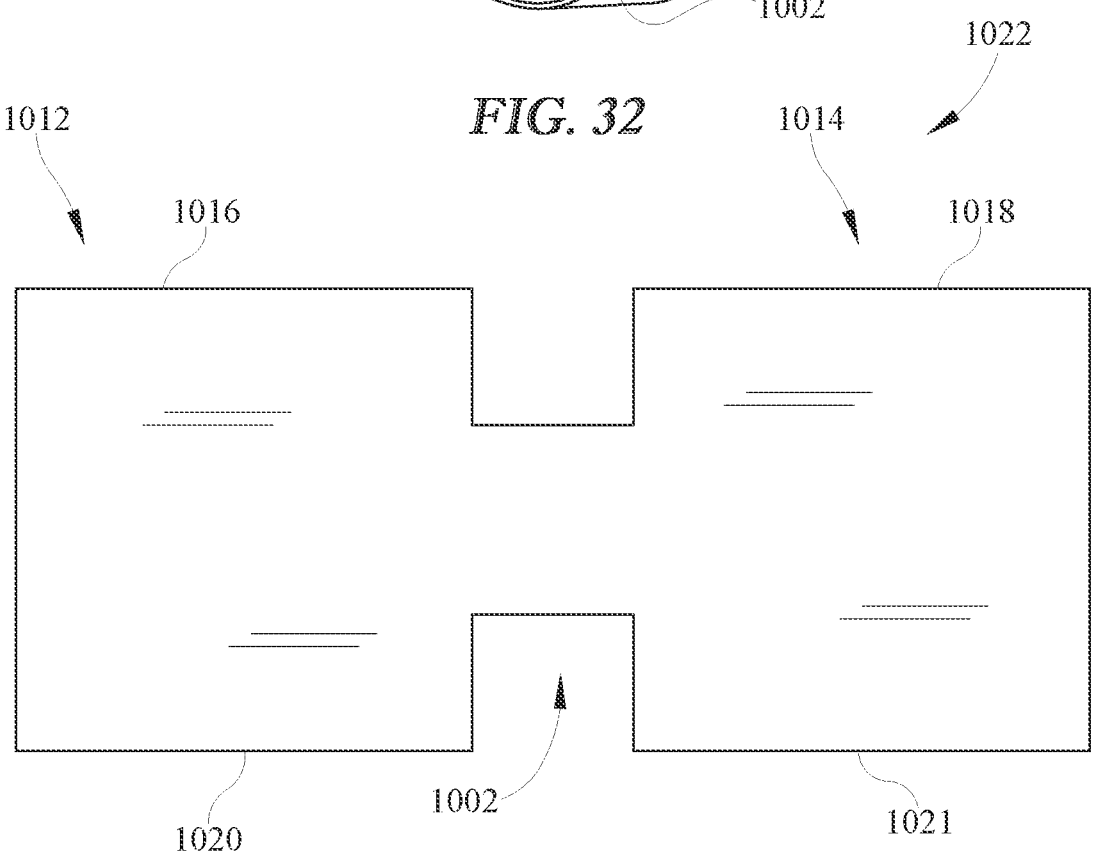
Figure 34:
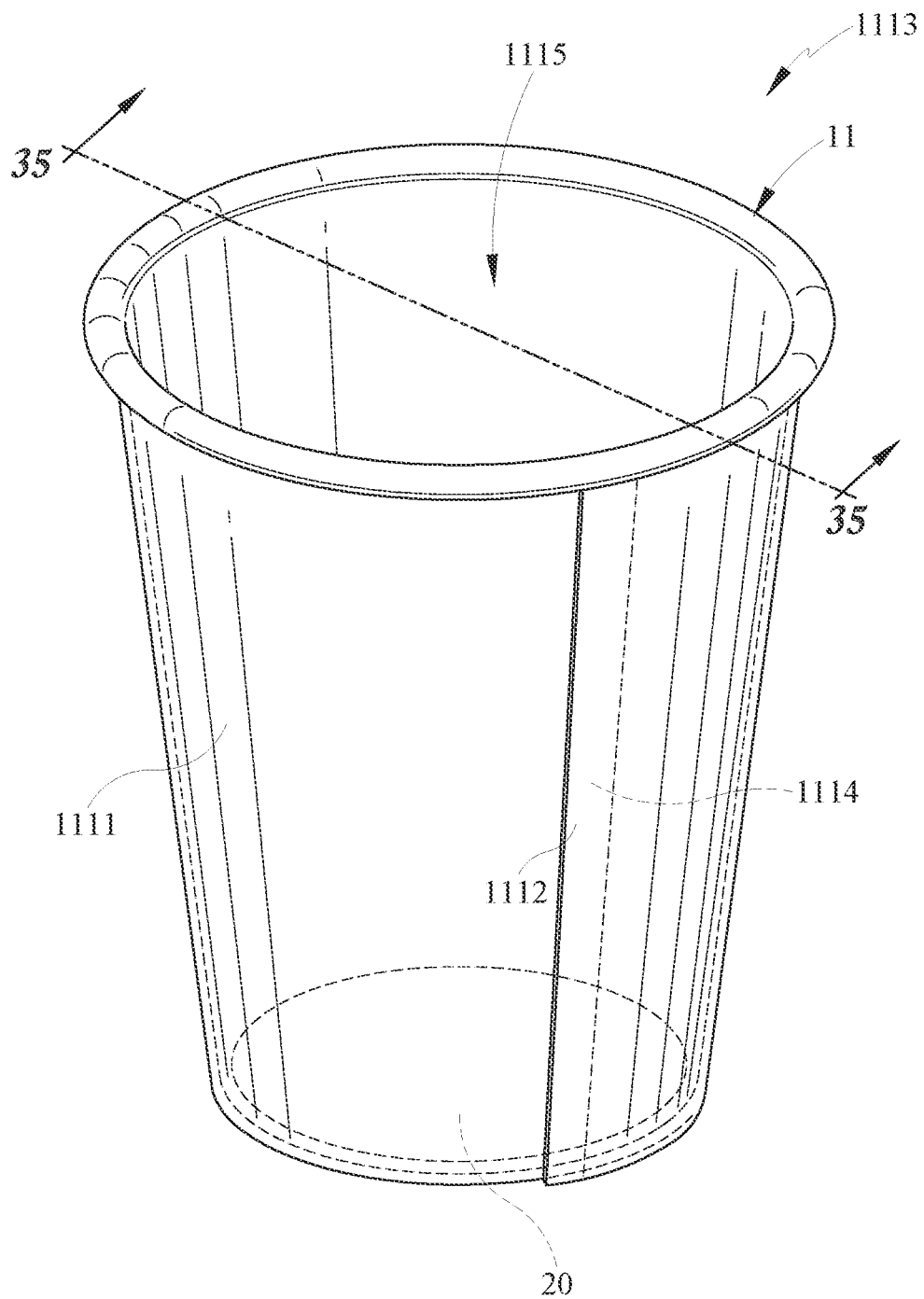
Figure 35:
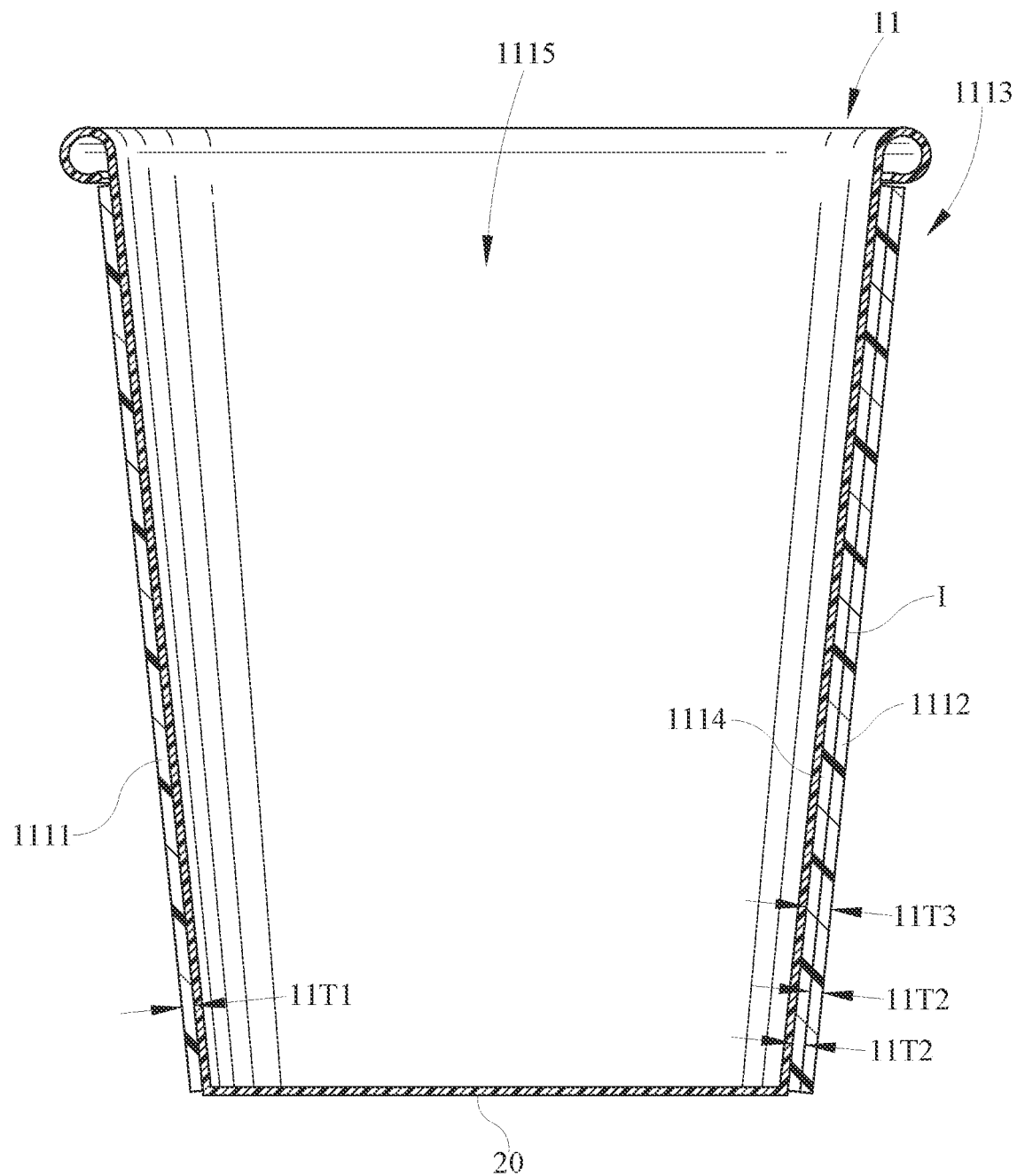
Figure 41:
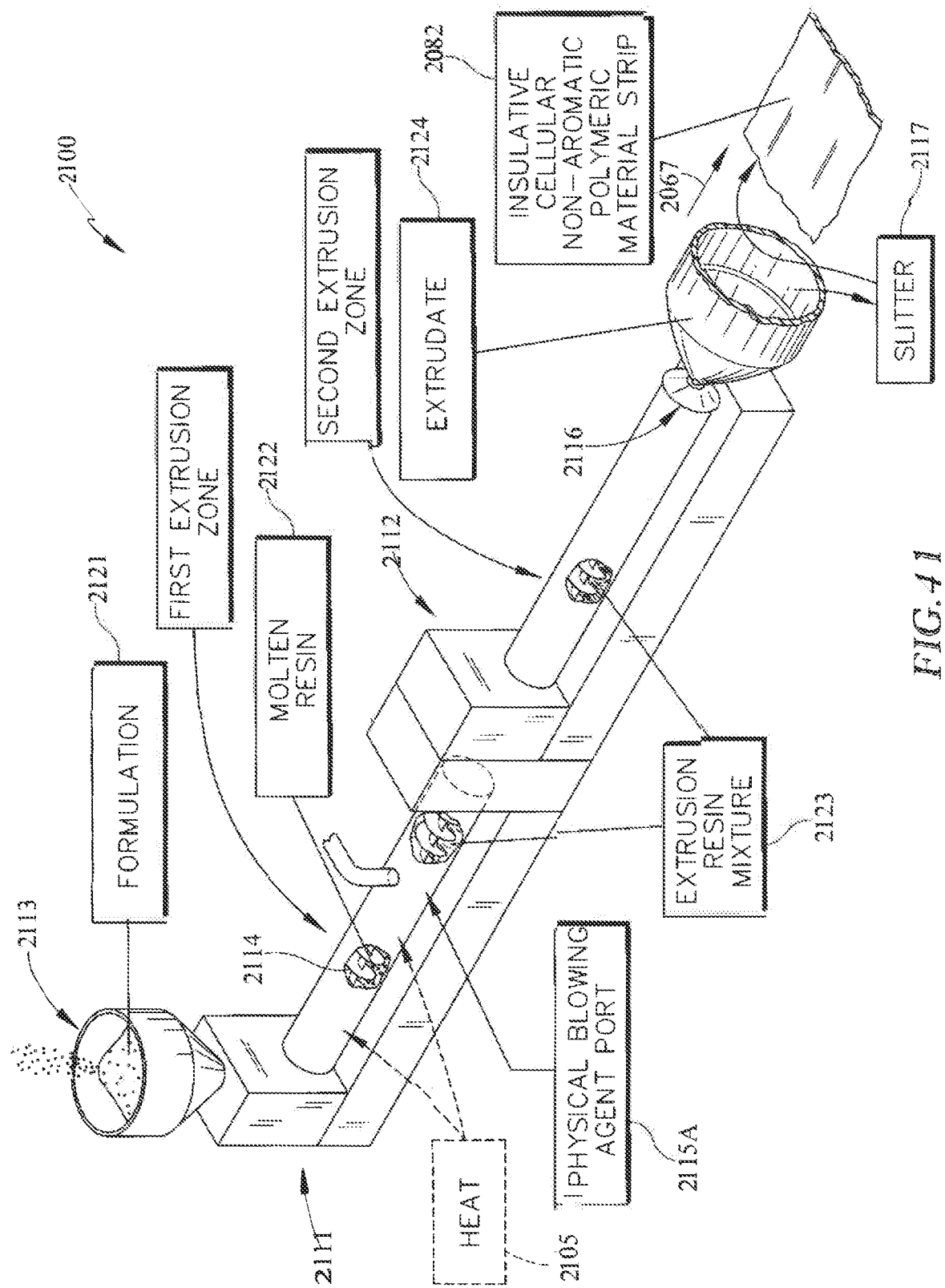
Figures 42, 43:
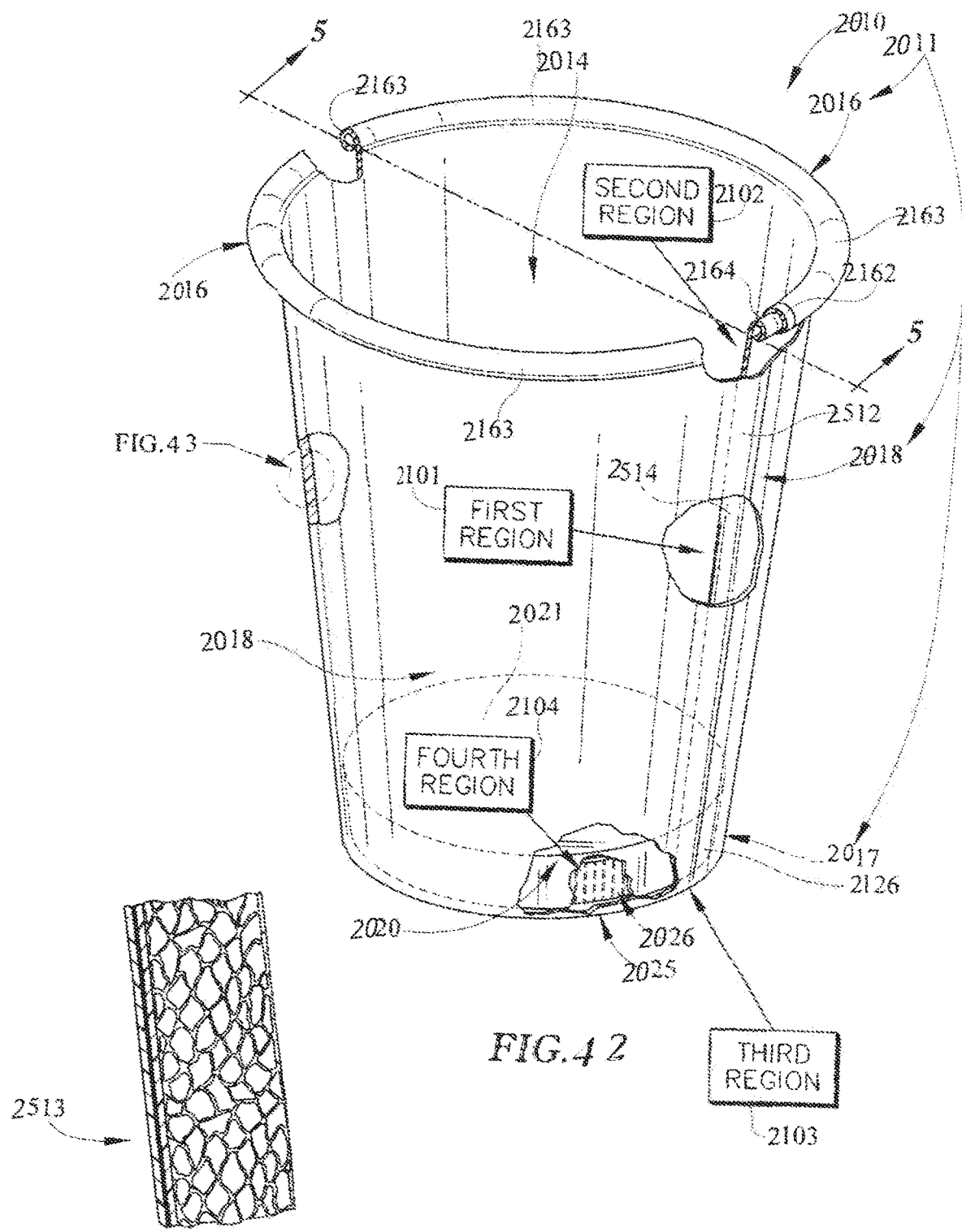
Figure 44:
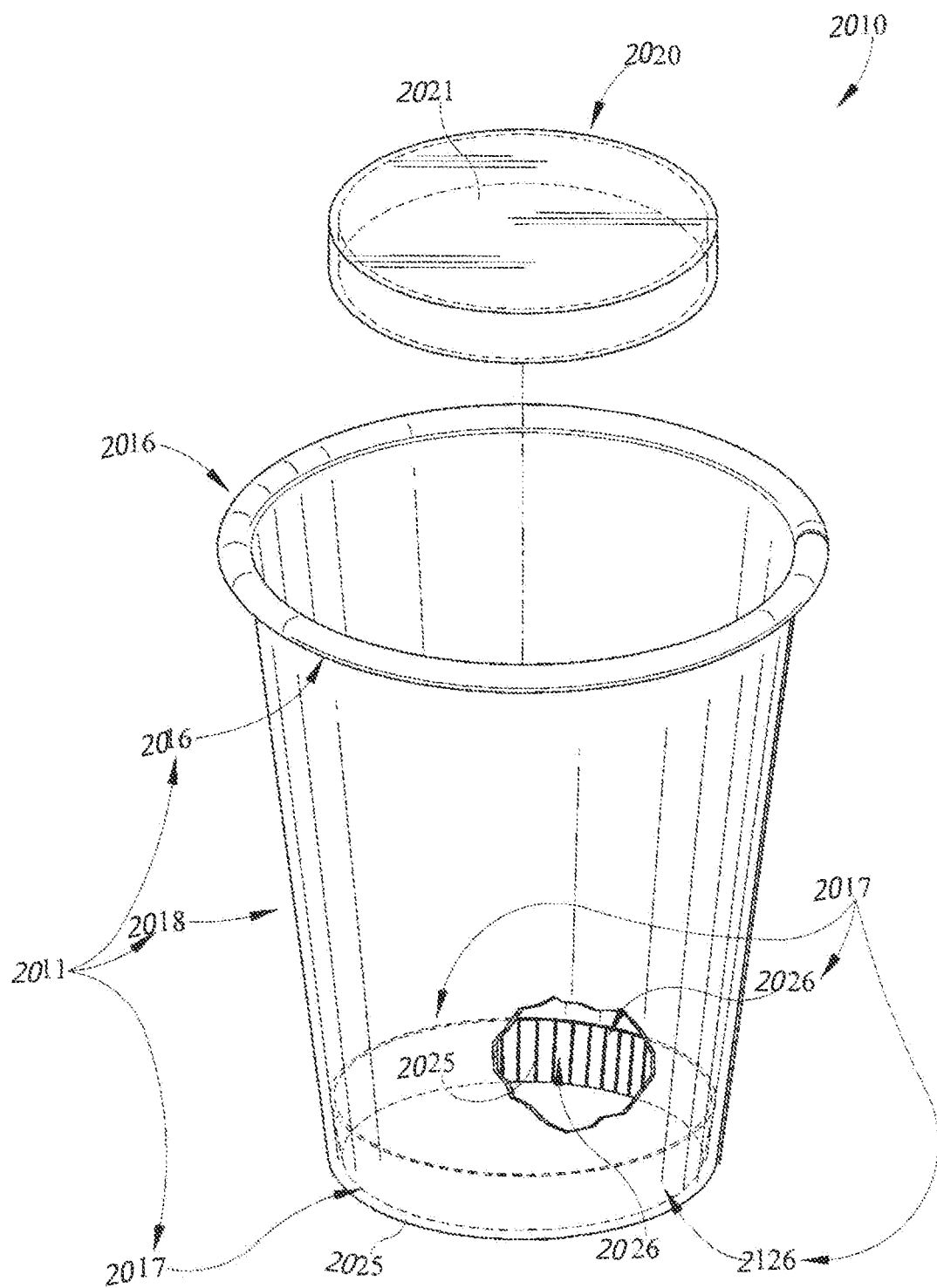
Figure 45:
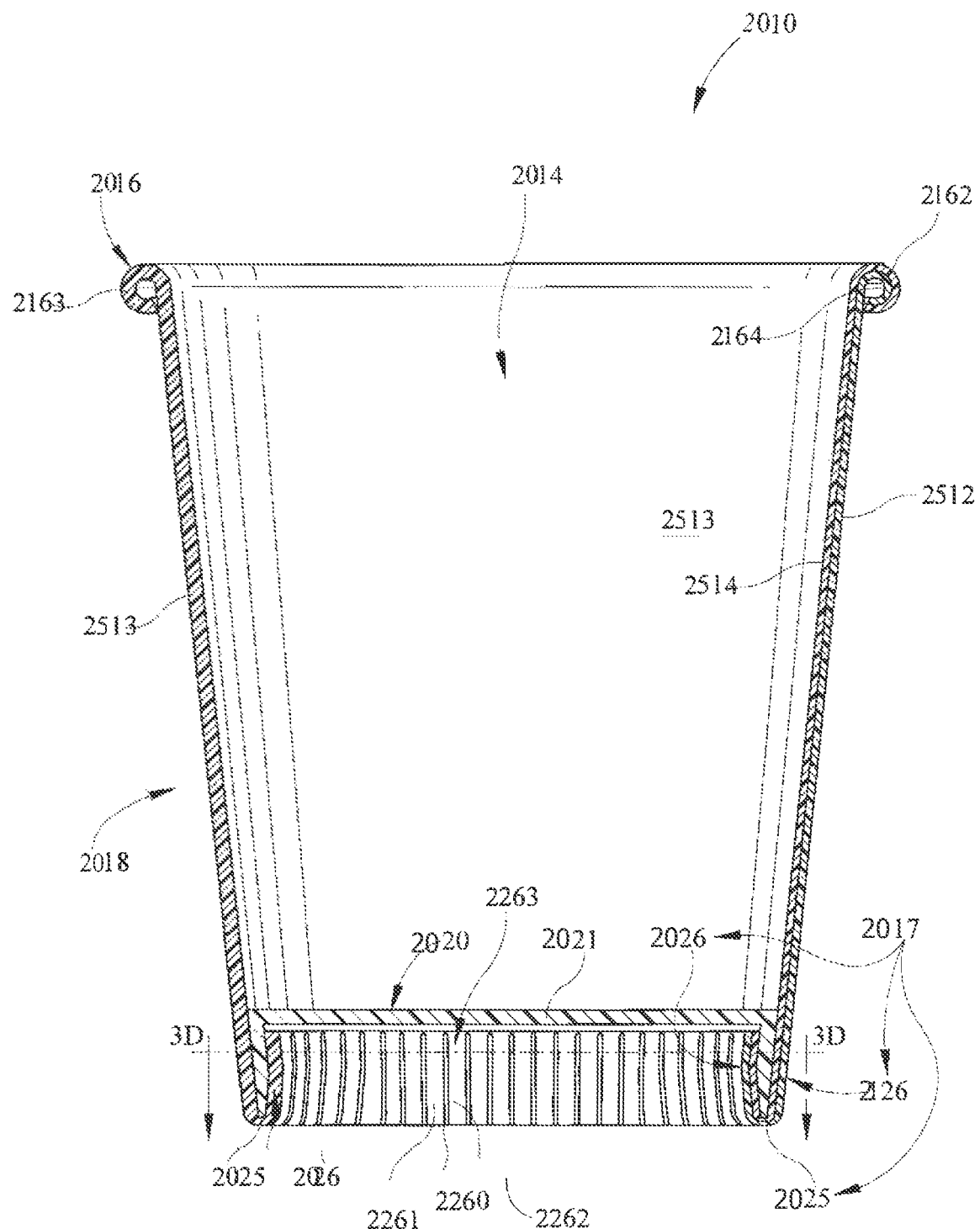
Figure 46:
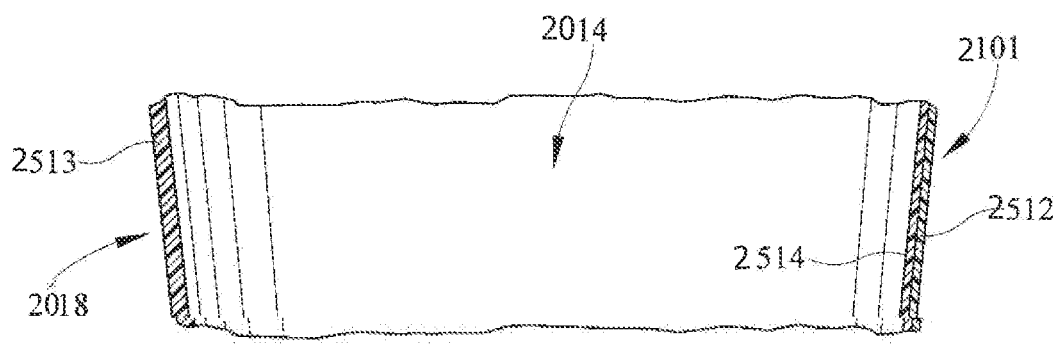
Figure 47:
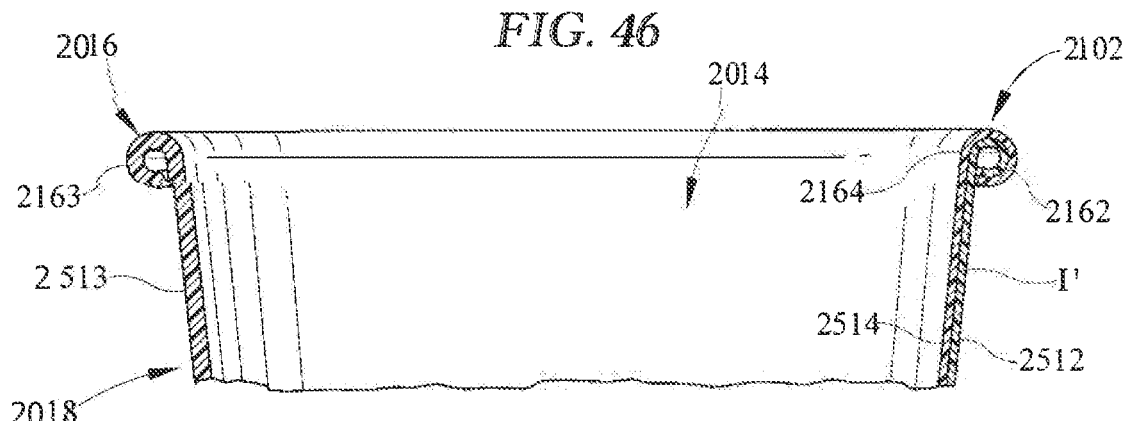
Figure 48:
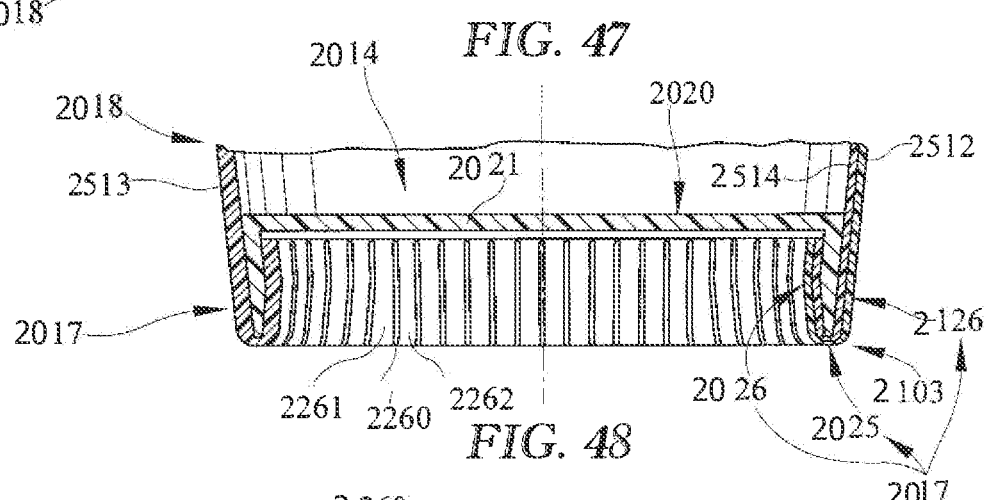
Figure 49:
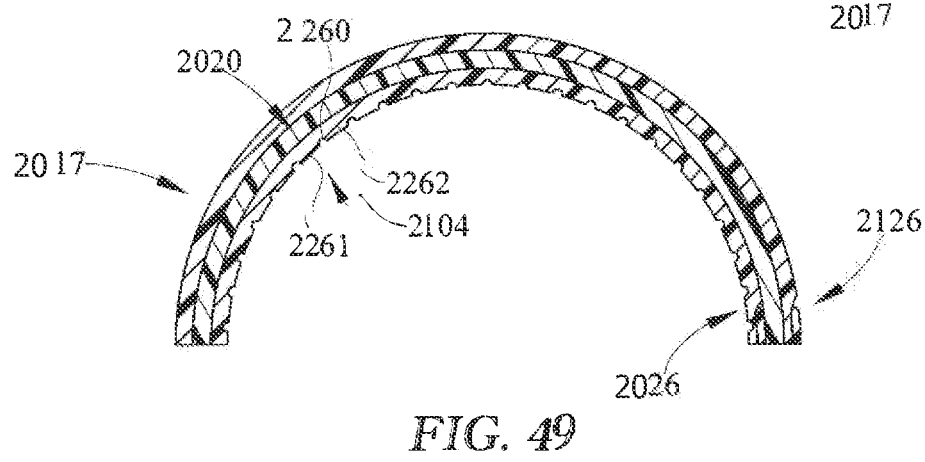

FIG. 3B is a sectional view taken along line 3B-3B of FIG. 1 showing that the insulative sleeve is formed from an insulative cellular non-aromatic polymeric material that has been plastically deformed in a localized region along overlapping first and second upright tabs included in the sleeve to provide a bridge having a reduced thickness that is similar to a thickness of the rest of the insulative sleeve;

FIG. 4 is a perspective and diagrammatic view of a sleeve-forming process in accordance with the present disclosure showing that the sleeve-forming process includes the steps of loading a laminated roll to provide a sheet including insulative cellular non-aromatic polymeric material, plastically deforming the sheet to form a deformed sheet, cutting the deformed sheet to form sleeve blanks and scrap, collecting scrap, and accumulating the sleeve blanks to form sleeve-blank stacks, storing sleeve-blank stacks for transportation or storage, loading the sleeve blanks, heating the sleeve blank, wrapping the sleeve blank around a mandrel of a sleeve-forming machine, forming the insulative sleeve by overlapping and joining the upright tabs included in the sleeve blank, accumulating insulative sleeves to form stacks of insulative sleeves, and storing stacks of insulative sleeves for use at a later time in an illustrative container-forming process suggested in FIG. 5;

FIG. 5 is a perspective and diagrammatic view of the container-forming process suggested in FIG. 4 showing that that the container-forming process includes the steps of loading stacks of cups into a container-forming machine, loading stacks of insulative sleeves into the container-forming machine, positioning the insulative sleeve on the cup, coupling the insulative sleeve to the cup to form an insulative container, and inspecting the insulative container for defects;

FIG. 6 is a perspective view of another embodiment of an insulative container in accordance with the present disclosure showing that the insulative container includes the cup and an insulative sleeve that is coupled to the side wall of the cup and arranged to extend from the rolled brim to the floor of the cup;

FIG. 7 is a partial sectional view taken along line 8-8 of FIG. 6;

FIG. 8 is a partial sectional view taken along line 8-8 of FIG. 6 showing that the insulative sleeve extends between the rolled brim and the floor of the container and that the insulative sleeve includes upright inner and outer tabs (visible on the right side of FIG. 8) arranged to overlap one another and form a bridge along a right side of the insulative container and a fence extending around the side wall and interconnecting the upright inner and outer tabs;

FIG. 8A is an enlarged dead section view of a bridge in accordance with the present disclosure showing how the insulative cellular non-aromatic polymer material has been compressed in both the first and second tabs to produce a bridge having a reduced the thickness that is similar to a thickness of the side wall in the C-shaped fence opposite the bridge;

FIG. 8B is an enlarged dead section view of a portion of the C-shaped fence of FIG. 8A showing that the insulative cellular non-aromatic polymer material has not been compressed;

FIG. 8C is an enlarged dead section view of the first and second tabs prior to mating to one another to establish the bridge;

FIG. 8D is a dead section view taken along line 8'-8' of FIG. 1 (omitting the side wall of the insulative cup) and showing that the insulative sleeve includes a C-shaped fence, an upright outer tab coupled to one end of the C-shaped fence, and an upright inner tab coupled to an opposite end of the C-shaped fence and suggested that the first and second tabs are arranged to overlap one another to establish a bridge extending between the ends of the C-shaped fence to define the interior region therebetween;

FIG. 9 is a plan view of a sleeve blank used during a sleeve-forming process to form the sleeve of FIG. 6;

FIG. 10 is an exploded assembly view of the insulative container of FIG. 6 showing that the insulative container includes, from top to bottom, the cup including the rolled brim, sleeve-shaped side wall, and floor and the insulative sleeve having a height which is about equal to a height of the sleeve-shaped side wall;

FIG. 11 is a perspective view of another embodiment of an insulative sleeve in accordance with the present disclosure showing that the insulative sleeve includes a series of generally horizontal ribs formed on an inner surface of the sleeve;

FIG. 12 is a plan view of a sleeve blank used during a sleeve-forming process to form the insulative sleeve of FIG. 11;

FIG. 13 is a sectional view taken along line 13-13 of FIG. 12;

FIG. 14 is a perspective view of another embodiment of an insulative sleeve in accordance with the present disclosure showing that the insulative sleeve includes a series of generally vertical ribs formed on an inner surface of the sleeve;

FIG. 15 is a plan view of a sleeve blank used during a sleeve-forming process to form the insulative sleeve of FIG. 14;

FIG. 16 is a sectional view taken along an arc line 16-16 of FIG. 15;

FIG. 17 is a perspective view of another embodiment of an insulative sleeve in accordance with the present disclosure showing that the insulative sleeve includes a series of ribs formed on an inner surface of the insulative sleeve and arranged in a spiral to slope downwardly;

FIG. 18 is a plan view of a sleeve blank used during a sleeve-forming process to form the insulative sleeve of FIG. 17;

FIG. 19 is a sectional view taken along line 19-19 of FIG. 18;

FIG. 20 is a perspective view of another embodiment of an insulative sleeve in accordance with the present disclosure showing that the insulative sleeve includes a series of nubs formed on an inner surface of the insulative sleeve;

FIG. 21 is a plan view of a sleeve blank used during a sleeve-forming process to form the insulative sleeve of FIG. 20;

FIG. 22 is a sectional view taken along line 22-22 of FIG. 20;

FIG. 23 is a perspective view of another embodiment of an insulative sleeve in accordance with the present disclosure showing that the insulative sleeve includes a number of protruding ribs formed in the sleeve as a result of displacing portions of the sleeve;

FIG. 24 is a plan view of a sleeve blank used during a sleeve-forming process to form the insulative sleeve of FIG. 23;

FIG. 25 is a sectional view taken along line 25-25 of FIG. 23;

FIG. 26 is an enlarged portion of FIG. 25 showing that material has been displaced in the sleeve to form the protruding ribs;

FIG. 27 is a perspective view of another embodiment of an insulative sleeve in accordance with the present disclosure showing that the insulative sleeve includes a sleeve wall and a sleeve floor coupled to the sleeve wall to define a cup-receiving space therebetween;

FIG. 28 is a plan view of a sleeve blank used during a sleeve-forming process to form the insulative sleeve of FIG. 27;

FIG. 29 is a perspective view of another embodiment of an insulative sleeve in accordance with the present disclosure showing that the insulative sleeve includes a sleeve wall and a sleeve floor coupled to the sleeve wall to define a cup-receiving space therebetween;

FIG. 30 is a plan view of a sleeve-wall blank used during a sleeve-forming process to form the sleeve wall;

FIG. 31 is a plan view of a sleeve-floor blank used during the sleeve-forming process to form the sleeve floor which is coupled to the sleeve wall to establish the insulative sleeve;

FIG. 32 is a perspective view of another embodiment of an insulative sleeve in accordance with the present disclosure showing that the insulative sleeve includes a sleeve wall having a first bridge on a left side of the insulative sleeve and a second bridge opposite the first bridge on a right side of the insulative sleeve and a sleeve floor coupled to the sleeve wall to define a cup-receiving space therebetween;

FIG. 33 is a plan view of a sleeve blank used during a sleeve-forming process to form the insulative sleeve of FIG. 27 showing that the sleeve blank includes, from left to right, a first wall panel, a sleeve floor, and a second wall panel;

FIG. 34 is a perspective view of another embodiment of an insulative container in accordance with the present disclosure showing that the insulative container includes a cup and an insulative sleeve that includes a fence having a fence thickness and a bridge having a bridge thickness that is about twice the fence thickness;

FIG. 35 is a sectional view taken along line 35-35 of FIG. 34;

FIGS. 36-40 are a series of views showing another embodiment of an insulative sleeve in accordance with the present disclosure and showing assembly of the insulative sleeve in the field;

FIG. 36 is a perspective view of another embodiment of an insulative sleeve in accordance with the present disclosure showing that the insulative sleeve is in a dis-assembled state that includes a sleeve wall having first and second panels connected together by a connecting web along a fold line and a sleeve-wall retainer including an upright tab, an adhesive layer applied to the upright tab, and a release liner coupled to the adhesive layer;

FIGS. 37-40 are a series of views showing an illustrative method of applying the insulative sleeve of FIG. 36 to a cup in the field;

FIG. 37 is a perspective view showing a cup and the insulative sleeve of FIG. 36 in the disassembled state;

FIG. 38 is a view similar to FIG. 37 with the second panel of the sleeve wall folded back away from the first panel of the sleeve wall along the connecting web to expose the sleeve-wall retainer and suggesting that the release liner is peeled away from the adhesive layer to expose the adhesive layer;

FIG. 39 is a view similar to FIG. 38 showing the release liner removed from the adhesive layer and suggesting that the sleeve-wall retainer is arranged to overlap a distal end of the second panel as suggested in FIG. 40;

FIG. 40 is a view similar to FIG. 39 showing that the sleeve-wall retainer has been arranged to overlap the distal end of the second panel to cause the insulative sleeve to be established with a cup-receiving space formed there between;

FIG. 41 is a diagrammatic and perspective view of a material-forming process in accordance with the present disclosure showing that the material-forming process includes, from left to right, a formulation of insulative cellular non-aromatic polymeric material being placed into a hopper that is fed into a first extrusion zone of a first extruder where heat and pressure are applied to form molten resin and showing that a blowing agent is injected into the molten resin to form an extrusion resin mixture that is fed into a second extrusion zone of a second extruder where the extrusion resin mixture exits and expands to form an extrudate which is slit to form a strip of insulative cellular non-aromatic polymeric material;

FIG. 42 is a perspective view of an insulative cup made from a strip of material including the insulative cellular non-aromatic polymeric material of FIG. 41 showing that the insulative cup includes a body and a floor and showing that four regions of the body have been broken away to reveal localized areas of plastic deformation that provide for increased density in those areas while maintaining a predetermined insulative characteristic in the body;

FIG. 43 is an enlarged sectional view of a portion of a side wall included in the body of the insulative cup of FIG. 42 showing that the side wall is made from a sheet that includes, from left to right, a skin including a film, an ink layer, and an adhesive layer, and the strip of insulative cellular non-aromatic polymeric material of FIG. 41;

FIG. 44 is an exploded assembly view of the insulative cup of FIG. 42 showing that the insulative cup includes, from top to bottom, the floor and the body including a rolled brim, the side wall, and a floor mount configured to interconnect the floor and the side wall as shown in FIG. 42;

FIG. 45 is a sectional view taken along line 5-5 of FIG. 42 showing that the side wall included in the body of the insulative cup includes a generally uniform thickness and that the floor is coupled to the floor mount included in the body;

FIGS. 46-49 are a series views showing first, second, third, and fourth regions of the insulative cup of FIG. 42 that each include localized plastic deformation;

FIG. 46 is a partial section view taken along line 5-5 of FIG. 42 showing the first region is in the side wall of the body;

FIG. 47 is a partial section view taken along line 5-5 of FIG. 42 showing the second region is in the rolled brim of the body;

FIG. 48 is a partial section view taken along line 5-5 of FIG. 42 showing the third region is in a connecting web included in the floor mount of the body; and FIG. 49 is a partial section view taken along line 5-5 of FIG. 42 showing the fourth region is in a web-support ring included in the floor mount of the body.

DETAILED DESCRIPTION

Figure 2:
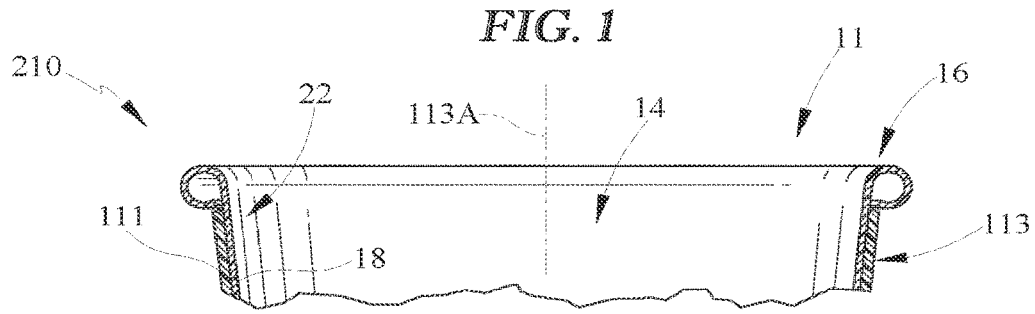
FIG. 2 is a partial sectional view taken along line 8-8 of FIG. 6 showing an upper portion of another embodiment of the insulative sleeve that is coupled to the side wall and that is shown in more detail in FIGS. 6-8.

An insulative container 110 in accordance with a first embodiment of the present disclosure is shown, for example, in FIGS. 1-3. As an example, insulative container 110 includes a cup 11 and a first embodiment of an insulative sleeve 113 as shown in FIGS. 1-3. A container-forming process 46, 47 used to make the insulative container 110 is shown in FIGS. 4 and 5. Another embodiment of an insulative container 210 in accordance with the present disclosure is illustrated in FIGS. 6-10. Other embodiments of insulative sleeves 313, 413, 513, 613, 713, 813, 913, 1013, 1113, 1213, and 1313 that are in accordance with the present disclosure are shown in FIGS. 11-36.

An insulative container 110 in accordance with the present disclosure includes a cup 11 and an insulative sleeve 113 as shown in FIGS. 1, 3, and 4. Cup 11 includes body 12 formed to include an interior region 14 and a rolled brim 16 coupled to body 12 as shown, for example, in FIG. 1. Body 12 includes a side wall 18 and a floor 20 coupled to side wall 18 to define an interior region 14 therebetween. In one illustrative example, cup 11 may be formed of polypropylene using a thermoforming process.

Insulative sleeve 113 illustratively comprises a strip 82 of insulative cellular non-aromatic polymeric material. Strip 82 of insulative cellular non-aromatic polymeric material is configured to provide means for insulating a beverage, dessert or other substance placed in interior region 14 of cup 11 while providing resistance to deformation and puncture and for providing an exterior surface that is suitable for printing graphics and other information thereon.

Insulative sleeve 113 includes a region 101 having localized plastic deformation that provides segments of insulative sleeve 113 that exhibit higher material density than neighboring segments of insulative sleeve 113 in accordance with the present disclosure is shown in FIGS. 1 and 3. As an example, insulative sleeve 113 is made using an illustrative sleeve-forming process 46 suggested in FIG. 4. Insulative container 110 is made using an illustrative container-forming process 47 using a sleeve blank 300 as shown, for example, in FIG. 5. Strip 82 of insulative cellular non-aromatic polymeric material used to form insulative sleeve 113 is shown in FIGS. 3A and 3B.

Insulative sleeve 113 includes an upright inner tab 114, an upright outer tab 112, and an upright fence 111 extending between inner and outer tabs 114, 112 as suggested in FIG. 8D. Upright inner tab 114 is configured to provide the first material segment having the higher first density in the region 101 of sleeve 113. Upright outer tab 112 is arranged to mate with upright inner tab 114 along an interface I therebetween as suggested in FIG. 8D. Upright fence 111 is arranged to interconnect upright inner and outer tabs 114, 112 and surround interior region 14. Upright fence 111 is configured to provide the second material segment having the lower second density in the region 101 insulative sleeve 113 and cooperate with upright inner and outer tabs 114, 112 to form insulative sleeve 113 as suggested in FIG. 8D. Region 101 of insulative sleeve 113 in which localized plastic deformation is enabled by the insulative cellular non-aromatic polymeric material is where upright inner and outer tabs 114, 112 overlap along interface I as suggested in FIG. 8D.

Upright fence 111 of insulative sleeve 113 is C-shaped in a horizontal cross-section and each of upright inner and outer tabs 114, 112 has an arcuate shape in a horizontal cross-section as suggested in FIG. 8D. Upright fence 111 includes an upright left side edge 111L and an upright right side edge 111R that is arranged to lie in spaced-apart confronting relation to upright left side edge 111L. Upright outer tab 112 is configured to have the higher first density and mate with upright inner tab 114 also characterized by the higher first density to establish a bridge 112, 114 arranged to interconnect upright left and right side edges 111L, 111R of upright fence 111. Bridge 112, 114 is formed of plastically deformed material having the higher first density.

As shown, for example, in FIG. 1, upright fence 111 of insulative sleeve 113 has a sleeve height H1. Cup 11 has a cup height D1. As shown in FIG. 1, sleeve height H1 is less than cup height D1.

Insulative sleeve 113 includes a pair of tabs 114, 112 that mate to provide insulative sleeve 113 with a frustoconical shape in the illustrative embodiment shown in FIGS. 8A, 8C, and 8D. Upright inner tab 114 includes an inner surface 114i bounding a portion of interior region 14 and an outer surface 114O facing toward upright outer tab 112 as shown in FIGS. 8C and 8D. Upright outer tab 112 includes an inner surface 112i facing toward interior region 14 and mating with outer surface 114O of upright inner tab 114 to define the interface I between upright inner and outer tabs 114, 112. Upright outer tab 112 further includes an outer face 112O facing away from upright inner tab 114. Each of inner and outer surfaces of upright inner and outer tabs 114, 112 has an arcuate shape in a horizontal cross-section as suggested in FIG. 8C and subtends an acute angle of less than 20° as suggested in FIG. 8D.

Upright fence 111 is C-shaped in a horizontal cross-section and each of upright inner and outer tabs 114, 112 has an arcuate shape in a horizontal cross-section as suggested in FIG. 8D. Upright fence 111 includes an upright left side edge 111L and an upright right side edge 111R that is arranged to lie in spaced-apart confronting relation to upright left side edge 111L in FIG. 8C. Upright outer tab 112 is configured to have the higher first density and mate with upright inner tab 114 also characterized by the higher first density to establish a bridge 112, 114 arranged to interconnect upright left and right side edges 111L, 111R of upright fence 111. Bridge 112, 114 is formed of plastically deformed material having the higher first density.

Upright fence 111 has an inner surface 111i bounding a portion of interior region 14 and an outer surface 111O facing away from interior region 14 and surrounding inner surface 111i of upright fence 111 as shown, or example, in FIG. 8D. Outer surface 111o cooperates with inner surface 111i of upright fence 111 to define a first thickness T1 therebetween. Upright inner tab 114 includes an inner surface 114i bounding a portion of interior region 14 and an outer surface 114O facing toward upright outer tab 112. Upright outer tab 112 includes an inner surface 112i facing toward interior region 14 and mating with outer surface 114O of upright inner tab 114 to define the interface I between upright inner and outer tabs 114, 112. Upright outer tab 112 further includes an outer face 112O facing away from upright inner tab 114. Inner and outer surfaces of upright inner tab 114 cooperate to define a second thickness T2I therebetween that is less than the first thickness T1. Inner and outer surfaces of upright outer tab 112 cooperate to define a third thickness T2O that is less than the first thickness T1.

Insulative sleeve 113 is made from a strip 82 of insulative cellular non-aromatic polymeric material. Insulative cellular non-aromatic polymeric material comprises, for example, a polypropylene base resin having a high melt strength, one or both of a polypropylene copolymer and homopolymer resin, and one or more cell-forming agents. As an example, cell-forming agents may include a primary nucleation agent, a secondary nucleation agent, and a blowing agent defined by gas means for expanding the resins and to reduce density. In one example, the gas means comprises carbon dioxide. In another example, the base resin comprises broadly distributed molecular weight polypropylene characterized by a distribution that is unimodal and not bimodal. Reference is hereby made to U.S. application Ser. No. 13/491,327 filed Jun. 7, 2012 and titled POLYMERIC MATERIAL FOR AN INSULATIVE CONTAINER for disclosure relating to such insulative cellular non-aromatic polymeric material, which application is hereby incorporated in its entirety herein.

An insulating sleeve in accordance with the present disclosure may optionally include, as shown in FIGS. 11-26, vertical, horizontal, spiral or other configuration of ribs or rib segments, hoops, bumps, nubs, or other projections, or grooves, slots, channels, depressions or the like on the inner surface of the sleeve that creates an air gap between side wall 18 of cup 11 and the insulating sleeve. This air gap forms an insulating barrier to minimize transfer of heat from a hot beverage through cup 11 and/or the insulating sleeve to a user's hand (and, conversely, transfer of heat from a user's hand through insulative sleeve 113 and side wall 18 to the beverage). As shown in FIGS. 4 and 5, insulative container 110 is formed in an illustrative container-forming process 46, 47.

As shown in FIGS. 2 and 3, insulative sleeve 113 is formed during sleeve-forming process 46 (see FIG. 4). Upright fence 111 has a first thickness T1 (see FIG. 8) and first and second upright tabs 114 (see FIG. 8), 112 (see FIG. 8) each have a second thickness T2 (see FIG. 8). As suggested in FIG. 1, second thickness T2 is about half to first thickness T1. As a result, bridge 114, 112 formed by overlapping and coupling upright tabs 114, 112 has a third thickness T3 which about equal to first thickness T1. In one exemplary embodiment the insulative sleeve 113 may be formed in the forming apparatus and coupled with cup 11. Insulative sleeve 113 may be manufactured, stored, shipped, and/or sold separately with a self-locking die cut feature. The self-locking feature may have various shapes to promote retention.

Insulative sleeve 113 is made using sleeve-forming process 46 as shown, for example, in FIG. 4. Sleeve-forming process 46 includes a laminated-roll loading step 461A, a compressing step 462A, a cutting step 463A, an accumulating sleeve blanks step 464A, a storing sleeve blanks step 465A, a loading sleeve blank step 461B, heating sleeve blanks step 462B, wrapping sleeve blanks step 463B, forming sleeve step 464B, accumulating sleeves step 465B, and storing stacks of sleeves step 466B as shown in FIG. 4.

Laminated-roll loading step 461A loads laminated roll 86 onto a cutting machine such as a die cutting machine or metal-on-metal stamping machine. As a result, laminated sheet 80 is drawn into the cutting machine for processing. Compressing step 462A compresses portions of laminated sheet 80 to form a compressed sheet. Cutting step 463A cuts compressed sheet to cause sleeve blank 300 to be cut from a laminated sheet 80. As an example, cutting step 463A and compressing step 462A may be combined such that they are performed generally at the same time on the same piece of equipment. Accumulating sleeve blanks step 464A accumulates sleeve blanks 300 into a stack 95 of sleeve blanks. Storing sleeve blanks step 465A stores stack 95 of sleeve blanks until ready for use in loading sleeve blanks step 461B. Loading sleeve blanks step 461B loads stack 95 of sleeve blanks for processing by a sleeve-forming machine. Heating sleeve blanks step 462B applies heat 102 to sleeve blank 300. Wrapping sleeve blanks step 463B wraps heated sleeve blank 300 around a mandrel included in sleeve-forming machine. Forming sleeve step 464B forms bridge 114, 112 by overlapping and compressing upright tabs 112, 114 with primary and auxiliary clamps included in sleeve-forming machine. Accumulating sleeves step 465B accumulates sleeves 113 into a stack 97 of sleeves. Storing stacks of sleeves step 466B stores stack 97 of sleeves for use in later container-forming process 47.

Insulative container 110 is made using a container-forming process 47 as shown in FIG. 5. Container-forming process 47 includes a loading cups step 471, a loading sleeves step 472, a positioning sleeve on cup step 473, a sleeve coupling step 474, and an inspecting step 475 as shown in FIG. 5. Loading containers step 471 loads container stack 124 onto a container-forming machine. Loading sleeves step 472 loads a stack 97 of sleeves onto the container-forming machine. Positioning sleeve on cup step 473 positions sleeve 113 on cup 11. Sleeve coupling step 474 couples sleeve 113 to cup 11 using heat for example to establish insulative container 110. However, sleeve 113 may be coupled by adhesive, friction fit, or any other suitable alternative. Inspecting step 475 inspects insulative container 110 for defects before passing good containers onto container-packaging stage 48 as suggested in FIG. 5.

As shown in FIG. 3A, insulative sleeve 113 is made from a sheet 80. Sheet 80 includes a skin 81 and strip 82 of insulative cellular polymeric material. Skin 81, includes, for example, a film layer 811, an ink layer 812, and an adhesive layer 810 as shown in FIG. 3A. Adhesive layer 810 is used, for example, to laminate skin 81 to strip 82 so that ink layer 812 is trapped between film layer 811 and adhesive layer 810.

In another exemplary embodiment of a sleeve-forming process, sleeve-forming process 46 is modified by not laminating a skin 81 to strip 82 of insulative cellular non-aromatic polymeric material. As a result, the skin is entirely omitted and printing may done directly on strip 82 of insulative cellular non-aromatic polymeric material.

Side wall 18 of cup 11 extends between rolled brim 16 and floor 20 as shown in FIG. 3. Side wall 18 includes a top portion 22 of body 12 that is coupled to rolled brim 16 and a bottom portion 24 arranged to interconnect floor 20 and top portion 22. Top portion 22 is arranged to extend in a downward direction toward floor 20 and is coupled to bottom portion 24 that is arranged to extend in an opposite upward direction toward rolled brim 16. Top portion 22 and rolled brim 16 cooperate to form a mouth 32 that is arranged to open into interior region 14 as shown in FIG. 1.

Insulative sleeve 113 is arranged to surround and embrace an exterior surface of a hot-beverage drink cup 11 to provide a grippable low-temperature thermal barrier that can be gripped by a consumer. Insulative sleeve 113 comprises a sheet 80 comprising insulative cellular non-aromatic polymeric material configured to provide means for enabling localized plastic deformation in sheet 80 to provide a plastically deformed first material segment having a first density located in a first portion of sheet 80 and a second material segment having a second density lower than the first density located in an adjacent second portion of sheet 80 without fracturing the insulative cellular non-aromatic polymeric material so that a predetermined insulative characteristic is maintained in sheet 80.

Sheet 80 is arranged to surround a vertical central axis 113A as suggested in FIGS. 1 and 3. Sheet 80 includes an upright inner tab 114 arranged to extend upwardly along and in spaced-apart relation to vertical central axis 113A and configured to provide the first material segment having the first density. Sheet 80 also includes an upright outer tab 112 arranged to extend upwardly along and in spaced-apart relation to vertical central axis 113A and to mate with upright inner tab 114 along an interface I therebetween, and an upright fence 111 arranged to interconnect the upright inner and outer tabs 114, 112 and surround vertical central axis 113A and configured to provide the second material segment having the second density and cooperate with upright inner and outer tabs 114, 112 to form sleeve-shaped side wall 18. Fence 111 has a substantially frustoconical shape as suggested in FIGS. 1 and 3. Each of upright inner and outer tabs 114, 112 has an arcuate shape.

Upright inner tab 114 includes an inner surface providing means for mating with a hot-beverage drink cup 11 and an outer surface facing toward upright outer tab 112 as suggested in FIGS. 8C and 8D. Upright outer tab 112 includes an inner surface mating with the outer surface of upright inner tab 114 to define the interface I between upright inner and outer tabs 114, 112. Upright outer tab 112 further includes an outer face facing away from upright inner tab 114. Each of the inner and outer surfaces of upright inner and outer tabs 114, 112 has an arcuate shape in a horizontal cross-section and subtends an acute angle of less than 20°. Upright fence 111 is C-shaped in a horizontal cross-section. Each of upright inner and outer tabs 114, 112 has an arcuate shape in a horizontal cross-section.

Upright fence 111 includes an upright left side edge 111L and an upright right side edge 111R arranged to lie in spaced-apart confronting relation to upright left side edge 111L. Upright outer tab 112 is configured to have the first density and mate with the upright inner tab to establish a bridge arranged to interconnect upright left and right side edges 111L, 111R of the upright fence and formed of plastically deformed material having the first density.

Upright fence 111 has an inner surface facing toward vertical central axis 113A and providing means for mating with a hot-beverage drink cup 11. Upright fence 111 also has an outer surface facing away from vertical central axis 113A from interior region 14 and surrounding the inner surface of upright fence 111 and cooperating with the inner surface of upright fence 111 to define a first thickness therebetween.

Upright inner tab 114 includes an inner surface facing toward vertical central axis 113A and providing means for mating with hot-beverage drink cup 11 and an outer surface facing toward upright outer tab 112. Upright outer tab 112 includes an inner surface facing toward vertical central axis 113A and mating with the outer surface of upright inner tab 114 to define interface I between upright inner and outer tabs 114, 112.

Upright outer tab 112 further includes an outer face facing away from the upright inner tab 114. The inner and outer surfaces of upright inner tab 114 cooperate to define a second thickness therebetween that is about half of the first thickness as suggested in FIG. 8D. Inner and outer surfaces of upright outer tab 112 cooperate to define a third thickness that is about half of the first thickness as suggested in FIG. 8D.

Another embodiment of an insulative container 210 in accordance with the present disclosure is shown in FIGS. 6-10. Insulative container 210 includes cup 11 and insulative sleeve 213 as shown in FIG. 6. Insulative sleeve 213 is similar to sleeve 113 except that insulative sleeve 213 has a sleeve height H1 that about equal to a cup height D1 as shown in FIG. 6.

As an example, insulative sleeve 213 is formed using sleeve blank 300 during sleeve-forming process 46 as shown, for example, in FIG. 4. Blank 300 includes a first side 302 and an opposite second side (not shown). Blank 300 has a first arcuate edge 306 that coincides with a radius 308 centered on an axis 310. A second arcuate edge 312 coincides with a radius 314 centered on axis 310. A first linear edge 316 coincides with a first ray emanating from the axis 310 and a second linear edge 318 coincides with a second ray emanating from the axis 310. When the blank 300 is wrapped such that first linear edge 316 overlaps in juxtaposition with second linear edge 318, the insulative sleeve 213 defines a frustoconical surface 320 shown in FIG. 6. The overlapped linear edges 316 and 318 may be secured in any of a number of ways including a mechanical connection created by heating the edges 316 and 318 to bonding of the insulative cellular non-aromatic polymeric material. The edges 316 and 318 may be treated with an adhesive to secure the edges 316 and 318 to one another.

In yet another embodiment of an insulative sleeve 313 formed from a sleeve blank 322, insulative sleeve 313 includes a plurality of generally horizontal ribs 328 on an inner surface 326 of an assembled insulative sleeve 313 as shown in FIGS. 11-13. Sleeve blank 322 is formed with a first thickness 322T1 and in a compressing material sheet step of a sleeve forming process, depressions 324 are formed by reducing the thickness to 322T2 as shown in FIG. 13. Upon completion of the compressing material sheet step, blank 322 includes a number of areas of localized plastic deformation that form depression 324 with thickness 322T2 and ribs 328 which have no deformation and thickness 322T1. As shown diagramatically in FIG. 11, depressions 324 and ribs 328 cooperate to form an air gap 301 between inner surface 326 of insulative sleeve 313, an exterior surface 102 of cup 11, and a pair of neighboring ribs 328A, 328B.

Blank 322 is formed with a first linear edge 330 and a second linear edge 334. Ribs 328 are formed to abut second linear edge 334 at a first end and are spaced apart from first linear edge 330 by a distance 332 so that when first linear edge 330 overlaps second linear edge 334 during the wrapping sleeve blank step of the sleeve-forming process, the first and second ends of ribs 328 do not overlap. This reduces the amount of material that must be compressed during the wrapping sleeve blank step. Ribs 328 are positioned to engage an outer surface of a cup, such as cup 11, such that the inner surface 326 of depressions 324 are spaced apart from the outer surface of the cup to provide an air gap with only the ribs 328 engaging the outer surface of the cup. The air gap is insulative so that when a user grips an outer surface 338 of insulative sleeve 313, heat transfer from the cup to a user's hand is impeded.

In still yet another embodiment of an insulative sleeve 413 formed from a sleeve blank 422, insulative sleeve 413 includes a plurality of vertical ribs 428 on an inner surface 426 of an assembled insulative sleeve 413 as shown in FIGS. 14-16. Sleeve blank 422 is formed with a first thickness 422T1 and in a compressing material sheet step of a sleeve forming process, depressions 424 are formed by reducing the thickness to 422T2 as shown in FIG. 16. Upon completion of the compressing material sheet step, blank 422 includes a number of areas of localized plastic deformation that form depression 424 with thickness 422T2 and ribs 428 which have no deformation and thickness 422T1.

Blank 422 is formed with a first linear edge 430, a first arcuate edge 440, a second linear edge 434, and a second arcuate edge 442. Ribs 428 are formed to extend from first arcuate edge 440 to second arcuate edge 442. First linear edge 430 and second linear edge 434 each lie along a ray that emanates from a common axis that defines the center of curvature of both first arcuate edge 440 and second arcuate edge 442. Each rib 428 also lies along a ray that extends from the common axis 444. Ribs 428 are positioned to engage an outer surface of a cup, such as cup 11, such that the inner surface 426 of depressions 424 are spaced apart from the outer surface of the cup to provide an air gap with only the ribs 428 engaging the outer surface of the cup. The air gap is insulative so that when a user grips an outer surface 438 of insulative sleeve 413, heat transfer from the cup to a user's hand is impeded.

In yet another embodiment of an insulative sleeve 513 formed from a sleeve blank 522, insulative sleeve 513 includes a plurality of helical ribs 528 on an inner surface 526 of an assembled insulative sleeve 513 as shown in FIGS. 17-19. Sleeve blank 522 is extruded with a first thickness 522T1 and in a compressing material sheet step of a sleeve forming process, depressions 524 are formed by reducing the thickness to 522T2 as shown in FIG. 19. Upon completion of the compressing material sheet step, blank 522 includes a number of areas of localized plastic deformation that form depression 524 with thickness 522T2 and ribs 528 which have no deformation and thickness 522T1.

Blank 522 is formed with a first linear edge 530, a first arcuate edge 540, a second linear edge 534, and a second arcuate edge 542. Ribs 528 are formed to extend along axes that are perpendicular to second linear edge 534. Ribs 528 extend to abut either second arcuate edge 542 or first linear edge 530. Ribs 528 are positioned to engage an outer surface of a cup, such as cup 11, such that the inner surface 526 of depressions 524 are spaced apart from the outer surface of cup to provide an air gap with only the ribs 528 engaging the outer surface of cup 11. The air gap is insulative so that when a user grips an outer surface 538 of insulative sleeve 513, heat transfer from the cup to a user's hand is impeded.

In another embodiment of an insulative sleeve 613 formed from a sleeve blank 622, insulative sleeve 613 includes a plurality of nubs or protrusions 628 on an inner surface 626 of an assembled insulative sleeve 613 as shown in FIGS. 20-22. Sleeve blank 622 is extruded with a first thickness 622T1 and in a compressing material sheet step of a sleeve forming process, protrusions 628 remain after reducing the remainder of blank 622 to thickness to 622T2 as shown in FIG. 22. Upon completion of the compressing material sheet step, blank 622 includes a number of protrusions 628 which have no deformation and thickness 622T1.

Blank 622 is formed with a first linear edge 630, a first arcuate edge 640, a second linear edge 634, and a second arcuate edge 642. Protrusions 628 are spaced in rows 624 with each row 624 lying along an arc that is parallel to the first arcuate edge 640 and second arcuate edge 642. Protrusions 628 are positioned to engage an outer surface of a cup, such as cup 11, such that the inner surface 626 of insulative sleeve 613 is spaced apart from the outer surface of the cup to provide an air gap with only the protrusions 628 engaging the outer surface of the cup. The air gap is insulative so that when a user grips an outer surface 638 of insulative sleeve 613, heat transfer from the cup to a user's hand is impeded.

In yet another embodiment of an insulative sleeve 713 formed from a sleeve blank 722, insulative sleeve 713 includes a plurality of generally horizontal ribs 728 on an inner surface 736 of an assembled insulative sleeve 713 as shown in FIGS. 23-26. Sleeve blank 722 is extruded with a first thickness 722T1 and in a displacing material sheet step of a sleeve forming process, ribs 728 are formed by displacing material. Upon completion of the displacing material sheet step, blank 722 includes a number of areas of localized plastic deformation that form ribs 728 which have thickness 722T1, but with portions of the blank 722 offset to define ribs 728. Portions of blank 722 are reduced to a thickness 722T2 due to plastic deformation and elongations as the material is displaced.

The displacing material sheet step may be performed by a thermoforming process in which blank 722 is thermoformed. As a result, thicknesses 722T1 and 722T2 are maximized so that the insulative properties of insulative sleeve 713 are maximized.

Blank 722 is formed with a first linear edge 730 and a second linear edge 734. Ribs 728 are formed to abut second linear edge 734 at a first end and are spaced apart from first linear edge 730 by a distance 732 so that when first linear edge 730 overlaps second linear edge 734 during a wrapping sleeve blank step of the sleeve forming process, the first and second ends of ribs 728 do not overlap. This reduces the amount of material that must be compressed during wrapping sleeve blank process. Ribs 728 are positioned to engage an outer surface of a cup, such as cup 11, such that the inner surface 736 of depressions 724 are spaced apart from the outer surface of the cup to provide an air gap with only the ribs 728 engaging the outer surface of the cup. The air gap is insulative so that when a user grips an outer surface 738 of insulative sleeve 713, heat transfer from the cup to a user's hand is impeded.

Another embodiment of an insulative sleeve 813 in accordance with the present disclosure is shown in FIGS. 27 and 28. Insulative sleeve 813 includes an upright sleeve wall 818 and a sleeve floor 820 as shown in FIG. 27. Sleeve blank 822 is extruded with a first thickness and in a compressing material sheet step of a sleeve forming process, a fold line 828 is formed by compressing material to a relatively thinner second thickness. Sleeve floor 820 includes a floor platform 821 and a floor-retention tab 822A that is coupled to sleeve wall 818 during sleeve forming as shown in FIG. 27. After sleeve forming, sleeve floor 820 and sleeve wall 818 cooperate to define a cup-receiving space 814 therebetween.

Still yet another embodiment of an insulative sleeve 913 in accordance with the present disclosure is shown in FIGS. 29-31. Insulative sleeve 913 includes an upright sleeve wall 918 and a sleeve floor 920 as shown in FIGS. 29-31. Sleeve-wall blank 922 and sleeve-floor blank 924 are extruded with a first thickness and in a compressing material sheet step of a sleeve forming process, fold lines 928 are formed by compressing material to a relatively thinner second thickness in sleeve-floor blank 924 as shown in FIG. 31. Sleeve floor 920 includes a floor platform 921 and four floor-retention tabs 922A, 922B, 922C, 922D that are coupled to sleeve wall 918 during sleeve forming as shown in FIG. 29. After sleeve forming, sleeve floor 920 and sleeve wall 918 cooperate to define a cup-receiving space 914 therebetween.

In another embodiment, an insulative sleeve 1013 has a generally cylindrical shape with a lower tab 1002 as shown in FIG. 32. The lower tab 1002 is used to support a cylindrical drinking vessel, such as an aluminum can, for example, while insulative sleeve 1013 is positioned on the cylindrical drinking vessel. Insulative sleeve 1013 includes an opening into which the vessel is positioned and lower tab 1002 provides a stop so that the vessel is supported on lower tab 1002 to position insulative sleeve 1013. Insulative sleeve 1013 differs from sleeves 213 and 113 in that insulative sleeve 1013 has two joints 1006 and 1008 where material is joined to form the insulative sleeve 1013.

A blank 1022 for insulative sleeve 1013 includes two generally rectangular shaped portions 1012, 1014 interconnected by lower tab 1002 as shown in FIG. 33. A first linear edge 1016 of portion 1012 mates with a first linear edge 1018 of portion 1014 and the edges are overlapped in juxtaposition so that they can be joined to form joint 1006. Similarly, a second linear edge 1020 of portion 1012 mates with a second linear edge 1021 of portion 1014 overlapped and juxtaposed therewith to form joint 1008. The joints 1006 and 1008 are formed by heating the material and positioning the edges so that the insulative cellular non-aromatic polymeric material is coupled together. In other embodiments, the joints may be formed by applying adhesive to the respective edges. In either approach, pressure may be applied to assist with the joining. In other embodiments, the joints may be formed by forming a slit along one edge and forming a tab along the opposite edge and causing the tab to be inserted into the slit and retained therein.

In other embodiments, joints 1006 and 1008 may be secured by using a hook and loop fastening system, such as VELCRO®, for example. The insulative cellular non-aromatic polymeric material has sufficient flexibility to allow the insulative sleeve 1013 to be formed as a blank in a flat condition and assembled by a consumer. Similarly, sleeves 213 and 113 may use hook and loop fastening systems in some embodiments, such that the sleeves 213 and 113 can be shipped to a consumer as flat blanks and assembled by a consumer or at a point of sale. It should be understood that insulative sleeve 1013 may be formed with various surface discontinuities, including those discussed with regard to sleeves 313, 413, 513, 613, and 713 above.

Another embodiment of an insulative sleeve 1113 in accordance with the present disclosure is shown in FIGS. 34 and 35. Insulative sleeve 1113 includes an upright inner tab 1114, an upright outer tab 1112, and an upright fence 1111 extending between inner and outer tabs 1114, 1112 as suggested in FIGS. 34 and 35. Upright inner tab 1114 is arranged to extend upwardly from floor 20 of cup 11. Upright outer tab 1112 is arranged to extend upwardly from floor 20 and to mate with upright inner tab 1114 along an interface I therebetween as suggested in FIG. 35. Upright fence 1111 is arranged to interconnect upright inner and outer tabs 1114, 1112 and surround cup-receiving space 1115.

Upright fence 1111 of insulative sleeve 1113 is C-shaped in a horizontal cross-section and each of upright inner and outer tabs 1114, 1112 has an arcuate shape in a horizontal cross-section. Upright fence 1111 has a first thickness 11T1 and first and second upright tabs 1114, 1112 each have a second thickness 11T2. As suggested in FIG. 34 and shown in FIG. 35, second thickness 11T2 is about equal to first thickness 11T1. As a result, bridge 1114, 1112 formed by overlapping and coupling upright tabs 1114, 1112 has a third thickness 11T3 which about twice first and second thicknesses 11T1, 11T2.

Another embodiment of an insulative sleeve 1213 in accordance with the present disclosure is shown in FIGS. 36-40. Insulative sleeve 1213 includes a sleeve wall 1218 and a sleeve-wall retainer 1220 as shown, for example in FIG. 36. Sleeve wall 1218 includes a first sleeve panel 1218A, a second sleeve panel 1218B spaced-apart from first sleeve panel 1218A, and a connecting web 1218C positioned to lie between and interconnect first and second sleeve panels 1218A, 1218B as shown in FIGS. 36 and 38.

Sleeve-wall retainer 1220 includes an upright tab 1220A, an adhesive layer 1220B, and a release liner 1220C as shown in FIG. 36. Upright tab 1220A is coupled to a free end of first sleeve panel 1218A opposite connecting web 1218C. Adhesive layer 1220B is placed on upright tab 1220A and release liner 1220C is placed on adhesive layer 1220B to locate adhesive layer 1220B between release liner 1220C and upright tab 1220A until assembly of insulative sleeve 1213 in the field.

In example of use, insulative sleeve 1213 may be assembled and coupled to a cup 11 in the field. As shown in FIG. 37, insulative sleeve 1213 is in a dis-assembled state in spaced-apart relation to cup 11. Second sleeve panel 1218B is folded back away from first sleeve panel 1218A about connecting web 1218C to expose sleeve retainer 1220 as suggested in FIG. 38. Release liner 1220C is pulled away from adhesive layer 1220B to expose adhesive layer 1220B as shown in FIG. 39. Upright tab 1220A and adhesive 1220B are arranged to overlap a free end of second sleeve panel 1218B to for insulative sleeve 1213 as shown in FIG. 40. Cup 11 is inserted into and coupled to insulative sleeve 1213 as suggested in FIG. 40. As an example, insulative sleeve 1213 may be coupled to cup 11 by friction interference or any other suitable method.

The insulative cellular non-aromatic polymeric material used to produce the insulative sleeves 213 and 113 and the variants of those sleeves is somewhat flexible and capable of expanding slightly under load to allow a properly sized sleeve to grip a vessel with some level of bias.

It is within the scope of the present disclosure to form insulative sleeves 813, 913, 1013, 1113, and 1213 with various patterns, including those discussed with regard to sleeves 313, 413, 513, 613, and 713 above. The various patterns may be formed by forming localized areas of plastic deformation in each insulative sleeve. An example, the patterns may be formed by compression portions of the sleeve such that the pattern is made from uncompressed portions. As another example, the patterns may be formed by compressing portions of the sleeve such that the pattern is made from the compressed portions. In still yet another example, the patterns may be formed by deforming portions of the sleeve so that thicknesses throughout the sleeve are maximized. In yet another example, combinations of deformation and compression may be used.

The insulative sleeve as described hereinabove provides the cup with strength and insulation. A feature of the thermoformed cup with an insulative sleeve of the present disclosure is that the thermoformed cup is seamless, yet the insulating sleeve provides desired strength, insulation, and a printable surface. The thermoformed cup has a brim without a seam, thereby providing a lid seal which reduces potential leakage compared to expanded polystyrene cups (which have seams). Another feature of the thermoformed cup and insulative sleeve of the present disclosure is that the desired strength and insulation levels are attained, but the cup side walls have a desirable level of puncture resistance. The present disclosure also provides for an insulative sleeve which can be provided separate from the cup.

The insulative sleeve made of insulative cellular non-aromatic polymeric material as described in the present disclosure can also be used or adapted for use with structures other than containers. As an example, the insulative cellular non-aromatic polymeric material may used as, but not limited to, a window sill seal, pipe wrap, or other applications where a low density, light weight, thin, material with good insulation is desired.

In an alternative exemplary embodiment, the cup, base, or body may be made of a material other than a thermoformed material. As example, the cup, base, or body may be made of an injection molded material or any other suitable alternative.

An insulative cellular non-aromatic polymeric material produced in accordance with the present disclosure can be formed to produce an insulative cup 2010, as suggested in FIG. 42. As an example, the insulative cellular non-aromatic polymeric material comprises a polypropylene base resin having a high melt strength, a polypropylene copolymer or homopolymer (or both), and cell-forming agents including at least one nucleating agent and a blowing agent such as carbon dioxide. As a further example, the insulative cellular non-aromatic polymeric material further comprises a slip agent. The polypropylene base resin has a broadly distributed unimodal (not bimodal) molecular weight distribution.

In one aspect of the present disclosure, the polypropylene resin (either the base or the combined base and secondary resin) may have a density in a range of about 0.01 g/cm$^3$ to about 0.19 g/cm$^3$. In one exemplary embodiment, the density may be in a range of about 0.05 g/cm$^3$ to about 0.19 g/cm$^3$. In one exemplary embodiment, the density may be in a range of about 0.1 g/cm$^3$ to about 0.185 g/cm$^3$.

A material-forming process 2100 uses a polypropylene-based formulation 2121 in accordance with the present disclosure to produce a strip 2082 of insulative cellular non-aromatic polymeric material as shown in FIG. 41. Formulation 2121 is heated and extruded in two stages to produce a tubular extrudate 2124 that can be slit to provide strip 2082 of insulative cellular non-aromatic polymeric material as illustrated, for example, in FIG. 41. A blowing agent in the form of a liquified inert gas is introduced into a molten resin 2122 in the first extrusion zone.

Insulative cellular non-aromatic polymeric material is used to form insulative cup 2010. Insulative cup 2010 includes a body 2011 having a sleeve-shaped side wall 2018 and a floor 2020 as shown in FIGS. 42 and 44. Floor 2020 is coupled to body 2011 and cooperates with side wall 2018 to form an interior region 2014 therebetween for storing food, liquid, or any suitable product. Body 2011 also includes a rolled brim 2016 coupled to an upper end of side wall 2018 and a floor mount 2017 coupled to a lower end of side wall 2018 and to floor 2020 as shown in FIG. 45.

Insulative cellular non-aromatic polymeric material is configured in accordance with the present disclosure to provide means for enabling localized plastic deformation in at least one selected region of body 2011 (e.g., side wall 2018, rolled brim 2016, floor mount 2017, and a floor-retaining flange 2026 included in floor mount 2017) to provide (1) a plastically deformed first material segment having a first density in a first portion of the selected region of body 2011 and (2) a second material segment having a relatively lower second density in an adjacent second portion of the selected region of body 2011 as suggested, for example, in FIGS. 42 and 46-49. In illustrative embodiments, the first material segment is thinner than the second material segment.

In exemplary embodiments, a formulation includes at least one polymeric material. In one exemplary embodiment a primary or base polymer comprises a high melt strength polypropylene that has long chain branching. Long chain branching occurs by the replacement of a substituent, e.g., a hydrogen atom, on a monomer subunit, by another covalently bonded chain of that polymer, or, in the case of a graft copolymer, by a chain of another type. For example, chain transfer reactions during polymerization could cause branching of the polymer. Long chain branching is branching with side polymer chain lengths longer than the average critical entanglement distance of a linear polymer chain. Long chain branching is generally understood to include polymer chains with at least 20 carbon atoms depending on specific monomer structure used for polymerization. Another example of branching is by crosslinking of the polymer after polymerization is complete. Some long chain branch polymers are formed without crosslinking Polymer chain branching can have a significant impact on material properties. Final selection of a polypropylene material may take into account the properties of the end material, the additional materials needed during formulation, as well as the conditions during the extrusion process. In exemplary embodiments high melt strength polypropylenes may be materials that can hold a gas (as discussed hereinbelow), produce desirable cell size, have desirable surface smoothness, and have an acceptable odor level (if any).

One illustrative example of a suitable polypropylene base resin is DAPLOY™ WB140 homopolymer (available from *Borealis* A/S), a high melt strength structural isomeric modified polypropylene homopolymer (melt strength=36, as tested per ISO 16790 which is incorporated by reference herein, melting temperature=325.4° F. (163° C.) using ISO 11357, which is incorporated by reference herein).

In certain exemplary embodiments, a secondary polymer may be used with the base polymer. The secondary polymer may be, for example, a polymer with sufficient crystallinity. In exemplary embodiments the secondary polymer may be at least one crystalline polypropylene homopolymer, an impact copolymer, mixtures thereof or the like. One illustrative example is a high crystalline polypropylene homopolymer, available as F020HC from Braskem. Another illustrative example is a polymer commercially available as PRO-FAX SC204™ (available from LyndellBasell Industries Holdings, B.V.). Another illustrative example is Homo PP-INSPIRE 222, available from Braskem. In one aspect the polypropylene may have a high degree of crystallinity, i.e., the content of the crystalline phase exceeds 51% (as tested using differential scanning calorimetry) at 10° C./min cooling rate. In exemplary embodiments several different secondary polymers may be used and mixed together.

In exemplary embodiments, the secondary polymer may be or may include polyethylene. In exemplary embodiments, the secondary polymer may include low density polyethylene, linear low density polyethylene, high density polyethylene, ethylene-vinyl acetate copolymers, ethylene-ethyl-acrylate copolymers, ethylene-acrylic acid copolymers, mixtures of at least two of the foregoing and the like. The use of non-polypropylene materials may affect recyclability, insulation, microwavability, impact resistance, or other properties, as discussed further hereinbelow.

One or more nucleating agents are used to provide and control nucleation sites to promote formation of cells, bubbles, or voids in the molten resin during the extrusion process. Nucleating agent means a chemical or physical material that provides sites for cells to form in a molten resin mixture. Nucleating agents may be physical agents or chemical agents. Suitable physical nucleating agents have desirable particle size, aspect ratio, and top-cut properties. Examples include, but are not limited to, talc. $CaCO_3$, mica, and mixtures of at least two of the foregoing. The nucleating agent may be blended with the polymer resin formulation that is introduced into the hopper. Alternatively, the nucleating agent may be added to the molten resin mixture in the extruder. When the chemical reaction temperature is reached the nucleating agent acts to enable formation of bubbles that create cells in the molten resin. An illustrative example of a chemical blowing agent is citric acid or a citric acid-based material. After decomposition, the chemical blowing agent forms small gas cells which further serve as nucleation sites for larger cell growth from a physical or other types of blowing agents. One representative example is Hydrocerol™ CF-40E™ (available from Clariant Corporation), which contains citric acid and a crystal nucleating agent. In illustrative embodiments one or more catalysts or other reactants may be added to accelerate or facilitate the formation of cells.

A material-forming process 2100 is shown, for example, in FIG. 41. Material-forming process 2100 extrudes a non-aromatic polymeric material into a sheet or strip of insulative cellular non-aromatic polymeric material 2082 as suggested in FIG. 41. As an example, material-forming process 2100 uses a tandem-extrusion technique in which a first extruder 2111 and a second extruder 2112 cooperate to extrude strip of insulative cellular non-aromatic polymeric material 2082.

As shown in FIG. 41, a formulation 2101 of insulative cellular non-aromatic polymeric material 2082 is loaded into a hopper 2113 coupled to first extruder 2111. The formulation 2101 may be in pellet, granular flake, powder, or other suitable form. Formulation 2101 of insulative cellular non-aromatic polymeric material is moved from hopper 2113 by a screw 2114 included in first extruder 2111. Formulation 2101 is transformed into a molten resin 2102 in a first extrusion zone of first extruder 2111 by application of heat 2105 and pressure from screw 2114 as suggested in FIG. 41. In exemplary embodiments a physical blowing agent 2115 may be introduced and mixed into molten resin 2102 after molten resin 2102 is established. In exemplary embodiments, as discussed further herein, the physical blowing agent may be a gas introduced as a pressurized liquid via a port 2115A and mixed with molten resin 2102 to form a molten extrusion resin mixture 2103, as shown in FIG. 41.

Extrusion resin mixture 2103 is conveyed by screw 2114 into a second extrusion zone included in second extruder 2112 as shown in FIG. 41. There, extrusion resin mixture 2103 is further processed by second extruder 2112 before being expelled through an extrusion die 2116 coupled to an end of second extruder 2112 to form an extrudate 2104. As extrusion resin mixture 2103 passes through extrusion die 2116, gas 2115 comes out of solution in extrusion resin mixture 2103 and begins to form cells and expand so that extrudate 2104 is established. As an exemplary embodiment shown in FIG. 41 the extrudate 2104 may be formed by an annular extrusion die 2116 to form a tubular extrudate. A slitter 2117 then cuts extrudate 2104 to establish a sheet or strip 2082 of insulative cellular non-aromatic polymeric material as shown in FIG. 41.

Extrudate means the material that exits an extrusion die. The extrudate material may be in a form such as, but not limited to, a sheet, strip, tube, thread, pellet, granule or other structure that is the result of extrusion of a polymer-based formulation as described herein through an extruder die. For the purposes of illustration only, a sheet will be referred to as a representative extrudate structure that may be formed, but is intended to include the structures discussed herein. The extrudate may be further formed into any of a variety of final products, such as, but not limited to, cups, containers, trays, wraps, wound rolls of strips of insulative cellular non-aromatic polymeric material, or the like.

As an example, strip 2082 of insulative cellular non-aromatic polymeric material is wound to form a roll of insulative cellular non-aromatic polymeric material and stored for later use either in a cup-forming process. However, it is within the scope of the present disclosure for strip 2082 of insulative cellular non-aromatic polymeric material to be used in-line with the cup-forming process. In one illustrative example, strip 2082 of insulative cellular non-aromatic polymeric material is laminated with a skin having a film and an ink layer printed on the film to provide high-quality graphics.

An insulative cup 2010 is formed using a strip 2082 of insulative cellular non-aromatic polymeric material as shown in FIGS. 42 and 43. Insulative cup 2010 includes, for example, a body 2011 having a sleeve-shaped side wall 2018 and a floor 2020 coupled to body 2011 to cooperate with the side wall 2018 to form an interior region 2014 for storing food, liquid, or any suitable product as shown in FIG. 42. Body 2011 also includes a rolled brim 2016 coupled to an upper end of side wall 2018 and a floor mount 2017 coupled to a lower end of side wall 2018 and to the floor 2020 as illustrated in FIGS. 42 and 47.

Body 2011 is formed from a strip 2082 of insulative cellular non-aromatic polymeric material as disclosed herein. In accordance with the present disclosure, strip 82 of insulative cellular non-aromatic polymeric material is configured through application of pressure and heat (though in exemplary embodiments configuration may be without application of heat) to provide means for enabling localized plastic deformation in at least one selected region of body 2011 to provide a plastically deformed first sheet segment having a first density located in a first portion of the selected region of body 2011 and a second sheet segment having a second density lower than the first density located in an adjacent second portion of the selected region of body 2011 without fracturing the sheet of insulative cellular non-aromatic polymeric material so that a predetermined insulative characteristic is maintained in body 2011.

A first 2101 of the selected regions of body 2011 in which localized plastic deformation is enabled by the insulative cellular non-aromatic polymeric material is in sleeve-shaped side wall 2018 as suggested in FIGS. 42, 45, and 46. Sleeve-shaped side wall 2018 includes an upright inner tab 2514, an upright outer tab 2512, and an upright fence 2513 as suggested in FIGS. 42, 45, and 46. Upright inner tab 2514 is arranged to extend upwardly from floor 2020 and configured to provide the first sheet segment having the first density in the first 2101 of the selected regions of body 2011. Upright outer tab 2512 is arranged to extend upwardly from floor 2020 and to mate with upright inner tab 2514 along an interface I' therebetween as suggested in FIG. 46. Upright fence 2513 is arranged to interconnect upright inner and outer tabs 2514, 2512 and surround interior region 2014. Upright fence 2513 is configured to provide the second sheet segment having the second density in the first 2101 of the selected regions of body 2011 and cooperate with upright inner and outer tabs 2514, 2513 to form sleeve-shaped side wall 18 as suggested in FIGS. 42-45.

A second 2102 of the selected regions of body 2011 in which localized plastic deformation is enabled by the sheet of insulative cellular non-aromatic polymeric material is in rolled brim 2016 included in body 2011 as suggested in FIGS. 42, 44, 45, and 47. Rolled brim 2016 is coupled to an upper end of sleeve-shaped side wall 2018 to lie in spaced-apart relation to floor 2020 and to frame an opening into interior region 2014. Rolled brim 2016 includes an inner rolled tab 2164, an outer rolled tab 2162, and a rolled lip 2163 as suggested in FIGS. 42, 44, 45, and 47. Inner rolled tab 2164 is configured to provide the first sheet segment in the second 2102 of the selected regions of body 2011. Inner rolled tab 2164 coupled to an upper end of upright outer tab 2512 included in sleeve-shaped side wall 2018. Outer rolled tab 2162 is coupled to an upper end of upright inner tab 2514 included in sleeve-shaped side wall 2018 and to an outwardly facing exterior surface of inner rolled tab 2164. Rolled lip 2163 is arranged to interconnect oppositely facing side edges of each of inner and outer rolled tabs 2164, 2162. Rolled lip 2163 is configured to provide the second sheet segment having the second density in the second 2102 of the selected region of body 2011 and cooperate with inner and outer rolled tabs 2164, 2162 to form rolled brim 2016 as suggested in FIG. 42.

A third 2103 of the selected regions of body 2011 in which localized plastic deformation is enabled by the sheet of insulative cellular non-aromatic polymeric material is in a floor mount included in body 2011 as suggested in FIGS. 42, 45, and 48. Floor mount 2027 is coupled to a lower end of sleeve-shaped side wall 2018 to lie in spaced-apart relation to rolled brim 2016 and to floor 2020 to support floor 2020 in a stationary position relative to sleeve-shaped side wall 2018 to form interior region 2014. Floor mount 2017 includes a web-support ring 2126, a floor-retaining flange 2026, and a web 2025. Web-support ring 2126 is coupled to the lower end of sleeve-shaped side wall 2018 and configured to provide the second sheet segment having the second density in the third 2103 of the selected regions of body 2011. Floor-retaining flange 2026 is coupled to floor 2020 and arranged to be surrounded by web-support ring 2126. Web 2025 is arranged to interconnect floor-retaining flange 2026 and web-support ring 2126. Web 2025 is configured to provide the first sheet segment having the first density in the third 2103 of the selected regions of body 2011.

A fourth 2104 of the selected regions of body 2011 in which localized plastic deformation is enabled by the sheet of insulative cellular non-aromatic polymeric material is in floor-retaining flange of floor mount 2017 as suggested in FIGS. 42, 45, and 49. Floor-retaining flange 2026 includes an alternating series of upright thick and thin staves arranged in side-to-side relation to extend upwardly from web 2025 toward interior region 2014 bounded by sleeve-shaped side wall 2018 and floor 2020. A first 2261 of the upright thick staves is configured to include a right side edge extending upwardly from web 2025 toward interior region 2014. A second 2262 of the upright thick staves is configured to include a left side edge arranged to extend upwardly from web 2025 toward interior region 2014 and lie in spaced-apart confronting relation to right side edge of the first 261 of the upright thick staves. A first 2260 of the upright thin staves is arranged to interconnect left side edge of the first 2261 of the upright thick staves and right side edge of the second 2262 of the upright thick staves and to cooperate with left and right side edges to define therebetween a vertical channel 2263 opening inwardly into a lower interior region bounded by floor-retaining flange 2026 and a horizontal platform 2021 included in floor 2020 and located above floor-retaining flange 2026. The first 2260 of the upright thin staves is configured to provide the first sheet segment in the fourth 2104 of the selected regions of body 2011. The first 2261 of the upright thick staves is configured to provide the second sheet segment in the fourth 2104 of the selected regions of the body 2011.

The compressibility of the insulative cellular non-aromatic polymeric material used to produce insulative cup 2010 allows the insulative cellular non-aromatic polymeric material to be prepared for the mechanical assembly of insulative cup 2010, without limitations experienced by other non-aromatic polymeric materials. The cellular nature of the material provides insulative characteristics as discussed below, while susceptibility to plastic deformation permits yielding of the material without fracture. The plastic deformation experienced when the insulative cellular non-aromatic polymeric material is subjected to a pressure load is used to form a permanent set in the insulative cellular non-aromatic polymeric material after the pressure load has been removed. In some locations, the locations of permanent set are positioned to provide controlled gathering of the sheet of insulative cellular non-aromatic polymeric material.

The plastic deformation may also be used to create fold lines in the sheet to control deformation of the sheet when being worked during the assembly process. When deformation is present, the absence of material in the voids formed by the deformation provides relief to allow the material to be easily folded at the locations of deformation.

A potential unexpected feature of the sheet of insulative cellular non-aromatic polymeric material formed as described herein is the high insulation value obtained at a given thickness.

A potential feature of a cup formed of insulative cellular non-aromatic polymeric material according to exemplary embodiments of the present disclosure is that the cup has low material loss. Furthermore, the material of the present disclosure may have markedly low off-gassing when subjected to heat from a conventional kitchen-type microwave oven for periods of time up to several minutes.

Another potential feature of a cup formed of the insulative cellular non-aromatic polymeric material according to the present disclosure is that the cup can be placed in and go through a conventional residential or commercial dishwasher cleaning cycle (top rack) without noticeable structural or material breakdown or adverse affect on material properties. This is in comparison to beaded expanded polystyrene cups or containers which can break down under similar cleaning processes. Accordingly, a cup made according to one aspect of the present disclosure can be cleaned and reused.

Another potential feature of an article formed of the insulative cellular non-aromatic polymeric material according to various aspects of the present disclosure is that the article can be recycled. Recyclable means that a material can be added (such as regrind) back into an extrusion or other formation process without segregation of components of the material, i.e., an article formed of the material does not have to be manipulated to remove one or more materials or components prior to re-entering the extrusion process. For example, a cup having a printed film layer laminated to the exterior of the cup may be recyclable if one does not need to separate out the film layer prior to the cup being ground into particles. In contrast, a paper-wrapped expanded polystyrene cup may not be recyclable because the polystyrene material could not practicably be used as material in forming an expanded polystyrene cup, even though the cup material may possibly be formed into another product. As a further example, a cup formed from a non-expanded polystyrene material having a layer of non-styrene printed film adhered thereto may be considered non-recyclable because it would require the segregation of the polystyrene cup material from the non-styrene film layer, which would not be desirable to introduce as part of the regrind into the extrusion process.

Recyclability of articles formed from the insulative cellular non-aromatic polymeric material of the present disclosure minimizes the amount of disposable waste created. In comparison, beaded expanded polystyrene cups that break up into beads and thus ordinarily cannot easily be reused in a manufacturing process with the same material from which the article was formed. And, paper cups that typically have an extrusion coated plastic layer or a plastic lamination for liquid resistance ordinarily cannot be recycled because the different materials (paper, adhesive, film, plastic) normally cannot be practicably separated in commercial recycling operations.

A potential feature of a cup or other article formed of material according to one aspect (a non-laminate process) of the present disclosure is that the outside (or inside or both) wall surface of the insulative cellular non-aromatic polypropylene sheet (prior to being formed into a cup, or during cup formation, depending on the manufacturing process employed) can accept printing of high-resolution graphics. Conventional beaded expanded polystyrene cups have a surface which typically is not smooth enough to accept printing other than low-resolution graphics. Similarly, known uncoated paper cups also typically do not have a smooth enough surface for such high-resolution graphics. Paper cups can be coated to have the desired surface finish and can achieve high resolution. Paper has difficulty reaching insulation levels and requires a designed air gap incorporated into or associated with the cup to achieve insulation, such as a sleeve slid onto and over a portion of the cup. Accordingly, solutions have been to use low-resolution printing, laminate to the outside wall a film which has been printed, or to have a printed sleeve (either bonded or removable) inserted over the outside wall or coat the paper to accept high resolution graphics.

A potential feature of a cup formed of the insulative cellular non-aromatic polymeric material according to one aspect of the present disclosure is that it possesses unexpected strength as measured by rigidity. Rigidity is a measurement done at room temperature and at an elevated temperature (e.g., by filling the cup with a hot liquid) and measuring the rigidity of the material. The strength of the cup material is important to reduce the potential for the cup being deformed by a user and the lid popping off or the lid or sidewall seal leaking.

A potential feature of a cup formed of the insulative cellular non-aromatic polymeric material according to the present disclosure is that the sleeve is resistant to puncture, such as by a straw, fork, spoon, finger nail, or the like, as measured by standard impact testing, as described hereinbelow. Test materials demonstrated substantially higher impact resistance when compared to a beaded expanded polystyrene cup. Accordingly, a cup formed one aspect as described herein can reduce the likelihood of puncture and leakage of hot liquid onto a user.

A feature of a cup with a compressed brim and seam formed of the material according to one aspect as described herein is that a greater number of such cups can be nested in a given sleeve length because the seam is thinner and the side wall angle can be minimized (i.e., more approaching 90° with respect to the cup bottom) while providing a sufficient air gap to permit easy de-nesting. Conventionally seam-formed cups having a seam substantially thicker than the side wall requires a greater side wall angle (and air gap) to allow for de-nesting, resulting in fewer cups being able to be nested in a given sleeve length.

A feature of a cup formed of the material according to one aspect of the present disclosure is that the brim may have a cross-section profile of less than about 0.170 inches (4.318 mm) which may be due to localized cell deformation and compression. Such a small profile is more aesthetically pleasing than a larger profile.

A feature of a cup formed of the material according to one aspect of the present disclosure is that the rolled brim diameter can be the same for cups of different volumes, enabling one lid size to be used for different cup sizes, assuming the cup rims outside diameters are the same. As a result, the number of different size lids in inventory and at the point of use may be reduced.

The material formulation may have properties that allow the sheet to be compressed without fracturing.

The insulative cellular non-aromatic polymeric material of the present disclosure may be formed into a strip which can be wrapped around other structures. For example, a strip of the material according to one aspect of the present disclosure that can be used as a wrapping material may be formed and wrapped around a pipe, conduit, or other structure to provide improved insulation. The sheet or strip may have a layer of adhesive, such as a pressure sensitive adhesive, applied to one or both faces. The strip may be wound onto a roll. Optionally, the strip may have a release liner associated therewith to make unwinding the strip from the roll easier. The polymer formulation may be adapted to provide the requisite flexibility to form a wrap or windable strip, for example, by using one or more polypropylene or other polyolefin materials that have sufficient flexibility to enable the extruded sheet to be flexible enough to be wound onto a roll. The insulative cellular non-aromatic polymeric material may be formed into a sleeve that can be inserted over a cup to provide additional insulation.

In exemplary embodiments sheets formed from the insulative cellular non-aromatic polymeric material of the present disclosure may be cut at the die or be flaked and used as a bulk insulator.

The formulation and insulative cellular non-aromatic polymeric material of the present disclosure satisfies a long-felt need for a material that can be formed into an article, such as a cup, that includes many if not all of the features of insulative performance, ready for recyclability, puncture resistance, frangibility resistance, microwavability and other features as discussed herein. Others have failed to provide a material that achieves combinations of these features as reflected in the appended claims. This failure is a result of the features being associated with competitive design choices. As an example, others have created materials and structures therefrom that based on design choices are insulated but suffer from poor puncture resistance, inability to effectively be recyclable, and lack microwavability. In comparison, the formulations and materials disclosed herein overcome the failures of others by using an insulative cellular non-aromatic polymeric material. Reference is hereby made to U.S. application Ser. No. 13/491,007 filed Jun. 7, 2012 and entitled INSULATED CONTAINER for disclosure relating to articles, such as cups, formed from such insulative cellular non-aromatic polymeric materials, which application is hereby incorporated in its entirety herein.

EXAMPLES

The following examples are set forth for purposes of illustration only. Parts and percentages appearing in such examples are by weight unless otherwise stipulated. All ASTM, ISO and other standard test method cited or referred to in this disclosure are incorporated by reference in their entirety.

Example 1—Formulation and Extrusion

DAPLOY™ WB140 polypropylene homopolymer (available from *Borealis* A/S) was used as the polypropylene base resin. F020HC, available from Braskem, a polypropylene homopolymer resin, was used as the secondary resin. The two resins were blended with: Hydrocerol™ CF-40E™ as a primary nucleation agent, talc as a secondary nucleation agent, $CO_2$ as a blowing agent, a slip agent, and titanium dioxide as a colorant. Percentages were:

79.9% Primary resin: high melt strength polypropylene *Borealis* WB140 HMS
    15% Secondary resin: F020HC (Braskem)
    0.1% Primary nucleating agent: Clariant Hyrocerol CF-40E™
    2% Secondary nucleating agent: Talc
    1% Colorant: $TiO_2$ PE (alternatively, PP can be used)
    2% Slip agent: Ampacet™ 102823 LLDPE (linear low-density polyethylene), available from Ampacet Corporation The formulation was added to an extruder hopper. The extruder heated the formulation to form a molten resin mixture. To this mixture was added
    1.1 lbs/hr $CO_2$
    0.7 lbs/hr R134a The carbon dioxide with R134a was injected into the resin blend to expand the resin and reduce density. The mixture thus formed was extruded through a die head into a sheet. The sheet was then cut and formed into a cup.

Example 1—Test Results

The test results of the material formed according to Example 1 showed the material had a density of 0.1902 g/cc and a nominal sheet gauge of 0.089 inches.

Microwavability

Containers produced using this material filled with 12 ounces of room temperature water were heated in a FISO Microwave Station (1200 Watts) microwave oven for 2.5 min without burning or scorching or other visible effect on the cup. In comparison, paper cups heated in the same microwave oven scorched or burned in less than 90 seconds.

Rigidity

Test Method

Samples were at 73°F and 50% relative humidity. The Cup Stiffness/Rigidity test was conducted with a horizontal force gauge containing a load cell to measure the resisting force of the cup when exposed to the following test conditions: (a) The test location on the cup was ⅓ down from the rim of the cup. (b) Testing travel distance is ¼ inches. (c) Testing travel time was 10 seconds.

Test Results

With an average wall thickness of 0.064 inches, average density of 0.1776 g/cc, and average cup weight of 9.86 g, the rigidity of the material are shown below in Tables 1-2.

TABLE 1

Rigidity Test Results unlidded/unfilled Rigidities (kg-F)

| Cup # | Seam | 90° from Seam | Average |
|---|---|---|---|
| 1 | 0.64 | 0.654 | 0.647 |
| 2 | 0.646 | 0.672 | 0.659 |
| 3 | 0.632 | 0.642 | 0.637 |
| 4 | 0.562 | 0.608 | 0.585 |
| 5 | 0.652 | 0.596 | 0.624 |
|  |  |  | 0.630 |
|  | STD DEV |  | 0.028 |
|  | 3sigma |  | 0.085 |
|  | High Range |  | 0.716 |
|  | Low Range |  | 0.545 | lidded/unfilled Rigidities (kg-F)

| Cup # | Seam | 90° from Seam | Average |
|---|---|---|---|
| 6 | 0.89 | 0.83 | 0.860 |
| 7 | 0.954 | 0.904 | 0.929 |
| 8 | 0.846 | 0.808 | 0.827 |
| 9 | 0.732 | 0.826 | 0.779 |
| 10 | 0.87 | 0.792 | 0.831 |
|  |  |  | 0.845 |
|  | STD DEV |  | 0.055 |
|  | 3sigma |  | 0.165 |
|  | High Range |  | 1.011 |
|  | Low Range |  | 0.680 | unlidded/filled 200° F. Rigidities (kg-F)

| Cup # | Seam | 90° from Seam | Average |
|---|---|---|---|
| 11 | 0.274 | 0.290 | 0.282 |
| 12 | 0.278 | 0.326 | 0.302 |
| 13 | 0.264 | 0.274 | 0.269 |
| 14 | 0.300 | 0.270 | 0.285 |
| 15 | 0.252 | 0.280 | 0.266 |

TABLE 1-continued

Rigidity Test Results

|  |  |  | 0.281 |
|---|---|---|---|
|  | STD DEV |  | 0.014 |
|  | 3sigma |  | 0.043 |
|  | High Range |  | 0.324 |
|  | Low Range |  | 0.238 | lidded/filled 200° F. Rigidities (kg-F)

| Cup # | Seam | 90° from Seam | Average |
|---|---|---|---|
| 16 | 0.346 | 0.354 | 0.350 |
| 17 | 0.386 | 0.422 | 0.404 |
| 18 | 0.358 | 0.364 | 0.361 |
| 19 | 0.338 | 0.374 | 0.356 |
| 20 | 0.304 | 0.272 | 0.288 |
|  |  |  | 0.352 |
|  | STD DEV |  | 0.042 |
|  | 3sigma |  | 0.125 |
|  | High Range |  | 0.476 |
|  | Low Range |  | 0.227 | unlidded/filled ice water Rigidities (kg-F)

| Cup # | Seam | 90° from Seam | Average |
|---|---|---|---|
| 21 | 0.796 | 0.730 | 0.763 |
| 22 | 0.818 | 0.826 | 0.822 |
| 23 | 0.894 | 0.760 | 0.827 |
| 24 | 0.776 | 0.844 | 0.810 |
| 25 | 0.804 | 0.714 | 0.759 |
|  |  |  | 0.796 |
|  | STD DEV |  | 0.033 |
|  | 3sigma |  | 0.098 |
|  | High Range |  | 0.894 |
|  | Low Range |  | 0.698 | lidded/filled ice water Rigidities (kg-F)

| Cup # | Seam | 90° from Seam | Average |
|---|---|---|---|
| 26 | 1.044 | 0.892 | 0.968 |
| 27 | 1.146 | 1.018 | 1.082 |
| 28 | 0.988 | 1.054 | 1.021 |
| 29 | 1.012 | 1.106 | 1.059 |
| 30 | 0.826 | 1.058 | 0.942 |
|  |  |  | 1.014 |
|  | STD DEV |  | 0.059 |
|  | 3sigma |  | 0.177 |
|  | High Range |  | 1.192 |
|  | Low Range |  | 0.837 |

TABLE 2

Summary of Rigidity Test Results

|  | Unfilled Kg-F (kilograms-force) | | Hot Fill 200° F. Kg-F | | Ice Water Fill 35° F. Kg-F | | Wall Thickness | Density |
|---|---|---|---|---|---|---|---|---|
|  | Unlidded | Lidded | Unlidded | Lidded | Unlidded | Lidded | Inches | g/cc |
| Test material | 0.630 | 0.845 | 0.281 | 0.352 | 0.796 | 1.014 | 0.064 | 0.1776 |

Insulation
Test Method

A typical industrial cup insulation test method as follows was used: s

Attach the (cup exterior) surface temperature thermocouple to cup with glue.
Tape attached thermocouple to cup with cellophane tape so that the thermocouple is in the middle of the cup opposite the seam.
Heat water or other aqueous liquid to near boiling, such as in a microwave.
Continually stir the hot liquid with a bulb thermometer while observing the liquid temperature.
Record thermocouple temperature.
When the liquid gets to 200° F. pour into cup to near full.
Place lid on cup.
Record surface temperature for a minimum of 5 minutes.
Material thickness was 0.089 inches. The density was 0.1902 g/cc.

Test Results

A cup formed from the formulation noted above was used having a density of 0.190 g/cm$^3$ and a wall thickness of 0.089 inches. A hot liquid at 200° F. (93.3° C.) was placed in the cup.

Test Results

The temperature measured on the outside wall of the cup was about 140.5° F.). (60.3° ° C., i.e., a 59.5° F. (33°C) drop. The maximum temperature over a five-minute period was observed to peak at 140.5° F.). (60.3° ° C.

The lower the temperature, the better the insulation property of the cup material as the material reduces the heat transferring from the liquid to the cup material exterior.

Frangibility

Frangibility can be defined as resistance to tear or punctures causing fragmentation.

Test Method

The Elmendorf test method described in ASTM D1922-93 was used. The radius of tear was 1.7 inches.

Test Results

The test results are shown in Tables 3-4 below. The material as formed in one exemplary embodiment of the present disclosure provides superior resistance to tear forces when compared to EPS.

TABLE 4-continued

| Summary of Test Results | | |
| --- | --- | --- |
| Elmendorf Tear transverse direction (TD) Arm | g | 800 |
| Elmendorf Tear TD | gf | 212 |

| Tear Strength | Expanded polystyrene (mean) |
| --- | --- |
| Elmendorf Tear Arm | 800 |
| Elmendorf Tear | 112 |

EPS does not have a material orientation, i.e., a "machine" or "transverse" direction, due to the manufacturing process. The range (calculated as: lower range=mean−(3×std dev); upper range=mean+(3×std dev)) for the tested material of the present disclosure was 213-351 g-f in the machine direction and 143-281 g-f in the transverse direction. In comparison, the range of the expanded polystyrene material tested was 103-121 g-f.

Puncture Resistance

Test Method

Determine the force and travel needed to puncture cup sidewall and bottom. An Instron instrument is used in compression mode set to 10 inches per minute travel speed. The cup puncture test fixture on base of Instron is used. This fixture allows the cup to fit over a shape that fits inside the cup with a top surface that is perpendicular to the travel of the Instron tester. The one inch diameter hole of the fixture should be positioned up. The portion of the Instron that moves should be fitted with a 0.300 inch diameter punch. The punch with the hole is aligned in the test fixture. The cup is placed over the fixture and the force and travel needed to puncture the cup sidewall is recorded. The sidewall puncture test is repeated in three evenly spaced locations while not puncture testing on the seam of the cup. The bottom of the cup is tested. This should be done in the same manner as the sidewall test except no fixture is used. The cup is just placed upside down on the base of the Instron while bringing the punch down on the center of the cup bottom.

Test Results

Force curves and pictures of the typical sidewall puncture and the bottom puncture are shown in Table 5 below.

TABLE 3

| | Test Results | | | | | | | | | | | | | |
| --- | --- | --- | --- | --- | --- | --- | --- | --- | --- | --- | --- | --- | --- | --- |
| | Machine Direction (gram force) | | | | | | | Transverse Direction (gram force) | | | | | | |
| Tag | Test 1 | Test 2 | Test 3 | Test 4 | Test 5 | mean | std dev. | Test 1 | Test 2 | Test 3 | Test 4 | Test 5 | mean | std dev. |
| Test Material | 288 | 262 | 288 | 258 | 315 | 282 | 23 | 232 | 213 | 178 | 205 | 232 | 212 | 23 |
| EPS | 108 | 114 | 112 | 116 | 110 | 112 | 3 | * | | | | | | |

TABLE 4

| Summary of Test Results | | |
| --- | --- | --- |
| Tear Strength | Sample ID → | Test material cup (mean) |
| Elmendorf Tear machine direction (MD) Arm | g (gram) | 800 |
| Elmendorf Tear MD | gf (gram force) | 282 |

TABLE 5

| Puncture Test Results | | |
| --- | --- | --- |
| Cavity # | Max Load (lbf) | Ext. @ Max Load (in) |
| Expanded polystyrene | 3.79 | 0.300 |
| tested insulative cellular non-aromatic polymeric material (No Rim) | 22.18 | 0.292 |

Slow Puncture Resistance—Straw

Test Method

The material as formed in one exemplary embodiment of the present disclosure provides superior resistance to punctures when compared to EPS using the Slow Puncture Resistance Test Method as described in ASTM D-3763-86. The test results are shown in Tables 6-9 below.

Test Results

TABLE 6

Tested Material

| Specimen # | Peak Load g(f) | Elongation At Break (mm) |
|---|---|---|
| 1 | 13876.49 | — |
| 2 | 13684.33 | — |
| 3 | 15121.53 | — |
| 4 | 15268.95 | 17 |
| 5 | 14970.47 | 20 |
| 6 | 13049.71 | — |
| 7 | 15648.44 | 17 |
| 8 | 15352.38 | 23 |
| 9 | 18271.37 | — |
| 10 | 16859.29 | — |
| Mean | 15210.30 | 19 |
| Std. Dev. | 1532.83 | 3 |

TABLE 7

Comparison: Expanded Polystyrene

| Specimen # | Peak Load g(f) | Elongation At Break (mm) |
|---|---|---|
| 1 | 2936.73 | — |
| 2 | 2870.07 | 10 |
| 3 | 2572.62 | — |
| 4 | 2632.44 | — |
| 5 | 2809.70 | — |
| 6 | 2842.93 | — |
| 7 | 2654.55 | — |
| 8 | 2872.96 | — |
| 9 | 2487.63 | — |
| 10 | 2866.53 | — |
| 11 | 2803.25 | — |
| 12 | 2775.22 | — |
| 13 | 2834.28 | — |
| 14 | 2569.97 | — |
| Mean | 2752.06 | 10 |
| Std. Dev. | 140.42 | — |

TABLE 8

Paper Wrapped Expanded Polystyrene

| Specimen # | Peak Load g(f) | Elongation At Break (mm) |
|---|---|---|
| 1 | 7930.61 | — |
| 2 | 10044.30 | — |
| 3 | 9849.01 | — |
| 4 | 8711.44 | — |
| 5 | 9596.79 | — |
| 6 | 9302.99 | — |
| 7 | 10252.27 | — |
| 8 | 7785.64 | — |
| 9 | 8437.28 | — |
| 10 | 6751.98 | — |
| 11 | 9993.19 | — |
| Mean | 8968.68 | — |
| Std. Dev. | 1134.68 | — |

TABLE 9

Summary of Slow Puncture-Straw Test Results

| Sample ID → | Tested insulative cellular non-aromatic polymeric material cup (mean) grams-force (gf) | Expanded polystyrene (mean) grams-force (gf) | Paper wrapped expanded polystyrene (mean) grams-force (gf) |
|---|---|---|---|
| Average gf: | 15210 | 2752 | 8969 |

Example 2—Formulation and Extrusion

The following formulation was used:
81.70% *Borealis* WB140HMS primary polypropylene
0.25% Amco A18035 PPRO talc filled concentrate
2% Ampacet 102823 Process Aid PE MB linear low density polyethylene slip agent
0.05% Hydrocerol CF-40E chemical foaming agent
1% Colortech 11933-19 colorant
15% Braskem F020HC high crystallinity homopolymer polypropylene
3.4 lbs/hour of $CO_2$ was introduced into the molten resin.
Density of the sheet formed ranged from 0.155-0.182 g/cc The formulation was added to an extruder hopper. The extruder heated the formulation to form a molten resin mixture. To this mixture was added the $CO_2$ to expand the resin and reduce density. The mixture thus formed was extruded through a die head into a sheet. The sheet was then cut and formed into a cup.

Example 2-Test Results

In exemplary embodiments, a tube of extruded insulative cellular non-aromatic polymeric material has two surfaces that are formed under different cooling conditions when the material is extruded. One surface, which will be further referenced as the "outside surface of extruded tube", or "OET", is in contact with air, and does not have physical barriers restricting the expansion. The OET surface is cooled by blowing compressed air at cooling rate equal or higher than 12°F/sec. Surface on the opposite side will be referenced as "inside of extruded tube" or "InET". The InET surface is formed when the extruded tube is drawn in the web (also known as the "machine") direction on the metal cooling surface of the torpedo mandrel that is physically restricting the InET and is cooled by combination of water and compressed air at a cooling rate below 10°F/sec. In exemplary embodiments, the cooling water temperature is 135°F. In exemplary embodiments, the cooling air temperature is 85°F. As a result of different cooling mechanisms the OET and InET surfaces have different surface characteristics. It is known that cooling rate and method affects the crystallization process of polypropylene altering its morphology (size of crystal domains) and topography (surface profile and smoothness).

An unexpected feature of exemplary embodiments of an extruded sheet as described herein is in the ability of the sheet to form a noticeably smooth, crease and wrinkle free surface, when curved to form a round article, such as cup. The surface is smooth and wrinkle free even inside the cup, where compression forces typically cause foam to crush crease easily, especially for low density foam with large cell size. In exemplary embodiments, the smoothness of the surface of an extruded sheet of insulative cellular non-aromatic polymeric material as detected by microscopy is such that the depth of the indentations (creases or wrinkles) naturally occurring in the outside and inside of the cup surface when it is subject to extension and compression forces during cup formation may be less than 100 microns. In one exemplary embodiment the smoothness may be less than 50 microns. In one exemplary embodiment the smoothness may be 5 microns or less. At about 10 microns depth and less the micro-wrinkles on cup surface are ordinarily not visible to the naked eye.

In one exemplary embodiment a cup formed from a laminate of a polypropylene insulative cellular non-aromatic polymeric material and a polypropylene film had typical creases (deep wrinkle) about 200 microns deep extending from the top to bottom of the cup. In one exemplary embodiment a cup formed from a laminate of a polypropylene insulative cellular non-aromatic polymeric material only (without a film laminate) had typical creases about 200 microns deep extending from top to bottom of the cup. Such creases with depths from about 100 to about 500 microns are typically formed when InET is facing inside of the cup in a compression mode. Creases and deep wrinkles may present a problem of unsatisfactory surface quality making final cups unusable or undesirable. Creases may form in instances where laminated or unlaminated sheets are used.

In exemplary embodiments, the insulative cellular non-aromatic polymeric material may be extruded as a single layer, however microscopy images showed that two distinct layers exist within the extruded sheet, namely, dull OET and shiny InET. The difference between the two layers is in reflectance of the surface due to the difference in crystal domain size. If a black marker is used to color the surface examined by microscope, reflectance is eliminated and the difference between the two surfaces may be minimal or undetectable.

In one exemplary embodiment a sample extruded sheet was prepared without any laminated layer. Black marker was used to eliminate any difference in reflectance between the layers. Images showed that the cell size and cell distribution was the same throughout the sheet thickness. A crease of 200 microns deep was seen as a fold in the surface where the cell wall collapsed under the compression forces.

Differential scanning calorimetry (DSC) analysis conducted on a TA Instruments DSC 2910 in nitrogen atmosphere showed that with an increase in cooling rate the crystallization temperature and crystallinity degree decreased for the polymer matrix material of the sheet, as shown below in Table 10.

DSC data demonstrates the dependence of crystallization and subsequent $2^{nd}$ heat melting temperature and percent crystallinity on the rate of cooling during crystallization. Exemplary embodiments of an extruded sheet of insulative cellular non-aromatic polymeric material may have the melting temperature between 160 and 172° C., crystallization temperature between 108 and 135° C. and % crystallinity between 42 and 62%.

In exemplary embodiments the extruded sheet as determined by DSC at 10/min heating and cooling rate had a melting temperature of 162° C., crystallization temperature of 131° C. and crystallinity degree of 46%.

It was found unexpectedly that the OET surface works favorably in a compression mode without causing appreciable creasing and therefore a cup (or other structure) may advantageously be made with the OET surface facing inside of the cup. The difference in the resistance of the InET and OET layers to compression force may be due to difference in the morphology of the layers, since they were crystallized at different cooling rates.

In exemplary embodiments of formation of an extruded sheet, the InET surface may be cooled by combination of water cooling and compressed air. The OET surface may be cooled by compressed air by using torpedo with circulating water and air outlet. Faster cooling rates may result in the formation of smaller size crystals. Typically, the higher cooling rate, the greater the relative amount of smaller crystals that is formed. X-Ray diffraction analysis of an exemplary extruded sheet of insulative cellular non-aromatic polymeric material was conducted on Panalytical X'pert MPD Pro diffractometer using Cu radiation at 45 KV/40 mA. It was confirmed that the OET surface had a crystal domain size of 99 angstrom, while the InET surface had a crystal domain size of 114 angstrom. In exemplary embodiments, an extruded sheet of insulative cellular non-aromatic polymeric material may have a crystal domain size below 200 angstroms. In exemplary embodiments, an extruded sheet of insulative cellular non-aromatic polymeric material may have a crystal domain size preferably below 115 angstroms. In exemplary embodiments, an extruded sheet of insulative cellular non-aromatic polymeric material may have a crystal domain size below 100 angstroms.

Rigidity

Test Method

The test method is the same as described for rigidity testing in Example 1.

Test Results

The rigidity test results are shown in Table 11 below.

TABLE 10

| Crystallization of polymer matrix | | | | | |
|---|---|---|---|---|---|
| Crystallization temp, in ° C. | | | Crystallinity degree, in % | | |
| Slow cooling 5° C./min | 10° C./min | Fast cooling 15° C./min | Slow cooling 5° C./min | 10° C./min | Fast cooling 15° C./min |
| 135.3 | 131.5 | 129.0 | 49.2 | 48.2 | 47.4 |

| Melting ($2^{nd}$ heat) of polymer matrix (heating rate 10° C./min) after crystallization | | | | | |
|---|---|---|---|---|---|
| Melting temp, ° C. | | | Crystallinity degree, % | | |
| Slow cooling 5° C./min | 10° C./min | Fast cooling 15° C./min | Slow cooling 5° C./min | 10° C./min | Fast cooling 15° C./min |
| 162.3 | 162.1 | 161.8 | 48.7 | 47.2 | 46.9 |

TABLE 11

| | unlidded/filled 200° F. Rigidities (kg's) | | | lidded/filled 200° F. Rigidities (kg's) | | | | |
|---|---|---|---|---|---|---|---|---|
| Sample # | Seam | 90° from Seam | Average | Seam | 90° from Seam | Average | Gram Weights | Wall Thickness |
| B1 | 0.354 | 0.380 | 0.367 | 0.470 | 0.528 | 0.499 | 12.6 | 0.0744 |
| B2 | 0.426 | 0.464 | 0.445 | 0.598 | 0.610 | 0.604 | 13.0 | |
| B3 | 0.526 | 0.494 | 0.510 | 0.628 | 0.618 | 0.623 | 12.4 | |
| B4 | 0.592 | 0.566 | 0.579 | 0.740 | 0.746 | 0.743 | 13.2 | |
| | | | | | | | 12.80 | |
| | | | 0.475 | | | 0.617 | | |
| | | | | | | | | Density 0.1817 |

Insulation

Test Method—Wall Temperature

A cup formed from the formulation noted above was used having a density of 0.18 g/cm³ and a wall thickness of 0.074 inches. A hot liquid at 200° F. (93.3° C.) was placed in the cup.

Test Results

The temperature measured on the outside wall of the cup was about 151°F (66.1°C), i.e., a 49.0°F)(27.2° ° C. drop. The maximum temperature over a five-minute period was observed to peak at 151°F (66.1° C.).

Insulation testing in the form of thermal conductivity was done.

Test Method—Thermal Conductivity

This test measures bulk thermal conductivity (W/m-K), measured at ambient temperature and at 93°C. A ThermTest TPS 2500 S Thermal Constants Analyzer instrument was used, employing the test method of ISO/DIS 22007-2.2 and using the Low Density/High Insulating option. The TPS sensor #5501 (6.403 mm radius) with Kapton® insulation was used for all measurements. A 20 second test was done, using 0.02 Watts power. Data using points 100-200 were reported.

Test Results

The test results shown in Table 12 below.

TABLE 12

Mean Thermal Conductivity Results

| Temp. (° C.) | Mean Thermal Conductivity (W/m-K) | Standard Deviation (W/m-K) |
|---|---|---|
| 21 | 0.05792 | 0.00005 |
| 93 | 0.06680 | 0.00025 |

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment, and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only.

It should further be noted that any publications and brochures referred to herein are incorporated by reference in their entirety.

The invention claimed is:

1. An insulative container comprising
a body including a side wall, and
a floor coupled to the body to define an interior region bounded by the side wall and the floor,
wherein the body comprises a sheet comprising insulative cellular non-aromatic polymeric material that has localized plastic deformation in at least one selected region of the body to provide a plastically deformed first material segment having a first density located in a first portion of the at least one selected region of the body and a second material segment having a second density lower than the first density located in an adjacent second portion of the at least one selected region of the body, and
wherein the body includes a floor mount coupled to a lower end of the side wall and to the floor to support the floor in a stationary position relative to the side wall to form the interior region, the floor mount including a web-support ring coupled to the lower end of the side wall, a floor-retaining flange spaced radially inward from the web-support ring to locate a portion of the floor radially between the web-support ring and the floor-retaining flange, and a web interconnecting a lower end of the web-support ring and a lower end of the floor-retaining flange, and
wherein the floor-retaining flange of the floor mount includes an alternating series of upright staves arranged in side-to-side relation, a first of the upright staves is configured to provide the first material segment, and a second of the upright staves is configured to provide the second material segment.

2. The insulative container of claim 1, wherein a first selected region of the body in which localized plastic deformation is enabled by the insulative cellular non-aromatic polymeric material is in a rolled brim included in the body and coupled to an upper end of the side wall to lie in spaced-apart relation to the floor and to frame an opening into the interior region, and wherein the rolled brim includes a portion of the first material segment and a portion of the second material segment in the first selected region of the body.

3. The insulative container of claim 2, wherein the rolled brim includes an inner rolled tab having the first density and configured to provide the first material segment in the first selected region of the body and coupled to an upper end of an upright outer tab included in the side wall, an outer rolled tab coupled to an upper end of an upright inner tab included in the side wall and to an outwardly facing exterior surface of the inner rolled tab, and a rolled lip having the second density and arranged to interconnect oppositely facing side edges of each of the inner and outer rolled tabs to provide the second material segment in the first selected region of the body and cooperate with the inner and outer rolled tabs to form the rolled brim.

4. The insulative container of claim 3, wherein the inner rolled tab and the outer rolled tab cooperate to provide a first brim thickness, the rolled lip has a second brim thickness, and the first brim thickness is about equal to the second brim thickness to cause a smooth transition to be formed at a transition point where the inner rolled tab and the outer rolled tab overlap one another and couple to the rolled lip.

5. The insulative container of claim 4, wherein the insulative cellular non-aromatic polymeric material comprises a polypropylene base resin and a secondary polymer.

6. The insulative container of claim 1, wherein the sheet includes an ink layer coupled to a skin layer, and the skin layer and the ink layer are coupled to the insulative cellular non-aromatic polymeric material.

7. The insulative container of claim 6, wherein the ink layer is located between the skin layer and the insulative cellular non-aromatic polymeric material.

8. The insulative container of claim 1, wherein the insulative cellular non-aromatic polymeric material comprises a polypropylene base resin and a secondary polymer.

9. The insulative container of claim 8, wherein the polypropylene base resin and the secondary polymer are homopolymers.

10. The insulative container of claim 8, wherein the secondary polymer comprises a polyethylene-based material selected from a group consisting of low density polyethylene, linear low density polyethylene, high density polyethylene, ethylene-vinyl acetate copolymers, ethylene-ethylacrylate copolymers, ethylene-acrylic acid copolymers, and mixtures and combinations thereof.

11. The insulative container of claim 8, wherein the secondary polymer is polypropylene or polyethylene.

12. The insulative container of claim 8, wherein the secondary polymer is a mixture of at least two materials.

13. The insulative container of claim 12, wherein the base resin has long chain branching including polymer chains with at least 20 carbon atoms.

14. The insulative container of claim 13, wherein the secondary polymer is at least about 15 wt % of the cellular non-aromatic polymeric material and the insulative cellular non-aromatic polymeric material further comprises up to about 2 wt % of a chemical blowing agent, and up to about 2 wt % of a nucleating agent.

15. An insulative container comprising
a body including a side wall, and
a floor coupled to the body to define an interior region bounded by the side wall and the floor,
wherein the body comprises a sheet comprising insulative cellular non-aromatic polymeric material that has localized plastic deformation in at least one selected region of the body to provide a plastically deformed first material segment having a first density located in a first portion of the at least one selected region of the body and a second material segment having a second density lower than the first density located in an adjacent second portion of the at least one selected region of the body,
wherein the body is free from aromatic materials and the insulative cellular non-aromatic polymeric material comprises a polypropylene base resin and a secondary polymer,
wherein the secondary polymer is at least one of a polypropylene homopolymer or a copolymer, and
wherein the insulative cellular non-aromatic polymeric material has a first surface, a second surface opposite the first surface, and the first surface includes at least one crease in the second material segment, and the at least one crease has a depth not exceeding about 200 microns.

16. The insulative container of claim 15, wherein the second density is about 0.1 g/cm$^3$ to about 0.19 g/cm$^3$ and the first density is at least about twice the second density.

17. The insulative container of claim 15, wherein the secondary polymer is at least about 15 wt % of the cellular non-aromatic polymeric material and the insulative cellular non-aromatic polymeric material further comprises up to about 2 wt % of a chemical blowing agent, and up to about 2 wt % of a nucleating agent.

18. The insulative container of claim 15, wherein the sheet includes an ink layer coupled to a skin layer, and the skin layer and the ink layer are coupled to the insulative cellular non-aromatic polymeric material.

19. The insulative container of claim 18, wherein the ink layer is located between the skin layer and the insulative cellular non-aromatic polymeric material.

* * * * *